United States Patent [19]

Vaidyanathan et al.

[11] Patent Number: 5,448,652
[45] Date of Patent: Sep. 5, 1995

[54] ADAPTIVE DISPLAY SYSTEM

[75] Inventors: Akhileswar G. Vaidyanathan, Hockessin; Dennis B. Fowler, Bear, both of Del.

[73] Assignee: E. I. Du Pont de Nemours and Company, Wilmington, Del.

[21] Appl. No.: 35,819

[22] Filed: Mar. 23, 1993

Related U.S. Application Data

[63] Continuation-in-part of Ser. No. 999,702, Dec. 31, 1992, Pat. No. 5,371,810, and a continuation-in-part of Ser. No. 999,703, Dec. 31, 1992, Pat. No. 5,375,177, and a continuation-in-part of Ser. No. 767,339, Sep. 27, 1991, abandoned.

[51] Int. Cl.$^6$ .............................................. G06K 9/46
[52] U.S. Cl. .................................... 382/165; 348/273; 358/512; 382/295
[58] Field of Search ................ 382/17, 48, 9; 358/523, 358/538, 518, 520, 512, 522; 340/701, 703; 364/526; 345/153, 154; 348/270, 273, 743; 395/131

[56] References Cited

U.S. PATENT DOCUMENTS

| | | | |
|---|---|---|---|
| 3,816,243 | 6/1974 | Yonezawa et al. | 178/5.4 CD |
| 4,574,393 | 3/1986 | Blackwell et al. | 382/17 |
| 4,689,613 | 8/1987 | Ikeda | 345/153 |
| 4,718,089 | 1/1988 | Hayashi et al. | 382/17 |
| 4,875,032 | 10/1989 | McManus et al. | 358/512 |
| 4,956,704 | 9/1990 | Yamada | 358/523 |
| 5,138,671 | 8/1992 | Yokoyama | 382/51 |
| 5,202,935 | 4/1993 | Kanamori et al. | 382/17 |
| 5,206,918 | 4/1993 | Levene | 382/17 |
| 5,216,498 | 6/1993 | Matsunawa et al. | 382/17 |
| 5,220,620 | 6/1993 | Nakano et al. | 382/17 |
| 5,222,154 | 6/1993 | Graham et al. | 382/17 |
| 5,222,206 | 6/1993 | Liao | 395/131 |

FOREIGN PATENT DOCUMENTS 0313789 5/1989 European Pat. Off. .
2178628 2/1987 United Kingdom .

*Primary Examiner*—Joseph Mancuso

[57] ABSTRACT

The present invention relates to a digital image analysis method for automatically identifying an object in a background, characterizing the object by color by determining at least one interior point of the object, and displaying the object on a monitor in color corresponding to the natural color of the object and a digital image analysis method for displaying an object on a monitor in color. The methods are adaptive in that they create a new pallette for each image being processed. The system used to implement the methods is cost effective in that a black-and-white image processing board can be used in conjunction with a color filter and a color monitor.

13 Claims, 47 Drawing Sheets

| POINT | ROW (X) | COLUMN (Y) | NEXT$_i$ | PREV$_i$ |
|---|---|---|---|---|
| 1 | 1 | 2 | 3 ↘ | 1 ↗ |
| 2 | 2 | 3 | 3 ↘ | 3 ↘ |
| 3 | 3 | 4 | 1 ↗ | 3 ↘ |
| 4 | 2 | 5 | 1 ↗ | 1 ↗ |
| 5 | 1 | 6 | 3 ↘ | 1 ↗ |
| 6 | 2 | 7 | 4 ↓ | 3 ↘ |
| 7 | 3 | 7 | 5 ↙ | 4 ↓ |
| 8 | 4 | 6 | 5 ↙ | 5 ↙ |
| 9 | 5 | 5 | 6 ← | 5 ↙ |
| 10 | 5 | 4 | 7 ↖ | 6 ← |
| 11 | 4 | 3 | 7 ↖ | 7 ↖ |
| 12 | 3 | 2 | 7 ↖ | 7 ↖ |
| 13 | 2 | 1 | 1 ↗ | 7 ↖ |

FIG.9

DIRECTION CODE

|  | NEXT | 0 | 1 | 2 | 3 | 4 | 5 | 6 | 7 |
|---|---|---|---|---|---|---|---|---|---|
| PREVIOUS 0 |  | F | F | F | NF | NF | F | F | F |
| 1 |  | F | F | F | NF | NF | NF | F | F |
| 2 |  | F | F | F | NF | NF | NF | NF | F |
| 3 |  | F | F | F | NF | NF | NF | NF | NF |
| 4 |  | NF | F | F | NF | NF | NF | NF | NF |
| 5 |  | NF | NF | F | NF | NF | NF | NF | NF |
| 6 |  | F | F | F | F | F | F | F | F |
| 7 |  | F | F | F | NF | F | F | F | F |

DIRECTION CODE

FIG.10

DIRECTION CODE

| | NEXT | 0 | 1 | 2 | 3 | 4 | 5 | 6 | 7 |
|---|---|---|---|---|---|---|---|---|---|
| PREVIOUS | 0 | NF | NF | F | F | F | NF | NF | NF |
| | 1 | NF | NF | F | F | F | F | NF | NF |
| DIRECTION CODE | 2 | NF | NF | F | F | F | F | NF | NF |
| | 3 | NF | NF | F | F | F | F | F | NF |
| | 4 | NF | NF | F | F | F | F | F | F |
| | 5 | NF | NF | F | F | F | F | F | F |
| | 6 | F | F | F | F | F | F | F | F |
| | 7 | NF | NF | F | F | NF | NF | NF | NF |

| | | | |
|---|---|---|---|
| 0 | 0 | 128 | 0 |
| 1 | 16 | 6 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |
| 22 | 0 | 0 | 0 |
| 23 | 0 | 0 | 0 |
| 24 | 0 | 0 | 0 |
| 25 | 0 | 0 | 0 |
| 26 | 0 | 0 | 0 |
| 27 | 0 | 0 | 0 |
| 28 | 0 | 0 | 0 |
| 29 | 0 | 0 | 0 |
| 30 | 0 | 0 | 0 |
| 31 | 0 | 0 | 0 |
| 32 | 0 | 0 | 0 |
| 33 | 0 | 0 | 0 |
| 34 | 0 | 0 | 0 |
| 35 | 0 | 0 | 0 |
| 36 | 0 | 0 | 0 |
| 37 | 0 | 0 | 0 |
| 38 | 0 | 0 | 0 |
| 39 | 0 | 0 | 0 |
| 40 | 0 | 0 | 0 |
| 41 | 0 | 0 | 0 |
| 42 | 0 | 0 | 0 |
| 43 | 0 | 0 | 0 |
| 44 | 0 | 0 | 0 |
| 45 | 0 | 0 | 0 |
| 46 | 0 | 0 | 0 |
| 47 | 0 | 0 | 0 |
| 48 | 0 | 0 | 0 |
| 49 | 0 | 0 | 0 |
| 50 | 0 | 0 | 0 |

FIG.13A

| | | | |
|---|---|---|---|
| 51 | 0 | 0 | 0 |
| 52 | 0 | 0 | 0 |
| 53 | 0 | 0 | 0 |
| 54 | 0 | 0 | 0 |
| 55 | 0 | 0 | 0 |
| 56 | 0 | 0 | 0 |
| 57 | 0 | 0 | 0 |
| 58 | 0 | 0 | 0 |
| 59 | 0 | 0 | 0 |
| 60 | 0 | 0 | 0 |
| 61 | 0 | 0 | 0 |
| 62 | 0 | 0 | 0 |
| 63 | 0 | 0 | 0 |
| 64 | 0 | 0 | 0 |
| 65 | 0 | 0 | 0 |
| 66 | 0 | 0 | 0 |
| 67 | 0 | 0 | 0 |
| 68 | 0 | 0 | 0 |
| 69 | 0 | 0 | 0 |
| 70 | 0 | 0 | 0 |
| 71 | 16 | 3 | 0 |
| 72 | 0 | 0 | 0 |
| 73 | 0 | 0 | 0 |
| 74 | 0 | 0 | 0 |
| 75 | 0 | 0 | 0 |
| 76 | 16 | 5 | 0 |
| 77 | 23 | 8 | 1 |
| 78 | 21 | 8 | 1 |
| 79 | 25 | 10 | 1 |
| 80 | 28 | 11 | 0 |
| 81 | 24 | 10 | 0 |
| 82 | 24 | 11 | 1 |
| 83 | 24 | 11 | 0 |
| 84 | 38 | 19 | 1 |
| 85 | 32 | 16 | 0 |
| 86 | 36 | 19 | 0 |
| 87 | 34 | 19 | 1 |
| 88 | 47 | 27 | 1 |
| 89 | 39 | 23 | 1 |
| 90 | 50 | 30 | 0 |
| 91 | 43 | 27 | 1 |
| 92 | 43 | 28 | 1 |
| 93 | 52 | 35 | 1 |
| 94 | 51 | 35 | 0 |
| 95 | 53 | 38 | 1 |
| 96 | 57 | 42 | 1 |
| 97 | 51 | 39 | 1 |
| 98 | 54 | 42 | 0 |
| 99 | 52 | 42 | 1 |
| 100 | 61 | 51 | 2 |
| 101 | 73 | 64 | 5 |
| 102 | 60 | 53 | 3 |

FIG. 13B

| | | | |
|---|---|---|---|
| 103 | 74 | 68 | 3 |
| 104 | 72 | 67 | 3 |
| 105 | 107 | 103 | 21 |
| 106 | 108 | 108 | 10 |
| 107 | 105 | 107 | 16 |
| 108 | 102 | 106 | 9 |
| 109 | 89 | 97 | 5 |
| 110 | 114 | 125 | 28 |
| 111 | 104 | 118 | 12 |
| 112 | 121 | 138 | 30 |
| 113 | 106 | 125 | 13 |
| 114 | 113 | 134 | 26 |
| 115 | 99 | 123 | 20 |
| 116 | 114 | 139 | 40 |
| 117 | 108 | 136 | 32 |
| 118 | 109 | 138 | 37 |
| 119 | 104 | 137 | 31 |
| 120 | 87 | 120 | 21 |
| 121 | 90 | 128 | 24 |
| 122 | 76 | 112 | 20 |
| 123 | 44 | 71 | 4 |
| 124 | 80 | 114 | 33 |
| 125 | 58 | 91 | 18 |
| 126 | 76 | 112 | 36 |
| 127 | 60 | 97 | 22 |
| 128 | 35 | 60 | 12 |
| 129 | 52 | 88 | 21 |
| 130 | 32 | 60 | 9 |
| 131 | 43 | 75 | 20 |
| 132 | 0 | 0 | 0 |
| 133 | 0 | 0 | 0 |
| 134 | 0 | 0 | 0 |
| 135 | 0 | 0 | 0 |
| 136 | 0 | 0 | 0 |
| 137 | 0 | 0 | 0 |
| 138 | 0 | 0 | 0 |
| 139 | 0 | 0 | 0 |
| 140 | 0 | 0 | 0 |
| 141 | 0 | 0 | 0 |
| 142 | 0 | 0 | 0 |
| 143 | 0 | 0 | 0 |
| 144 | 0 | 0 | 0 |
| 145 | 0 | 0 | 0 |
| 146 | 0 | 0 | 0 |
| 147 | 0 | 0 | 0 |
| 148 | 0 | 0 | 0 |
| 149 | 0 | 0 | 0 |
| 150 | 0 | 0 | 0 |
| 151 | 0 | 0 | 0 |
| 152 | 0 | 0 | 0 |
| 153 | 0 | 0 | 0 |
| 154 | 0 | 0 | 0 |

FIG. 13C

| | | | |
|---|---|---|---|
| 155 | 0 | 0 | 0 |
| 156 | 0 | 0 | 0 |
| 157 | 0 | 0 | 0 |
| 158 | 0 | 0 | 0 |
| 159 | 0 | 0 | 0 |
| 160 | 0 | 0 | 0 |
| 161 | 0 | 0 | 0 |
| 162 | 0 | 0 | 0 |
| 163 | 0 | 0 | 0 |
| 164 | 0 | 0 | 0 |
| 165 | 0 | 0 | 0 |
| 166 | 0 | 0 | 0 |
| 167 | 0 | 0 | 0 |
| 168 | 0 | 0 | 0 |
| 169 | 0 | 0 | 0 |
| 170 | 0 | 0 | 0 |
| 171 | 0 | 0 | 0 |
| 172 | 0 | 0 | 0 |
| 173 | 0 | 0 | 0 |
| 174 | 0 | 0 | 0 |
| 175 | 0 | 0 | 0 |
| 176 | 0 | 0 | 0 |
| 177 | 0 | 0 | 0 |
| 178 | 0 | 0 | 0 |
| 179 | 0 | 0 | 0 |
| 180 | 0 | 0 | 0 |
| 181 | 0 | 0 | 0 |
| 182 | 0 | 0 | 0 |
| 183 | 0 | 0 | 0 |
| 184 | 0 | 0 | 0 |
| 185 | 0 | 0 | 0 |
| 186 | 0 | 0 | 0 |
| 187 | 0 | 0 | 0 |
| 188 | 0 | 0 | 0 |
| 189 | 0 | 0 | 0 |
| 190 | 0 | 0 | 0 |
| 191 | 0 | 0 | 0 |
| 192 | 0 | 0 | 0 |
| 193 | 0 | 0 | 0 |
| 194 | 0 | 0 | 0 |
| 195 | 0 | 0 | 0 |
| 196 | 0 | 0 | 0 |
| 197 | 0 | 0 | 0 |
| 198 | 0 | 0 | 0 |
| 199 | 0 | 0 | 0 |
| 200 | 0 | 0 | 0 |
| 201 | 0 | 0 | 0 |
| 202 | 0 | 0 | 0 |
| 203 | 0 | 0 | 0 |
| 204 | 0 | 0 | 0 |
| 205 | 0 | 0 | 0 |
| 206 | 0 | 0 | 0 |

FIG. 13D

| | | | |
|---|---|---|---|
| 207 | 0 | 0 | 0 |
| 208 | 0 | 0 | 0 |
| 209 | 0 | 0 | 0 |
| 210 | 0 | 0 | 0 |
| 211 | 0 | 0 | 0 |
| 212 | 0 | 0 | 0 |
| 213 | 0 | 0 | 0 |
| 214 | 0 | 0 | 0 |
| 215 | 0 | 0 | 0 |
| 216 | 0 | 0 | 0 |
| 217 | 0 | 0 | 0 |
| 218 | 0 | 0 | 0 |
| 219 | 0 | 0 | 0 |
| 220 | 0 | 0 | 0 |
| 221 | 0 | 0 | 0 |
| 222 | 0 | 0 | 0 |
| 223 | 0 | 0 | 0 |
| 224 | 0 | 0 | 0 |
| 225 | 0 | 0 | 0 |
| 226 | 0 | 0 | 0 |
| 227 | 0 | 0 | 0 |
| 228 | 0 | 0 | 0 |
| 229 | 0 | 0 | 0 |
| 230 | 0 | 0 | 0 |
| 231 | 0 | 0 | 0 |
| 232 | 0 | 0 | 0 |
| 233 | 0 | 0 | 0 |
| 234 | 0 | 0 | 0 |
| 235 | 0 | 0 | 0 |
| 236 | 0 | 0 | 0 |
| 237 | 0 | 0 | 0 |
| 238 | 0 | 0 | 0 |
| 239 | 0 | 0 | 0 |
| 240 | 0 | 0 | 0 |
| 241 | 0 | 0 | 0 |
| 242 | 0 | 0 | 0 |
| 243 | 0 | 0 | 0 |
| 244 | 0 | 0 | 0 |
| 245 | 0 | 0 | 0 |
| 246 | 0 | 0 | 0 |
| 247 | 0 | 0 | 0 |
| 248 | 0 | 0 | 0 |
| 249 | 0 | 0 | 0 |
| 250 | 0 | 0 | 0 |
| 251 | 0 | 0 | 0 |
| 252 | 0 | 0 | 0 |
| 253 | 0 | 0 | 0 |
| 254 | 0 | 0 | 0 |
| 255 | 0 | 0 | 0 |

FIG. 13E

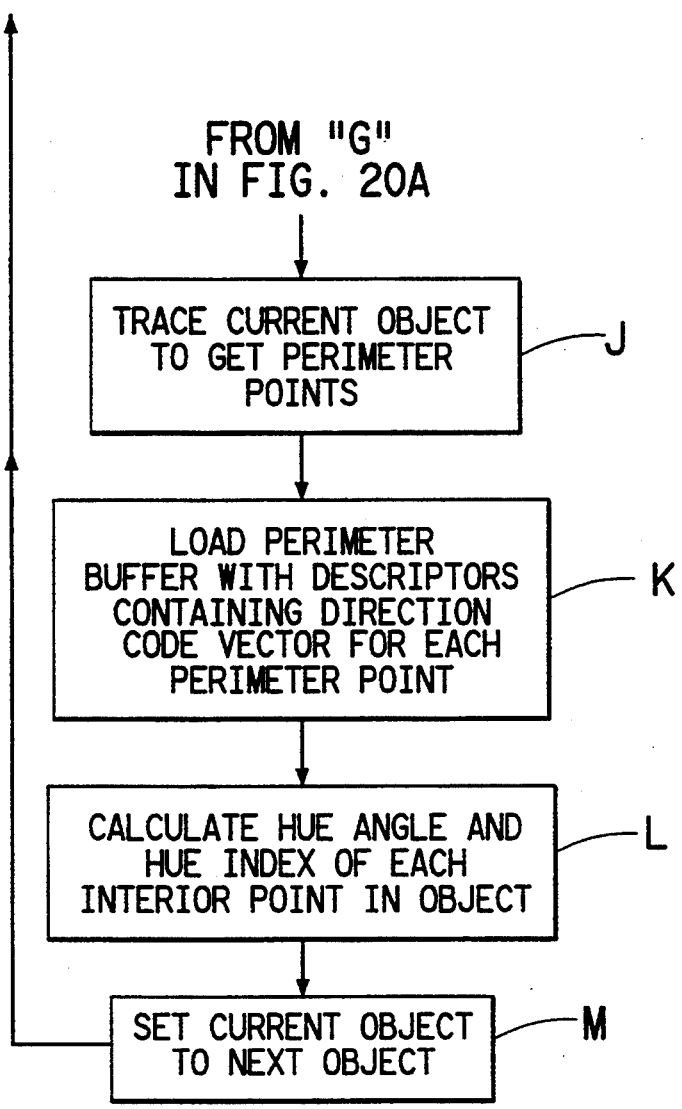

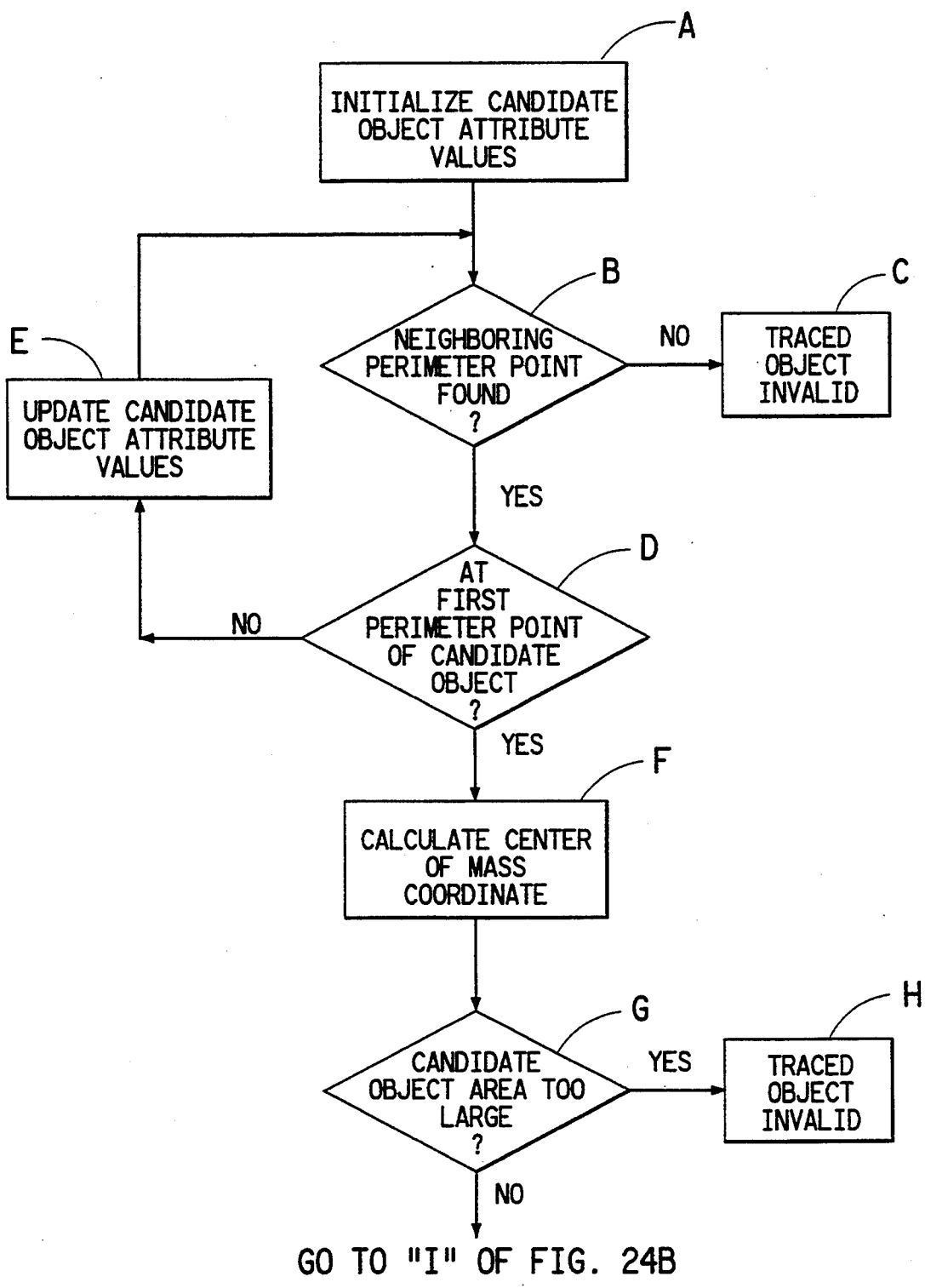

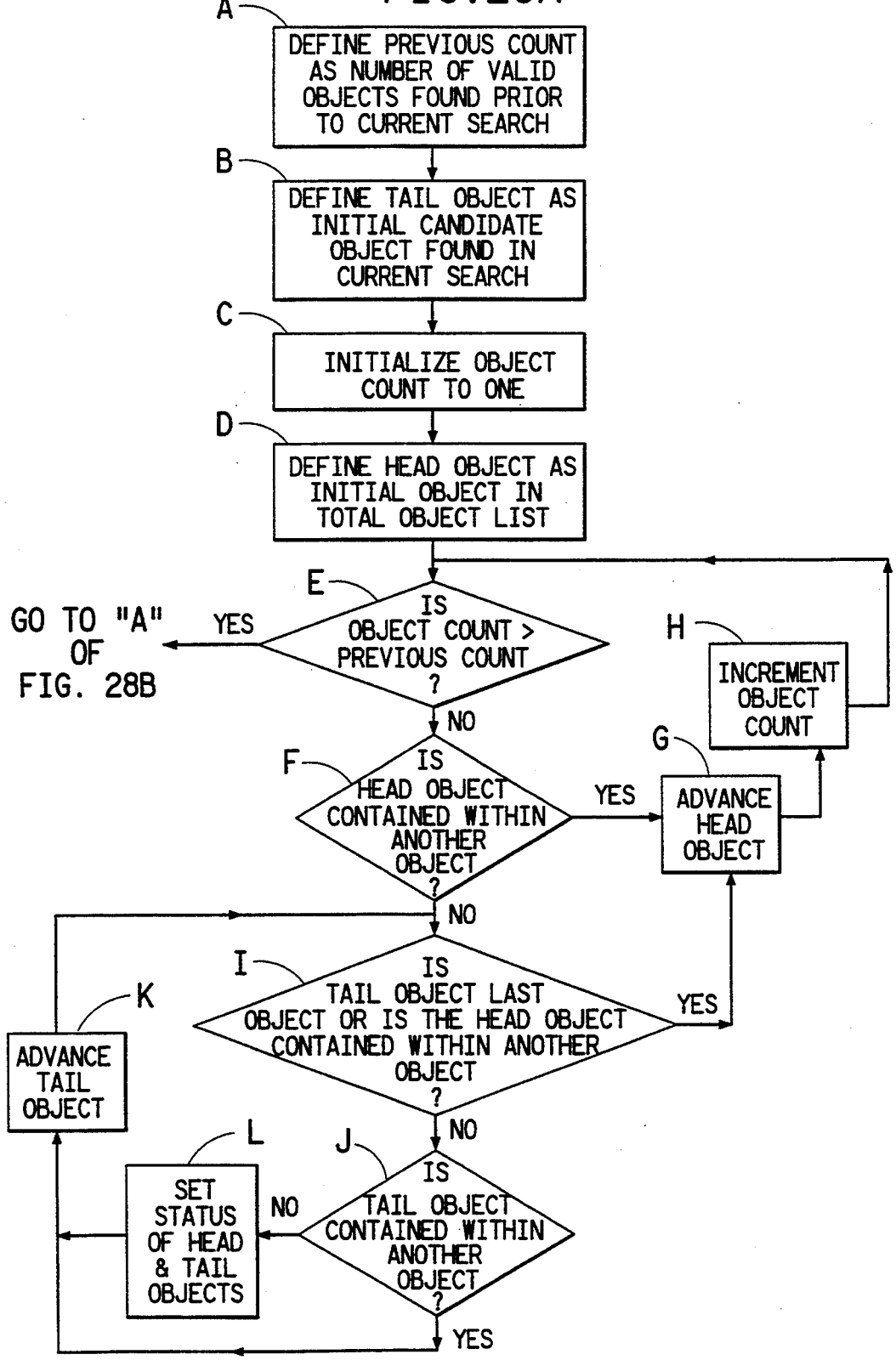

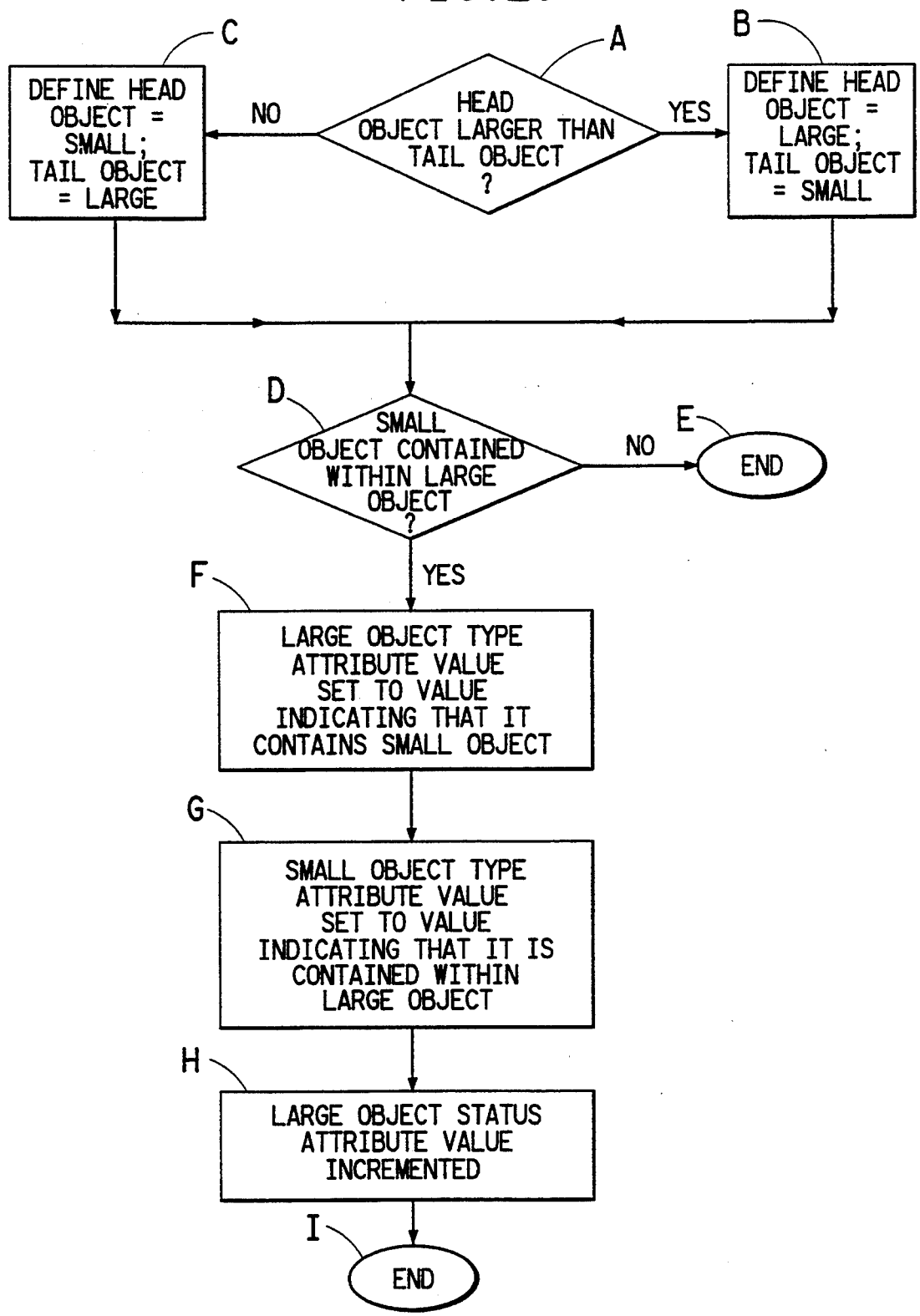

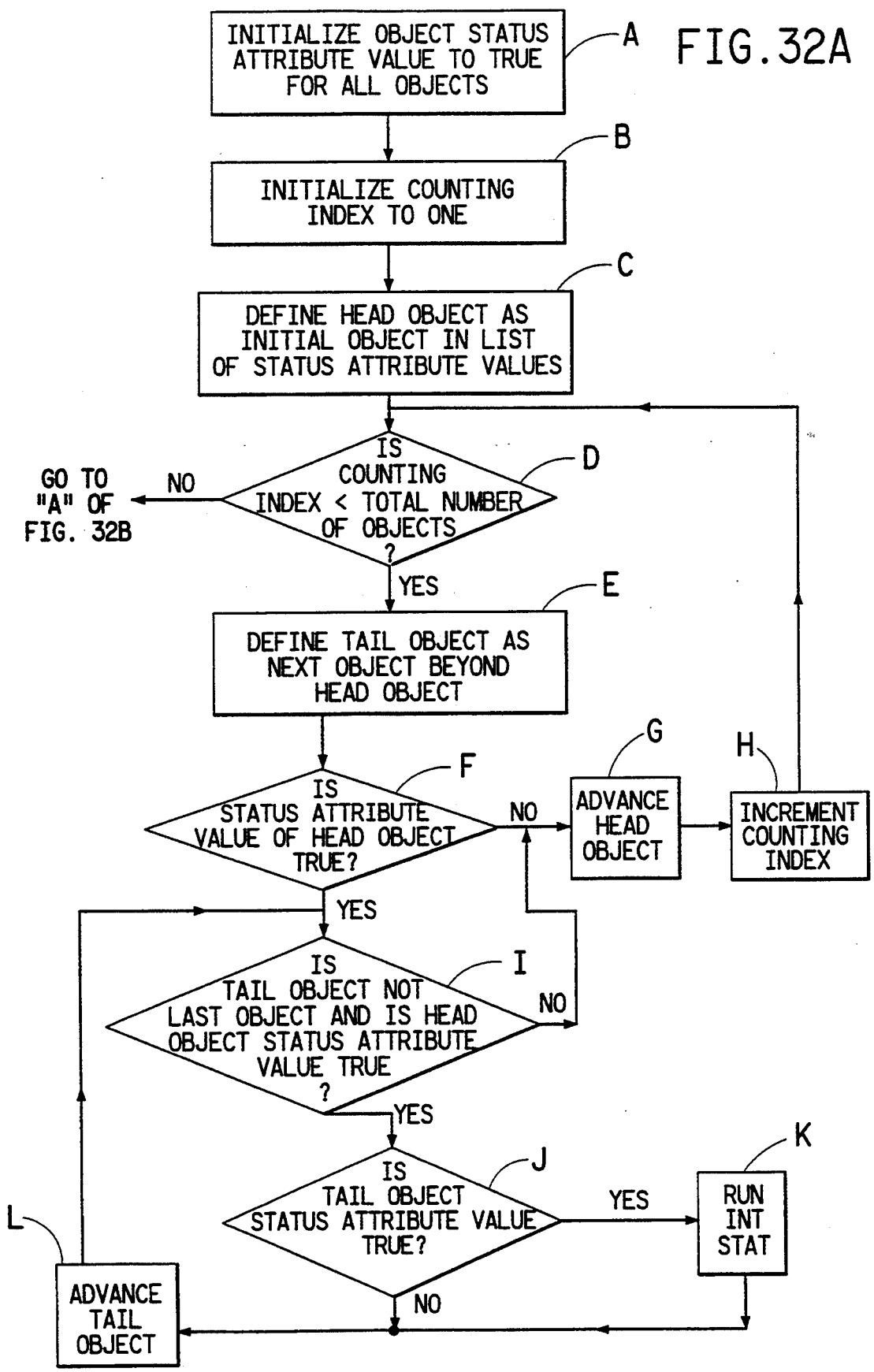

ADAPTIVE DISPLAY SYSTEM

The present invention is a continuation-in-part of application Ser. No. 07/999,702, filed Dec. 31, 1992, now U.S. Pat. No. 5,371,810, of application Ser. No. 07/999,703, filed Dec. 31, 1992, now U.S. Pat. No. 5,375,177, and of application Ser. No. 07/767,339, filed Sep. 27, 1991, now abandoned.

MICROFICHE APPENDIX

Attached hereto are microfiche containing 86 frames of modules which can be employed in the described embodiments and in other embodiments. These microfiche are included as a portion of the disclosure of this patent document.

COPYRIGHT NOTICE

A portion of the disclosure of this patent document contains material which is subject to copyright protection. The copyright owner has no objection to the reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method of displaying an object on a monitor in color corresponding to the natural color of the object and to a digital image analysis method for automatically identifying an object in a background, characterizing the object by color by determining at least one interior point of the object, and displaying the object on a monitor in color corresponding to the natural color of the object.

2. Description Of The Related Art

The ability to access interior points of a region when its contour is given is a classic problem in image processing. Previous solutions to this problem have been described by L. W. Chang and K. L. Leu in an article entitled "A Fast Algorithm for the Restoration of Images Based on Chain Codes Description and Its Applications", Computer Vision, Graphics, and Image Processing 50, 296-307 (1990). One algorithm described, connectivity filling, requires that every pixel in the image be interrogated. Since the number of pixels within an object is greater than the number of pixels which comprise the perimeter of the object, such a technique is relatively slow. Another method described is parity checking, which is based on the fact that intersection of a straight line with the contour regions of an object delineates an even number of points on the perimeter of the object. Designation of the interior points is determined by an arbitrary filing rule where all points between each odd point and the next even point on the contour in each line of the image are designated as interior points. Such a parity checking algorithm will not work with objects of complex shape.

In the same article cited above, Chang and Leu propose an enhanced parity checking algorithm which relies on characterizing the perimeter points, created by the intersecting line segment, into one of four categories based on direction code values. Characterizing the points leads to the creation of a new buffer of perimeter points wherein some points have been duplicated and others eliminated. By applying the parity checking algorithm to the newly created buffer, interior points of objects with complex shapes may be identified. However, the enhanced algorithm presented by Chang and Leu is an indirect method to solving the problem of interior points determination requiring an excessive number of steps.

Japanese Patent Publication No. 62-60069 to Hitachi Electronic Engineering Co. Ltd., published Dec. 14, 1987, discloses a colony screening device which distinguishes colonies based on color by using interior point information. Colonies are identified by pattern recognition using a predetermined threshold, and a small number of points in the center of a colony are arbitrarily selected. U.S. Pat. No. 4,453,266 to Bacus discloses a method for identifying an object in a background. This is done by measuring the optical density of a cell using the sum of the gray level values within the closed boundaries of the cell.

None of the references discussed above discloses a digital image analysis method for displaying an object in color corresponding to the natural color of the object. Moreover, none of the references discussed above discloses a digital image analysis method for identifying and characterizing, by color, a valid object having at least one predetermined attribute value in a background by determining the interior points of an object and then displaying the object on a monitor in a color corresponding to the natural color of the object.

SUMMARY OF THE INVENTION

In accordance with the purposes of the invention, as embodied and broadly described herein, in a first embodiment of the invention there is provided a digital image analysis method for displaying an object on a monitor in color corresponding to the color of the object. The method comprises the steps of generating a plurality of images of the object and a background thereof, where each image is one of three primary color images or a black and white image; searching at least one image for the object; determining the interior points of the object; determining the gray level values of at least one predetermined interior point; calculating at least one color parameter of the predetermined interior point; calculating at least one color parameter index for the predetermined interior point of the object; preparing a table of gray level values corresponding to the color parameter index of the predetermined interior point of the object; defining an image buffer wherein the locations corresponding to the interior points of the object are assigned the color parameter index of the predetermined interior point; and copying the image buffer to the monitor to display the object in color corresponding to the color of the predetermined interior point as determined by the table of gray level values corresponding to the color parameter index.

In accordance with the purpose of the invention, as embodied and broadly described herein, in a second embodiment of the invention there is provided a method of identifying, characterizing and displaying by color at least one valid object having at least one predetermined attribute value in a background. The method comprises the steps of generating a plurality of images of a candidate object and the background, each image being one of three primary color images or a black and white image; searching at least one image for at least one candidate object; determining the interior points of the candidate object; determining at least one predetermined gray level values of the interior point of the candidate object in at least one of the images; calculating at least one color parameter of the predetermined interior point of the candidate object; characterizing the candidate object by the color parameter; validating the candidate object having the valid object predetermined attribute value to identify the valid object; calculating at least one color parameter index of at least one predetermined interior point for each valid object; preparing a table of gray level values corresponding to the color parameter index of the predetermined interior point; defining an image buffer wherein the locations corresponding to the interior points of the object are assigned the color parameter index of the predetermined interior point of the valid object; and copying the image buffer to the monitor to display the valid object in color of the predetermined interior point of the valid object as determined by the table of gray level values corresponding to the color parameter index.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 9 is a FILL look-up table for objects traced in the clockwise direction.

FIG. 10 is a FILL look-up table for objects traced in the counterclockwise direction.

FIGS. 13A–13E are a display look-up table showing the hue index calculated in accordance with the present invention and the Red-Green-Blue gray level value for each index.

FIGS. 20A and 20B are a flow chart showing the steps of an umbrella module, CHECK COLOR, which identifies and characterizes a valid object with a predetermined attribute value as used with the second embodiment as illustrated in FIG. 19.

FIGS. 24A–24B are a flow chart showing the steps of a module, TRACE OBJECT; which is used to trace objects.

FIGS. 28A–28D are a flow chart showing the steps of a module, CHK LIST, which is used to resolve redundancies in inhomogeneous objects.

FIG. 29 is a flow chart showing the steps of a module, SET STAT, which is used with the module CHK LIST as shown in FIGS. 28A–28B.

FIGS. 32A–32B are a flow chart showing the steps of a module, FINAL CHK, which is used to perform a final check to resolve redundancies in inhomogeneous and homogeneous objects.

DESCRIPTION OF THE PREFERRED EMBODIMENTS

Reference will now be made in detail to the present preferred embodiments of the invention. Wherever possible, the same reference numbers will be used throughout the drawings to refer to the same or like parts.

In accordance a first embodiment of the present invention, there is provided a digital image analysis method for displaying an object on a monitor in color corresponding to the color of the object. The method comprises the step of generating a plurality of images of the object and the background thereof. This step is shown in block A of FIG. 1. A system for displaying an object on a monitor is shown generally at 10 in FIG. 2. System 10 comprises a black-and-white camera 12 and a color filter wheel 14. Color filter wheel 14 filters, or pulls out the color content of, the black-and-white image generated by the black-and-white camera. Thus, each image is one of three primary color images—a red image, a green image or a blue image, or a black-and-white image. Although in the present invention three color images are generated, one through a red filter, one through a green filter and one through a blue filter, it is within the scope of this invention to generate a composite color image and subsequently digitize it, separating out the red, green and blue color information. In addition, although a CCD camera is generally used with the present invention, any type of camera may be used without departing from the general principles of the invention. A color CCD camera may be used instead of a black-and-white CCD camera in order to generate the color and black-and-white images. However, with the present invention, a large economic advantage can be realized by using a black-and-white camera, a color filter wheel, a black-and-white image processing board and a color monitor over using an all-color system, since presently, a color camera is at least about ten times as expensive as a black-and-white camera. Such an economic advantage is realized without sacrificing the usefulness of displaying objects in their natural colors.

Figure 2:
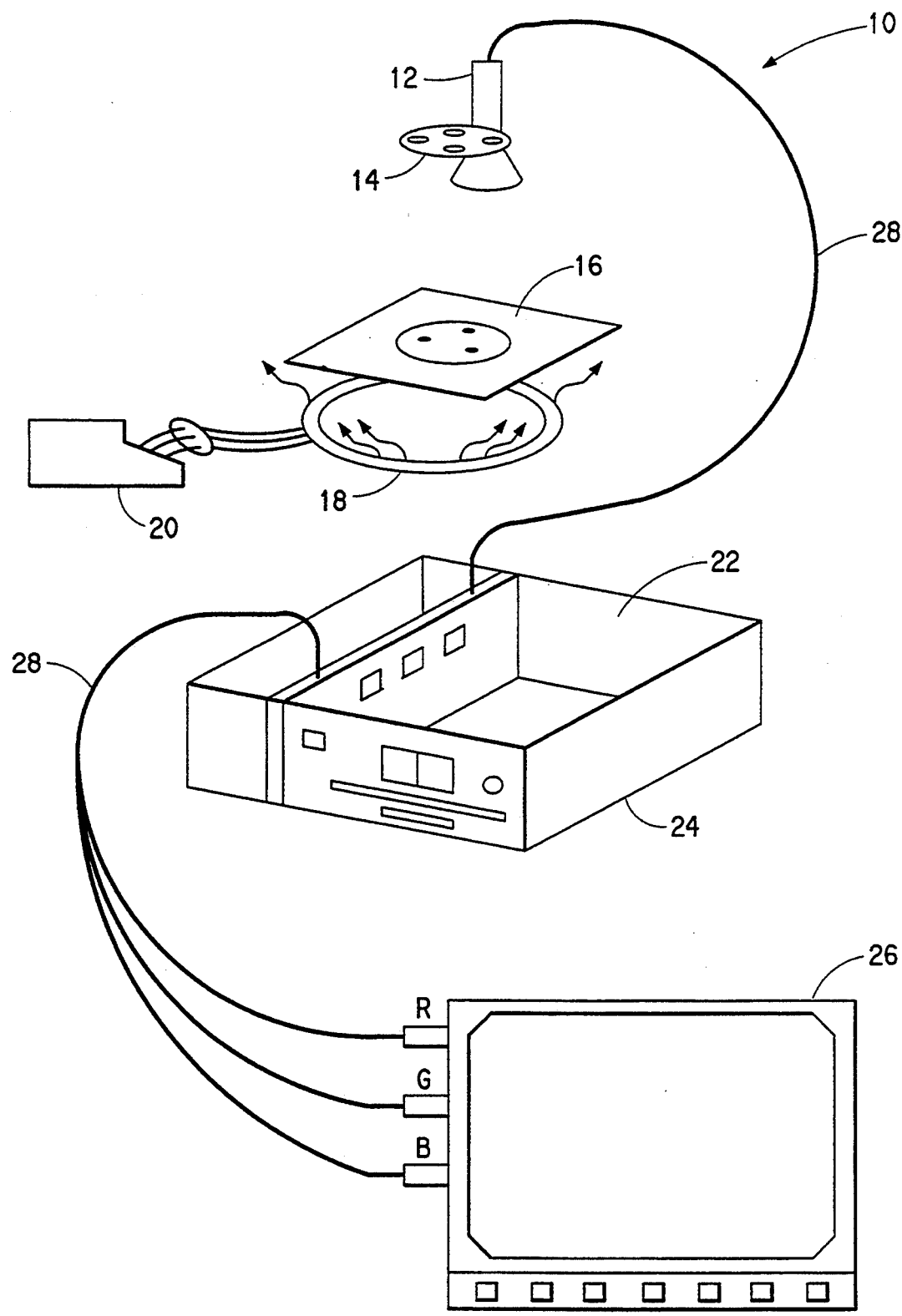
FIG. 2 is a schematic diagram showing the components of a digital image analysis system for displaying an object on a monitor in color.

System 10 further comprises a sample holder 16 for holding a sample of the object, and a light source, 18, for illuminating the object. Light source 18 is powered by a power supply 20. System 10 also comprises a frame grabber, or black-and-white image processing board, 22, which is part of a computer system 24. The hardware of system 10 must first be initialized when the image is generated. The image is then digitized and stored by the frame grabber or a video digitizer. System 10 further comprises a color monitor 26 for displaying the object in color. Computer 24 is connected to camera 12 and to monitor 26 by a cable 28 as shown in FIG. 2.

The method of the present invention also comprises the step of searching at least one image for the object. This step is shown in block B of FIG. 1. In the present invention, the entire object may be searched. However, in instances where it is known that an identifying feature of an object in question lies in a particular portion of an object, the searching step may comprise searching only a portion of the object. The searching step may be done in any manner, for instance, using an automatically calculated threshold or a user selected threshold. When using an automatically calculated threshold, a histogram as described below, or a co-occurrence matrix as described in Pal and Pal in article entitled "Entropic Thresholding" Signal Processing, Vol 16, 1989, pp 97–108, may be employed.

The ability to automatically threshold an image in order to identify and validate candidate objects makes it possible to perform "on-line" image analysis for monitoring and controlling manufacturing and industrial processes. This capability would not be possible in general if a manual thresholding scheme is used, since the threshold (or thresholds) would have to be adjusted on an image-by-image basis. Performing unsupervised automatic object identification enables the use of image analysis techniques for a wide range of industrial applications. In environments where the background varies unpredictably, where many methods which do not use an automatically calculated threshold fail, the recursive version of the method of the second embodiment, as described below, is particularly powerful.

Figure 4:
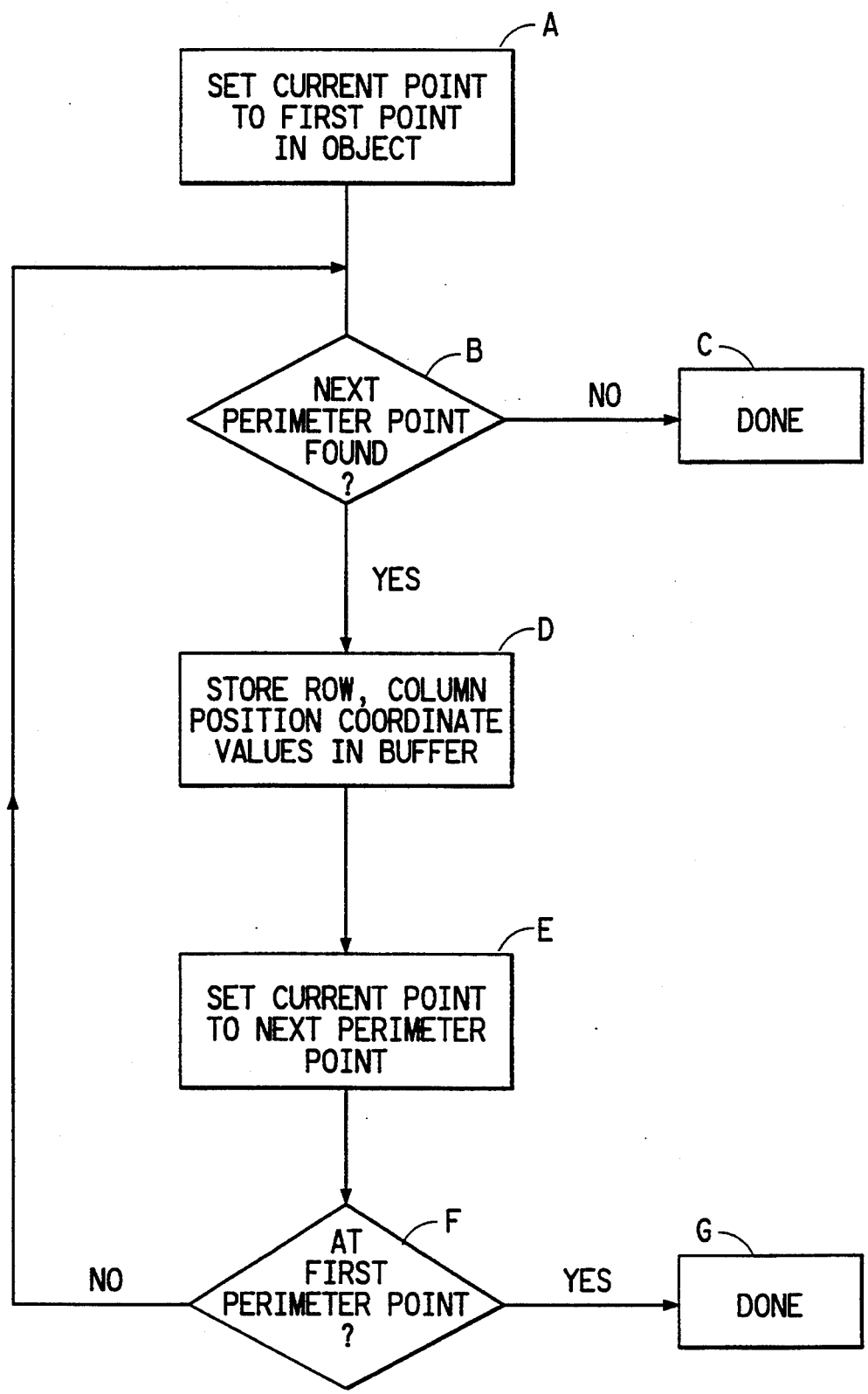
FIG. 4 is a flow chart showing the steps of a module, GET PERIM, for determining the coordinates of each perimeter point of an object.

The method of the first embodiment of the present invention also comprises the step of determining the interior points of the object. This step is shown in block C of FIG. 1. In the preferred embodiment, the step of determining the interior points comprises determining the center of mass of the object. The step of determining the interior points includes the sub-step of determining the perimeter points of the object, which is done by tracing the object. The coordinates of each perimeter point are determined by a module GET PERIM. The steps of GET PERIM are illustrated in FIG. 4. The basic principles of the GET PERIM module are similar to those described in "Digital Image Processing" by Rafael C. Gonzalez and Paul Wintz, Second Ed., Addison-Wesley Publishing Company, Reading, Mass. (1987). In one instance, the step of determining the perimeter points of the object comprises tracing the object sequentially in the clockwise direction. In another instance, the step of determining the perimeter points of the object comprises tracing the object sequentially in the counterclockwise direction.

The sub-step of determining the interior points of an object also comprises the step of creating a perimeter buffer. This step is performed by a module, LOAD BUFFER, as shown specifically in FIGS. 7A and 7B as described below. The perimeter buffer comprises the perimeter points.

Figures 3A, 3B:
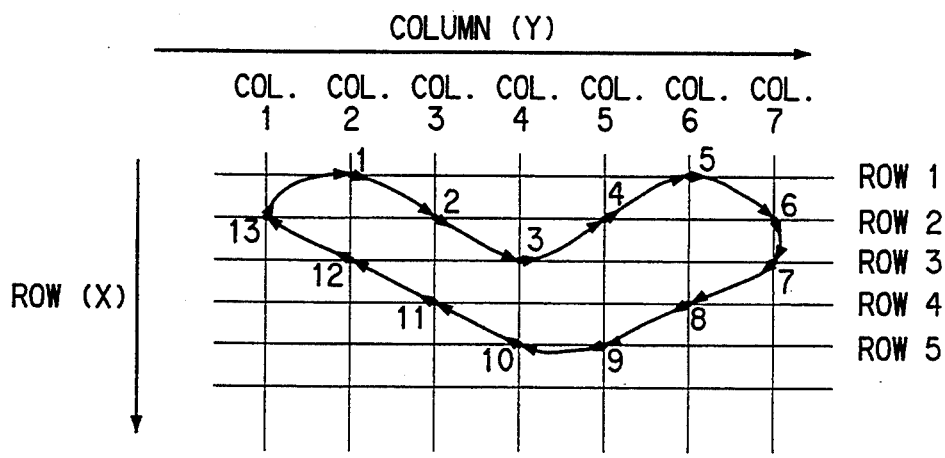
FIG. 3A is a schematic view, with rows and columns designated, which represent the row and column position coordinate values, of a simple object traced in a clockwise direction.
FIG. 3B is a chart showing the row-position coordinate value, the column-position coordinate value and the direction code values for the thirteen points illustrated in FIG. 3A.

FIG. 3A shows a schematic for a simple object traced in a clockwise direction. For purposes of illustration, thirteen perimeter points are shown. Each perimeter point has a row position coordinate value, a column position coordinate value and a direction code vector. The direction code vector comprises a first and a second direction code value for each perimeter point. The first direction code value describes the relationship of each respective perimeter point to the next perimeter point as determined by the GET PERIM module, and the second direction code value describes the relationship of each respective perimeter point to the previous perimeter point, as determined by the GET PERIM module. The definition of "next or previous point" as discussed below, depends on the direction in which the object is traced. The i'th member of the perimeter buffer is denoted by the direction code descriptor $(x_i, y_i,$ vector$_i$), where $x_i$ is the row position coordinate value, $Y_i$ is the column position coordinate value and vector$_i$ is the direction code vector which contains the following information:

(i) next$_i$ is the direction code value to the next perimeter point; and (ii) prev$_i$ is the direction code value from the previous point to the current point.

FIG. 3B is a chart showing the row-position coordinate value, the column-position coordinate value, and the first and second direction code values for the thirteen points illustrated in FIG. 3A. For example, point 13 is denoted as having a row-position coordinate value of 2, a column-position coordinate value of 1, a first direction code value of 1 and a second direction code value of 7.

Figure 6:
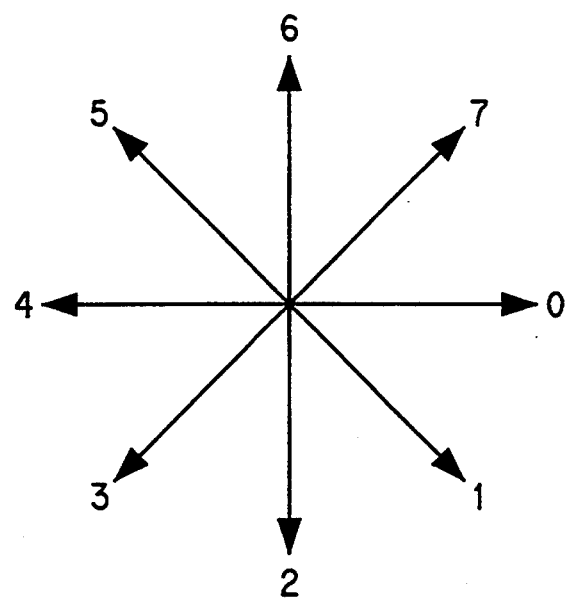
FIG. 6 is a schematic view illustrating the direction code values for an object which is traced in the counterclockwise direction.

In the present invention, the direction code values can range from 0-7, depending on the direction of one perimeter point to an adjacent perimeter point (either the next perimeter point or the previous perimeter point). The direction code values for the present invention are shown in FIGS. 6 and 7. FIG. 7 direction code values are derived by rotating the values illustrated in FIG. 6 by 90°. The application of the set of direction code values as illustrated in FIG. 6 as opposed to the direction code values as illustrated in FIG. 6 is dependent upon the method of sorting the perimeter buffer to be discussed below. As can be seen from FIG. 6, if next$_i$ is equal to zero, the next perimeter point would be vertically above the current perimeter point and in the same column. It is important to realize that the value of a direction code from one perimeter point to the next depends on the sense in which the object is traced by the module GET PERIM. If the object is traced in the clockwise direction, the direction codes associated with the perimeter points are different than if the object is traced in the counterclockwise direction.

The steps of the module GET PERIM are shown in FIG. 4. As illustrated in FIG. 4, block A sets the current point to the first point in the object. Decision diamond B then asks whether the next perimeter point has been found. If not, then the traced object is invalid and the module is done as shown in block C. If the next perimeter point has been found, then the row and column position coordinate values are stored in the perimeter buffer as illustrated in block D of FIG. 4. The current point is set to the next perimeter point as shown in block E of FIG. 4. Decision diamond F then asks whether the current point is at the first perimeter point. If not, then the loop through decision diamond B, blocks C-E and decision diamond F is repeated until the current point is at the first perimeter point. If the answer to decision diamond F is yes, the module GET PERIM is done.

Figure 7A:
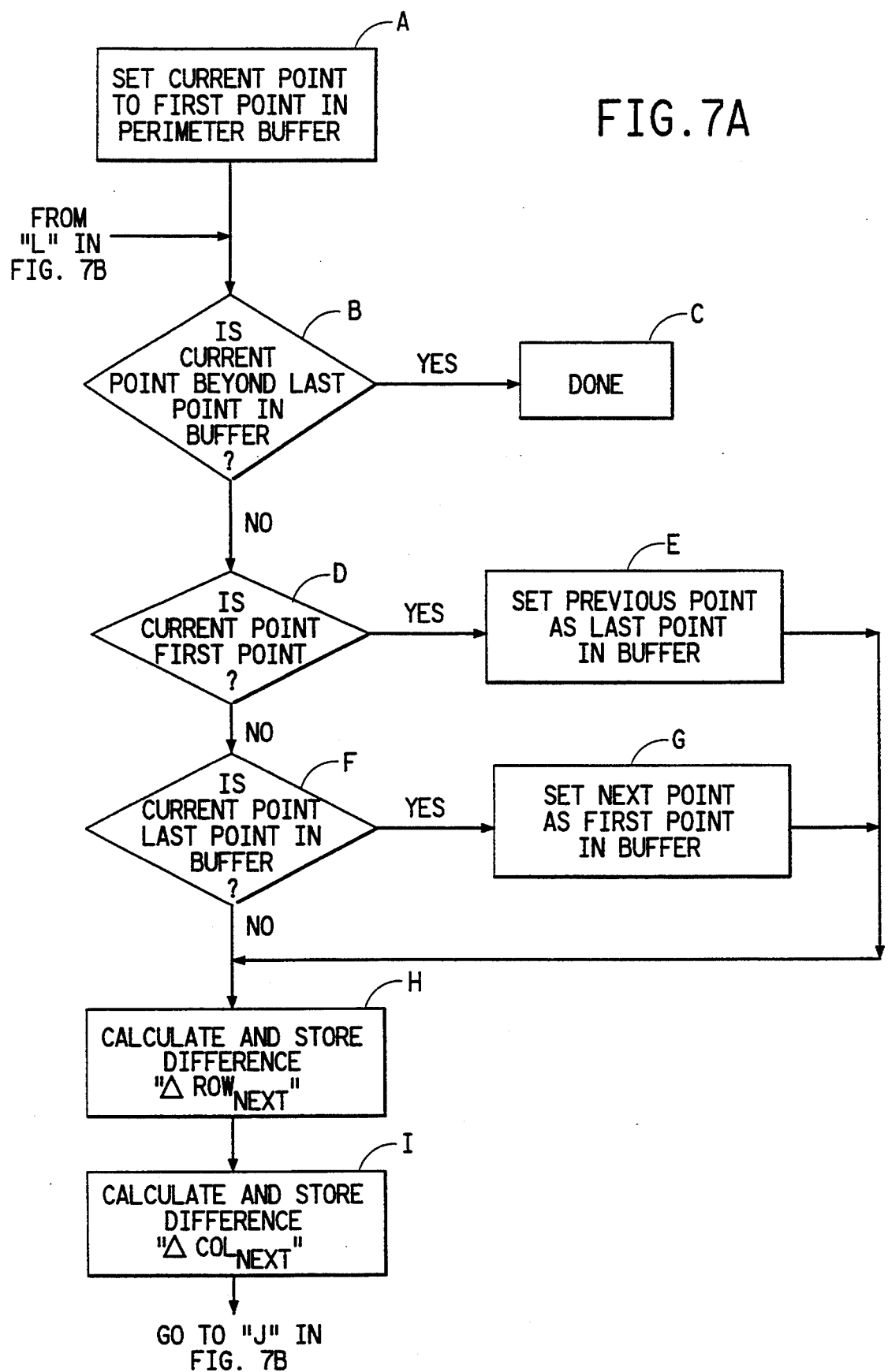
FIGS. 7A and 7B are a flow chart showing the steps of a module, LOAD BUFFER, which creates a perimeter buffer comprising the perimeter points of an object.
Figure 7B:
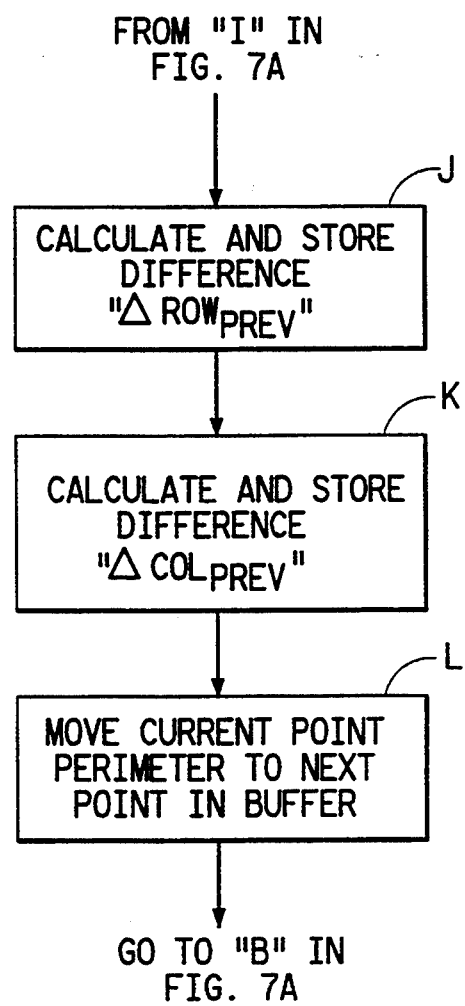

The steps of the module LOAD BUFFER, which creates a perimeter buffer, are illustrated in FIGS. 7A and 7B. In the first step as shown in block A, the current point is set to the first point in the perimeter buffer. Decision diamond B then asks whether the current point is beyond the last point in the buffer. If it is, then the LOAD BUFFER module is done as illustrated in block C of FIG. 7A. If the current point is not beyond the last point in the buffer, then decision diamond D asks if the current point is the first point in the buffer. If it is, then block E sets the previous point as the last point in the buffer. If the current point is not the first point in the buffer, then decision diamond F asks if the current point is the last point in the buffer. If it is, then block G sets the next point as the first point in the buffer. After the previous point is set as the last point in the perimeter buffer or the next point is set as the first point in the perimeter buffer, the difference in the row coordinate value between the next point and the current point is calculated and stored in the buffer as shown in block H in FIG. 7A. This difference is designated as $\Delta\text{ROW}_{NEXT}$. The difference in the column coordinate value between the next point and the current point is then calculated and stored in the buffer as shown in block I in FIG. 7A. This difference is designated as $\Delta\text{COL}_{NEXT}$. The difference in the row coordinate value between the current point and the previous point is then calculated and stored in the buffer as shown in block J in FIG. 7B. This difference is designated as $\Delta\text{ROW}_{PREV}$. Next, the difference in the column coordinate value between the current point and the previous point is calculated and stored in the buffer as shown in block K. This difference is designated as $\Delta\text{COL}_{PREV}$. The current point is then moved to the next perimeter point in the buffer as shown in block L, and the module returns to decision diamond B of FIG. 7A. The loop through B and D-L continues until the current point is beyond the last point in the buffer, at which point the LOAD BUFFER module is done as shown in block C.

The step of determining the interior points of the object also comprises the sub-step of sorting the perimeter points in the perimeter buffer in a predetermined order to create a sorted perimeter buffer. This sorting step is performed for tracing the object in either the clockwise or the counterclockwise direction. This sorting step is performed by the standard "Shell Sort" technique described by Robert Sedgewick in his textbook *Algorithms in C*, Addison Wesley, 1990. It should be noted that the "vector$_i$" information associated with each perimeter point moves with the point during the sort.

In a first implementation of the first embodiment of the present invention, the object is traced in the clockwise direction, and the sorting step comprises the sub-step of sorting the perimeter points in the perimeter buffer by row in a predetermined order to create a row-sorted perimeter buffer comprising at least one row-sorted perimeter point. The sub-step of sorting the perimeter points by row comprises sorting the perimeter points in ascending order such that the points with the lowest row-position coordinate values are placed at the start (meaning the first element of the sequence of the buffer) of the buffer. Alternatively, the sub-step of sorting the perimeter points by row comprises sorting the perimeter points in descending order such that the points with the highest row-position coordinate values are placed at the start of the buffer.

In this implementation of the first embodiment, the sorting step also comprises the additional sub-step of sorting the perimeter points in the row-sorted perimeter buffer by column in a further predetermined order to create a row-column sorted perimeter buffer comprising at least one row-column sorted perimeter point. The sub-step of sorting the perimeter points by column comprises sorting the perimeter points in ascending order. In the case where the buffer has been sorted by row in ascending order and subsequently by column, the point with the lowest column-position coordinate value and the lowest row-position coordinate value is placed at the start of the buffer. In the case where the buffer has been sorted by row in descending order and subsequently by column, the point with the lowest column-position coordinate value and the highest row-position coordinate value is placed at the start of the buffer.

In a second implementation of the first embodiment, the object is traced in the clockwise direction, and the sorting step comprises the sub-step of sorting the perimeter points in the perimeter buffer by column in a predetermined order to create a column-sorted perimeter buffer comprising at least one column-sorted perimeter point. In this implementation, the sorting step comprises the sub-step of sorting the perimeter points in the column-sorted perimeter buffer by row in a predetermined order to create a column-row sorted perimeter buffer comprising at least one column-row sorted perimeter point. The sub-step of sorting the perimeter points by column comprises sorting the perimeter points in ascending order such that the points with the lowest column-position coordinate values are placed at the start of the buffer. Alternatively, the sub-step of sorting the perimeter points by column comprises sorting the perimeter points in descending order such that the points with the highest column-position coordinate values are placed at the start of the buffer.

In this second implementation, the sorting step also comprises the additional sub-step of sorting the perimeter points in the column-sorted buffer by row in a further predetermined order to create a column-row sorted perimeter buffer comprising at least one column-row sorted perimeter point. The sub-step of sorting the perimeter points by row comprises sorting the column-sorted perimeter points in descending order. In the case where the buffer has been sorted by column in ascending order and subsequently by row, the point with the highest row-position coordinate and lowest column-position coordinate is placed at the start of the buffer. In the case where the buffer has been sorted by column in descending order and then by row, the point with the highest row coordinate value and highest column coordinate value is placed at the start of the buffer.

In a third implementation of the first embodiment of the present invention, the object is traced in the counterclockwise direction, and the sorting step comprises the sub-step of sorting the perimeter points in the perimeter buffer by row in a predetermined order to create a row-sorted perimeter buffer comprising at least one row-sorted perimeter point. The sub-step of sorting the perimeter points by row comprises sorting the perimeter points in ascending order such that the points with the lowest row-position coordinate values are placed at the start of the buffer. Alternatively, the sub-step of sorting the perimeter points by row comprises sorting the perimeter points in descending order such that the points with the highest row-position coordinate values are placed at the start of the buffer.

In this third implementation, the sorting step also comprises the additional sub-step of sorting the perimeter points in the row-sorted perimeter buffer by column in a further predetermined order to create a row-column sorted perimeter buffer comprising at least one row-column sorted perimeter point. The sub-step of sorting the row-sorted perimeter points by column comprises sorting the perimeter points in descending order. In the case where the buffer has been sorted first by row in ascending order and subsequently by column, the point with the highest column-position coordinate and lowest row-position coordinate is placed at the start of the buffer. In the case where the buffer has been sorted first by row in descending order and then by column, the point with the highest column-position coordinate and highest row-position coordinate is placed at the start of the buffer.

In a fourth implementation of the first embodiment of the present invention, the object is traced in a counterclockwise direction, and the sorting step comprises the sub-step of sorting the perimeter points in the perimeter buffer by column in a predetermined order to create a column-sorted perimeter buffer comprising at least one column.-sorted perimeter point. The sub-step of sorting the perimeter points by column comprises sorting the perimeter points in ascending order such that the points with the lowest column-position coordinate values are placed at the start of the buffer. Alternatively, the sub-step of sorting the perimeter points by column comprises sorting the perimeter points in descending order such that the points with the highest column-position coordinate values are placed at the start of the buffer.

In this fourth implementation, the sorting step also comprises the additional sub-step of the sorting of the perimeter points in a column-sorted perimeter buffer by row in a further predetermined order to create a column-row sorted perimeter buffer comprising at least one column-row sorted perimeter point. The sub-step of sorting the perimeter points by row in the column-sorted buffer comprises sorting the perimeter points in ascending order. In the case where the buffer has been sorted first by column in ascending order and subsequently by row, the point with the lowest row-position coordinate value and lowest column-position coordinate value is placed at the start of the buffer. In the case where the buffer has been sorted first by column in descending order and subsequently by row, the point with the lowest row-position coordinate value and highest-column position coordinate value is placed at the start of the buffer.

Figure 5:
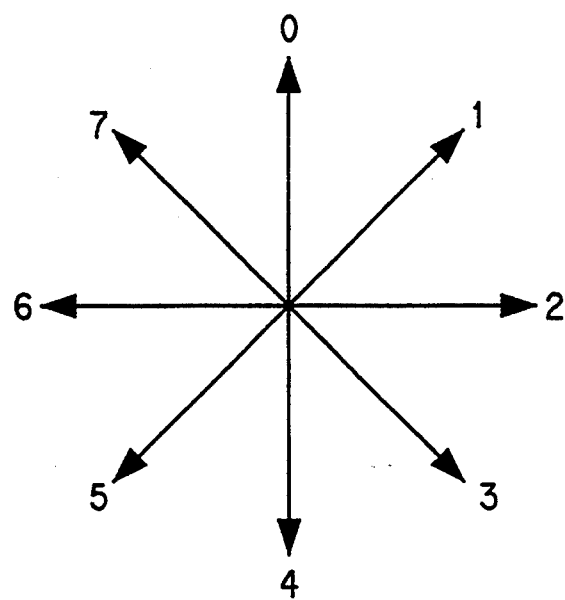
FIG. 5 is a schematic view illustrating the direction code values for an object which is traced in the clockwise direction.

The step of determining the interior points of the object also comprises the sub-step of assigning to each perimeter point a status variable having one of a first and a second value. This step is performed in a module, READ COLOR, part of which is shown in the flow chart of FIG. 8, and part of which is shown in the flow chart of FIGS. 11A and 11B. The first value of the status variable is "FILL" and the second value of the status variable is "NO FILL". The value of the status variable is determined by the first and second direction code values $next_i$ and $prev_i$. Direction code values are determined in accordance with FIGS. 5 and 6, depending on the method of sorting the perimeter buffer which is employed. If the points in the perimeter buffer are sorted first by row and then by column, such as in the first and third implementations of the first embodiment, the direction code values in FIG. 5 are employed. If the points in the perimeter buffer are sorted first by column and then by row, such as in the second and fourth implementations of the first embodiment, then the direction code values illustrated in FIG. 6 are used. The rules for mapping $next_i$ and $prev_i$ to FILL or NO FILL are summarized for objects traced in a clockwise direction in a FILL look-up table (LUT) as shown in FIG. 9. The rules for mapping $next_i$ and $prev_i$ to FILL or NO FILL are summarized for objects traced in a counterclockwise direction in a FILL look-up table (LUT) as shown in FIG. 10. In the look up tables of FIGS. 10 and 11, F stands for FILL and NF stands for NO FILL. The look-up tables of FIGS. 9 and 10 are empirically derived, based on the local concavity or convexity of the object.

Figure 8:
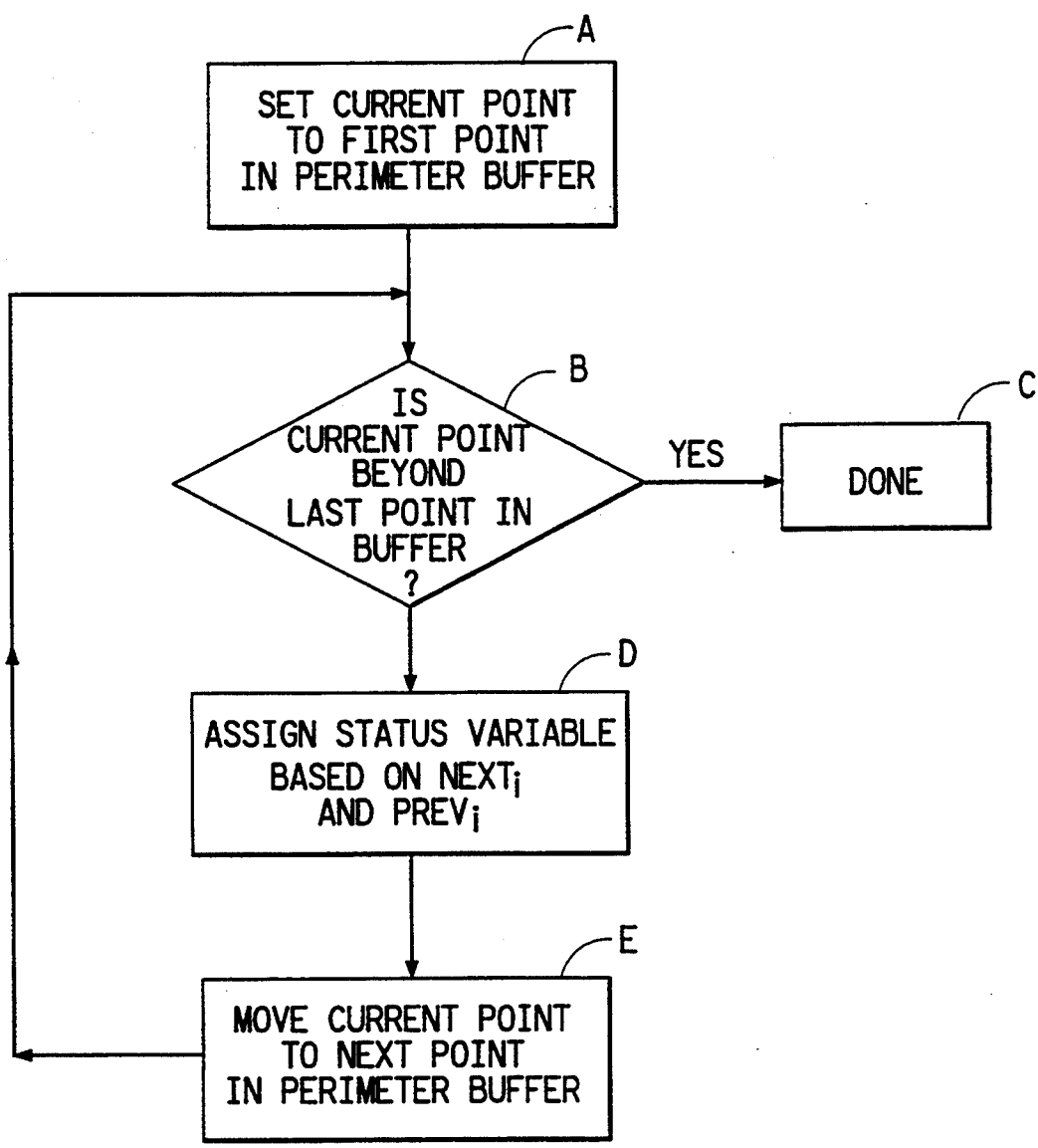
FIG. 8 is a flow chart showing the steps of part of a module, READ COLOR, which assigns a status variable to each perimeter point.

As shown in block A of FIG. 8, the current point is set to the first point in the perimeter buffer. Decision diamond B then asks if the current point is beyond the last point in the buffer. If so, then the module is done as shown in block C. Using the look-up-table as shown in FIG. 9, the value of the status variable is assigned based on the first and second direction code values, $next_i$ and $prev_i$ as shown in block D of FIG. 8. The current point is then moved to the next point in the perimeter buffer as shown in block E of FIG. 8. The loop through decision diamond B and blocks D and E is repeated until the current point is beyond the last point in the buffer, at which point the part of READ COLOR as shown in FIG. 8 is done, as shown in block C.

Figure 11A:
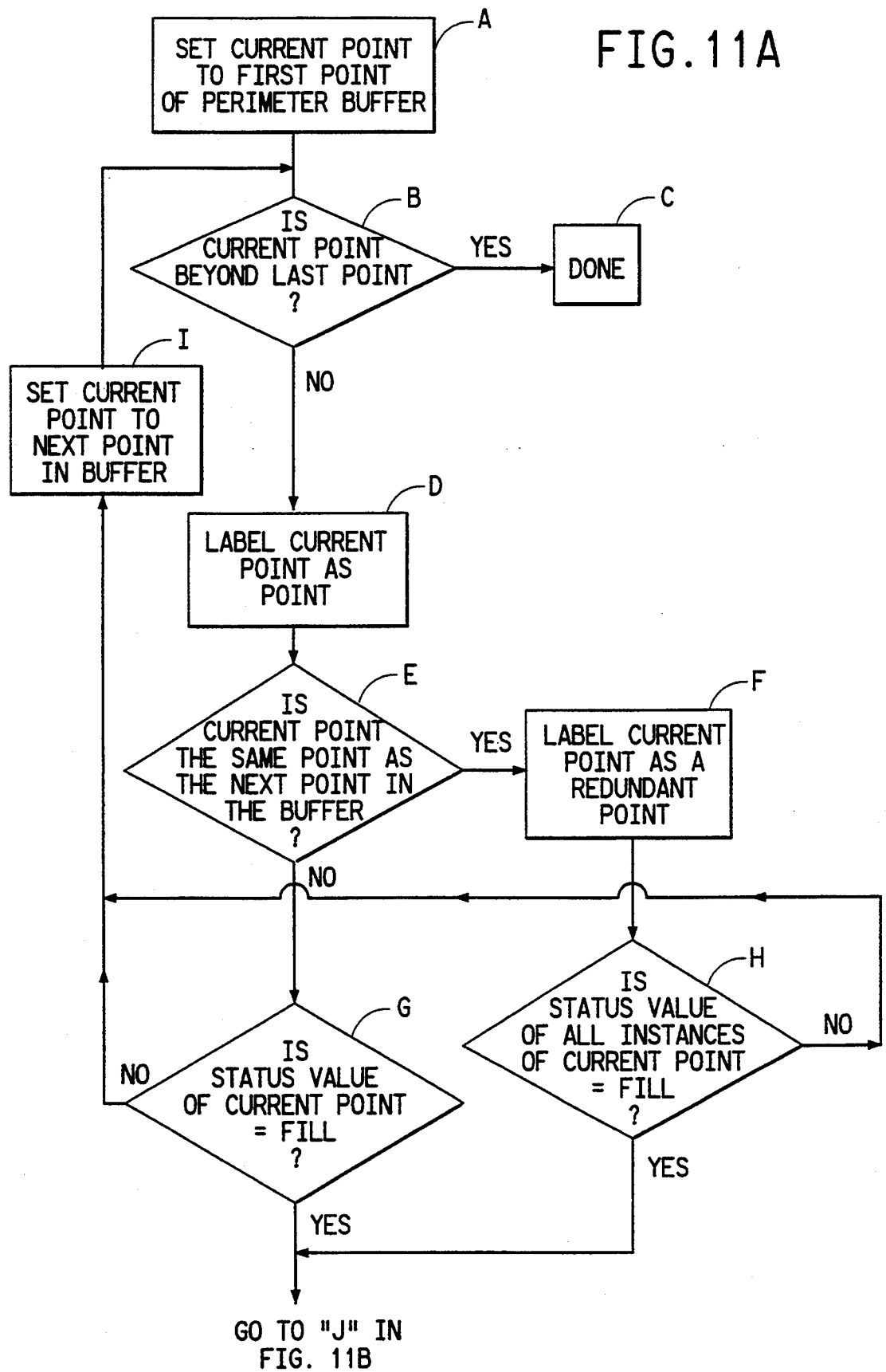
FIGS. 11A and 11B are a flow chart showing the steps of part of the module READ COLOR for the implementation of the first embodiment of the present invention where the perimeter points in the perimeter buffer are first sorted by row, and then by column.
Figure 11B:
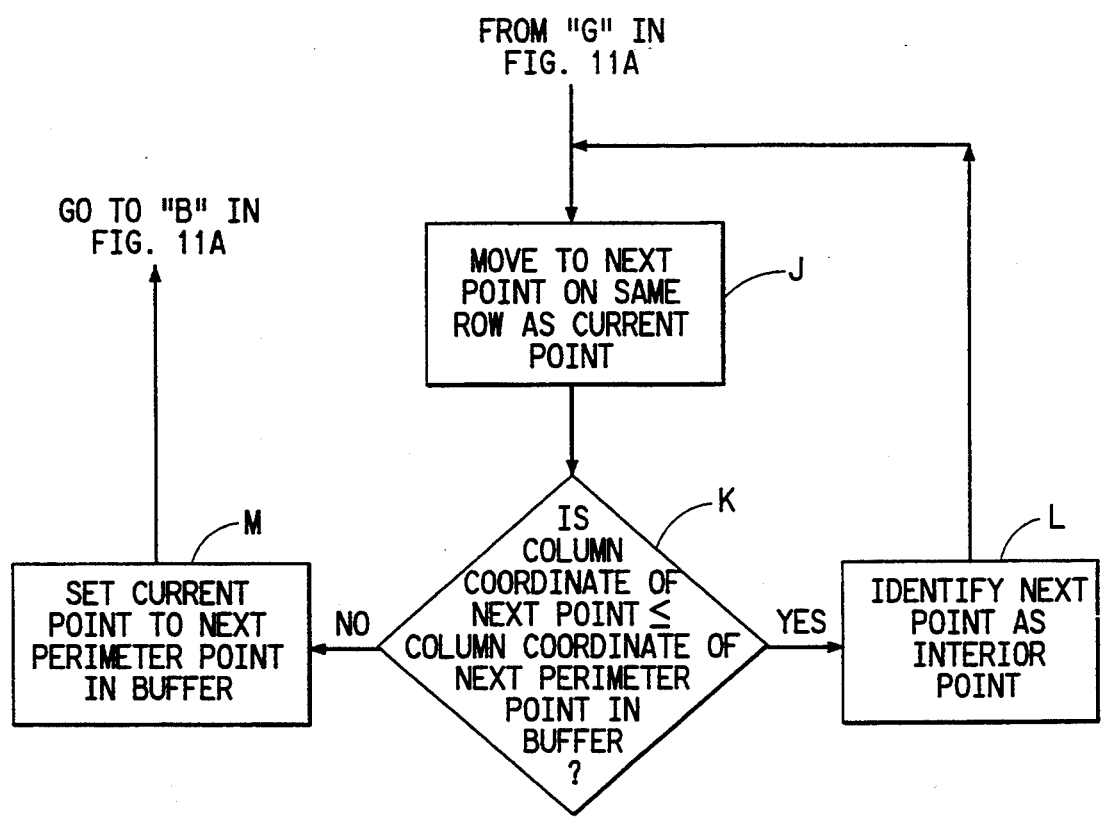
Figure 12A:
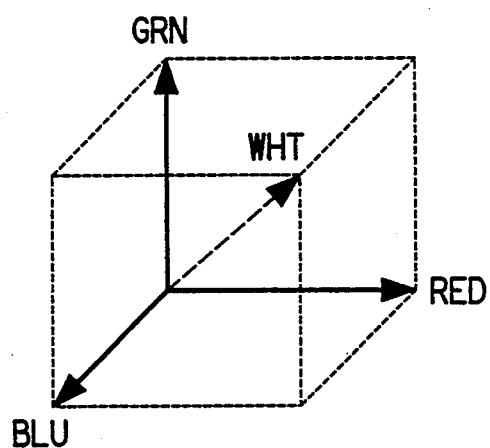
FIG. 12A is a schematic diagram showing a Red-Green-Blue color space.
Figure 12B:
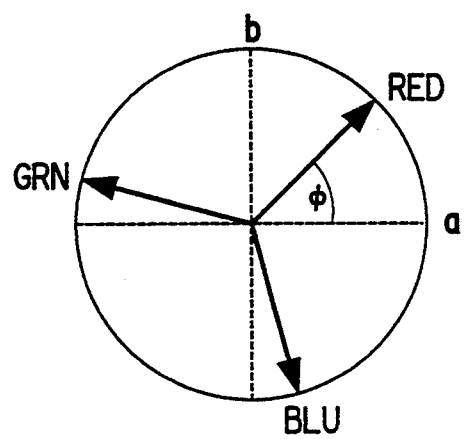
FIG. 12B is a schematic diagram showing a Red-Green-Blue hue circle.

The step of determining the interior points of the object further comprises the sub-step of designating as the interior points of the object each point on the same line segment as the perimeter point being examined and lying between the examined perimeter point and the next perimeter point in the sorted perimeter buffer, where the examined perimeter point is assigned the first value, FILL, of the status variable. This step is performed in the module READ COLOR. The flow chart for the first implementation of the first embodiment of the present invention is illustrated in FIGS. 11A and 11B, it being understood that analogous flow charts exist for the second, third and fourth implementations. In the first and third implementations, where the perimeter points in the perimeter buffer are first sorted by row, then by column, the designating sub-step comprises the sub-step of designating as the interior points of the object each point on the same row as the perimeter point being examined and lying between the examined perimeter point and the next perimeter point in the row-column sorted perimeter buffer. In the second and fourth implementations, where the perimeter points in the perimeter buffer are first sorted by column, then by row, the designating sub-step comprises the sub-step of designating as the interior point of the object each point on the same column as the perimeter point being examined and lying between the examined perimeter point and the next perimeter point in the column-row sorted perimeter buffer.

The step of determining the interior points of the object further comprises the step of checking for redundant perimeter points. This step is performed by the part of READ COLOR illustrated in FIG. 11A in decision diamond E and block F, as will be described below. A redundant perimeter point is one which has been accessed or traversed more than once during the sequential tracing of the object. For example, this could occur at crossover points, which is a point which has been crossed over more than once during the tracing step. When this redundant interior point checking is performed, the step of designating all points lying between each redundant perimeter point and the next perimeter point on the same line segment as the interior points of the object occurs only when all instances of each redundant perimeter point are assigned the first value of the status variable (FILL).

The first step of the part of READ COLOR shown in FIG. 11A which is run for the first implementation of the first embodiment is to set the current point to the first point of the perimeter buffer, as shown in block A of FIG. 11A. Decision diamond B then asks whether the current point is beyond the last point of the perimeter buffer. If so, the module is done as shown in block C. If the current point is not beyond the last point, then the current point is labeled as an interior point as shown in block D. Then decision diamond E asks whether the current point is the same point as the next point in the buffer. If it is, then the current point is labeled as redundant as shown in block F. Then decision diamond H asks if the status variable of all instances of the current point is equal to FILL. If the answer is yes, then READ COLOR moves to the next point on the same row as the current point as shown in block J of FIG. 11A. If the answer is no, the current point is set to the next point in the buffer as shown in block I and the module returns to decision diamond B. Returning to decision diamond E, if the current point is not the same point as the next point in the buffer, then decision diamond G asks if the status value of the current point is equal to FILL. If it is not, the module returns to decision diamond B. The loop through B and D–I continues until the current point is beyond the last point, at which time the part of READ COLOR as shown in FIGS. 11A and 11B is done as shown in block C of FIG. 11A. Returning to decision diamond G, if the status variable of the current point is equal to FILL, the module READ COLOR moves to the next point on the same row as the current point as shown in block J of FIG. 11B. Decision diamond K then asks if the column coordinate of the next point is less than or equal to the column coordinate of the next perimeter point in the perimeter buffer. If it is, then the next point is identified as an interior point as shown in block L. After identifying the interior points of an object as shown in block L of FIG. 11B, the gray level value of each interior point may be determined, and the object may be characterized by using the gray level values as described below. In addition, a predetermined gray level may be assigned to each interior point to label the object. After the next point is identified as the interior point as shown in block L, the loop through block J and diamond K continues until the column coordinate of the next point is greater than the column coordinate of the next perimeter point in the perimeter buffer. Then the current point is set to the next perimeter point in the buffer as shown in block M. The loop through B–M until the current point is beyond the last point in the buffer, at which point the part of READ COLOR as shown in FIGS. 11A and 11B is done, as shown in block C of FIG. 11A.

The method of the first embodiment of the present invention also comprises the step of determining the gray level values of at least one predetermined interior point. This step is shown in block D of FIG. 1. In a preferred embodiment, the step of determining the gray level values comprises determining the gray level values of the center of mass of the object. In another preferred embodiment of the present invention, it may be necessary to determine the gray level values of a plurality of interior points of all of the interior points. For example, the mean hue of all interior points may be used for characterizing the object by color.

The method of the present invention includes the step of calculating at least one color parameter of the predetermined interior point of the object. This step is shown in block E of FIG. 1. By color parameter, it is meant any parameter which is related to the color content of the object. More specifically, three common parameters used in color theory are hue, saturation and lightness as defined in "Color Science, Concepts and Methods, Quantitative Data and Formulae", by G. Wyszecki and W. S. Stile, John Wiley & Sons (1967). Any one color parameter or combination of color parameters could be used to display an object as in the first embodiment, or to identify, characterize and display a valid object as in the second embodiment.

The object may then be characterized according to its color or validated as described below by using the gray level values. The gray level of an interior point may be described using "RGB" information of standard color theory, with R designating red content, G designating green content, and B designating blue content. In addition to characterizing an object by color, it may be further characterized by using the gray level values of the interior points. For example, the object may be characterized by texture. Alternatively, or in addition, the object may be characterized by determining any patterns which are present in the object.

In the preferred embodiment, the step of calculating at least one color parameter comprises calculating the hue angle. A simple way to calculate the hue angle is illustrated respect to FIGS. 13A and 13B. Shown in FIG. 13A is a description of RGB color space, and shown in FIG. 13B is a simplification of that space, known as the RGB hue circle. The value of the hue angle of an object can range from 0°–360°, as it is an angle $\theta$ in the RGB hue circle which is a measure of the relative admixture of red, green and blue colors. The angle, $\phi$ is a selected "offset angle" and is an adjustable parameter which can be optimized for a specific application. The angle $\phi$ is chosen such that for the problem of interest, none of the hue angles of the valid object come too close to 0° to 360°. The reason for avoiding the 0° (or 360°) angle is due to the discontinuity in the value of the hue angle for this angle.

The hue angle of each interior point in an object can be calculated. The hue angle $\theta$ is calculated from the RGB hue circle using the following equations:

$$a = R\cos(\phi) + G\cos(120+\phi) + B\cos(240+\phi) \quad (1)$$

$$b = R\sin(\phi) + G\sin(120+\phi) + B\sin(240+\phi) \quad (2)$$

$$\text{hue angle} = \arctan(b/a) \quad (3)$$

where:

$\phi$ = adjustable offset angle

R = gray level of point in the image when the image is viewed through a red filter.

G = gray level of point in the image when the image is viewed through a green filter.

B = gray level of point in the image when the image is viewed through a blue filter.

a,b = projections of the RGB vector onto the hue circle.

The mean hue angle is derived by averaging the hue angle for each interior point over the object.

In the preferred embodiment, the step of calculating at least one color parameter also comprises calculating the hue magnitude of the center of mass. The hue magnitude is the length of the hue angle vector in the RGB hue circle and is a measure of how much color an object has. The hue magnitude is calculated as:

$$\text{Hue magnitude} = a^2 + b^2 \quad (4)$$

The mean hue angle and the hue magnitude can be used to determine the hue content of an object. These parameters can be used to determine the color of an object and can be compared with predetermined attribute values in order to identify, characterize and display a valid object, as will be fully explained below with respect to the second embodiment.

The method of the first embodiment of the present invention also comprises the step of calculating at least one color parameter index for the predetermined interior point of the object. This step is shown in block F of FIG. 1. In the preferred embodiment, the step of calculating a color parameter index comprises calculating the hue index of the center of mass of each object. Hue index is defined as:

$$\text{Hue index} = \frac{\text{Hue angle of Selected Interior Point}}{\Delta} + 0.5 \quad (5)$$

where:

$$\Delta = \frac{360}{(N_{GRAY} - 1)} \quad (6)$$

and $N_{GRAY}$ is the number of gray level values in a given system. For an eight-bit system, such as a black-and-white imaging board, $N_{GRAY}$ is 256. The hue index is then rounded to the nearest integer, so that it has a value between 0 and $N_{GRAY} - 1$. If the hue index is equal to 0 or 1, it is shifted to 2.

Alternatively, $\Delta$ may be defined as:

$$\Delta = \frac{\text{HUEMAX(calculated)} - \text{HUEMIN(calculated)}}{(N_{GRAY} - 1)} \quad (7)$$

where $\text{HUE}_{MAX}$(calculated) is the calculated maximum hue angle of any object in the image, and $\text{HUE}_{MIN}$(calculated) is the minimum hue angle of any object in the image. This alternative allows the hue index values to span the range of hues contained in the image.

The method of the first embodiment of the present invention also comprises the step of preparing a table of gray level values corresponding to the color parameter index of the predetermined interior point for the object. This step is shown in block G of FIG. 1. In the preferred embodiment, the preparing step comprises preparing a table of gray level values corresponding to the hue index of the center of mass for each object. The table, also known as a display look-up table, is shown for the preferred embodiment in FIGS. 13A–13E. In the display look-up table of FIGS. 13A–E, entry zero was reserved to give the Agar, as used in the Example below, its natural color. Entry one was reserved to give the border (i.e., the region outside the Agar plate) one color. The arrays of Red [0 . . . 255] = Green [0 . . . 255] = Blue [0 . . . 255] were initialized to 0. These arrays contained the RGB content for each entry in the table. For example, if R[0]=255, G[0]=0 and B[0]=0, then the zeroth entry of the output LUT corresponded to bright red. The display look-up table of FIGS. 13A–13E was loaded with the following entries:

Red [hue index] = R (center of mass)
Green [hue index] = G (center of mass)
Blue [hue index] = B (center of mass)

If the entry has already been loaded by a previous object, the decision on whether to over-write the previous entry is based on the value of the hue magnitude. The entry is then loaded with the RGB values of the center of mass of the object having the larger hue magnitude. When used with a typical, commercially available black-and-white processing board, as in FIGS. 13A–13E, the invention provides for the formulation of a 256 gray level value entry display look-up table.

These 256 entries correspond to 256 possible combinations of the gray level information, R, G, B (hue content) of the interior points of an object.

The method of the first embodiment of the present invention also comprises the step of defining an image buffer. This step is shown in block H of FIG. 1. In the image buffer, the gray level at every pixel location initially set to 0, and the locations corresponding to the interior points of the object are assigned the color parameter index of the predetermined interior point. As the interior of the object is scanned by the module READ COLOR as described above with respect to FIGS. 8 and 11A and 11B, the corresponding point is labeled within the buffer image with the value of hue index as determined above. In the preferred embodiment, the step of defining an image buffer comprises defining an image buffer where the locations corresponding to the interior points of the object are assigned the hue index of the center of mass of the object.

The method of the first embodiment of the present invention also comprises the step of copying the image buffer to the monitor to display the object in color corresponding to the color of the predetermined interior point as determined by the table of gray level values of the color parameter index. This step is shown in block I of FIG. 1. In the preferred embodiment, the step of copying the image buffer to the monitor comprises copying the image buffer to the monitor to display the object in a color corresponding to the color of the center of mass of the object as determined by the hue index. The present invention permits customization of the display look-up table for each image. The invention is adaptive in that with each new image, it creates a new pallette of colors derived from the hue information of the interior points, to effect display of an object in its natural color or colors.

In a specific application of the first embodiment of the present invention, the concept of entropic thresholding is employed in searching the image. The concept of entropy in information theory for signal processing was first proposed by Shannon in an article entitled "A Mathematical Theory of Communication" Bell System Technology J., Vol. 27, July 1948, pp. 379-423. Shannon showed that the entropy function:

$$H(p_1, p_2, \ldots, p_n) = -\lambda \sum_{k=1}^{n} p_k \ln p_k \quad (8)$$

uniquely satisfies the following three properties:

(a) $H(p_1, p_2, \ldots p_n)$ is a maximum for:

$$p_k = 1n \text{ for } k = 1, \ldots n; \quad (9)$$

(b) $H(AB) = H(A) + H_A(B)$, where A and B are two finite partitions and $H_A(B)$ is the conditional entropy of partition B given partition A;

$$H(p_1, p_2, \ldots p_n, 0) = H(p_1, p_2, \ldots p_n) \quad (10)$$

In addition, $$H_{max}(1/n, \ldots 1/n) = \ln n \quad (11)$$

The idea of using entropy to analyze a gray level histogram of an image was originally proposed by Pun in an article entitled "Entropic Thresholding, a New Approach", Comp. Graphics and Image Proc., Vol. 16, 1981, pp. 210-239. The entropy analysis of Pun was further refined by Kapur et al. in an article entitled "A New Method for Grey-Level Picture Thresholding Using the Entropy of the Histogram" Comp Graphics and Image. Proc 29, 1985 pp. 273-285. As shown by Pun and refined by Kapur, the concept of entropy can be extended to two dimensions if the gray level histogram of the image is used to define a probability distribution:

$$P_s = f_s/N \text{ for } s = 1, \ldots, N_{gray} \quad (12)$$

where
$f_s$ = frequency of gray level s
N = # pixels in image
$N_{gray}$ = # gray levels It follows that the entropy function of a histogram describing an image with a uniform gray level distribution is at a maximum. The more peaks in the distribution, the lower the entropy.

Figure 14:
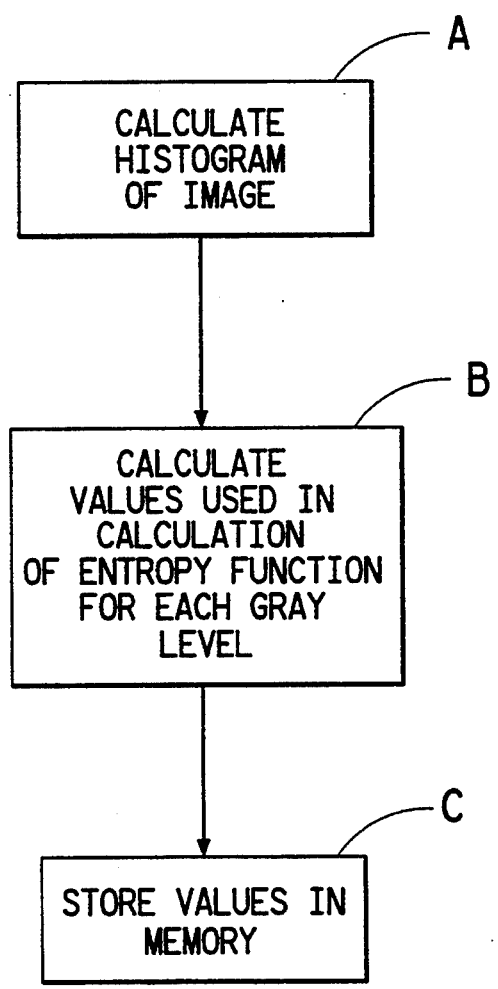
FIG. 14 is a flow chart showing the steps of a module, HISTOGRAM, which is used to generate a gray level histogram of an image according to a specific application of the first embodiment.

In this specific application of the first embodiment, where entropic thresholding is employed, the searching step includes the sub-steps of generating a gray level histogram of the image, where the gray level histogram has an entropy function and entropically selecting a threshold gray level such that the entropy function of the histogram is maximized. A module, HISTOGRAM, is used to generate the gray level histogram of the region of interest of the image. The steps for generating the gray level histogram are shown in the flow chart of FIG. 14. As shown in block A of FIG. 14, HISTOGRAM first calculates a histogram of the region of interest of the image. It then calculates the values to be used subsequently in the calculation of the entropy function, $H_s$, for each gray level, s, as shown in block B of FIG. 14. The results of this calculation are stored in memory as shown in block C. This ensures that for subsequent calculations of the entropic threshold gray level, only a simple look-up operation is required.

Figure 15:
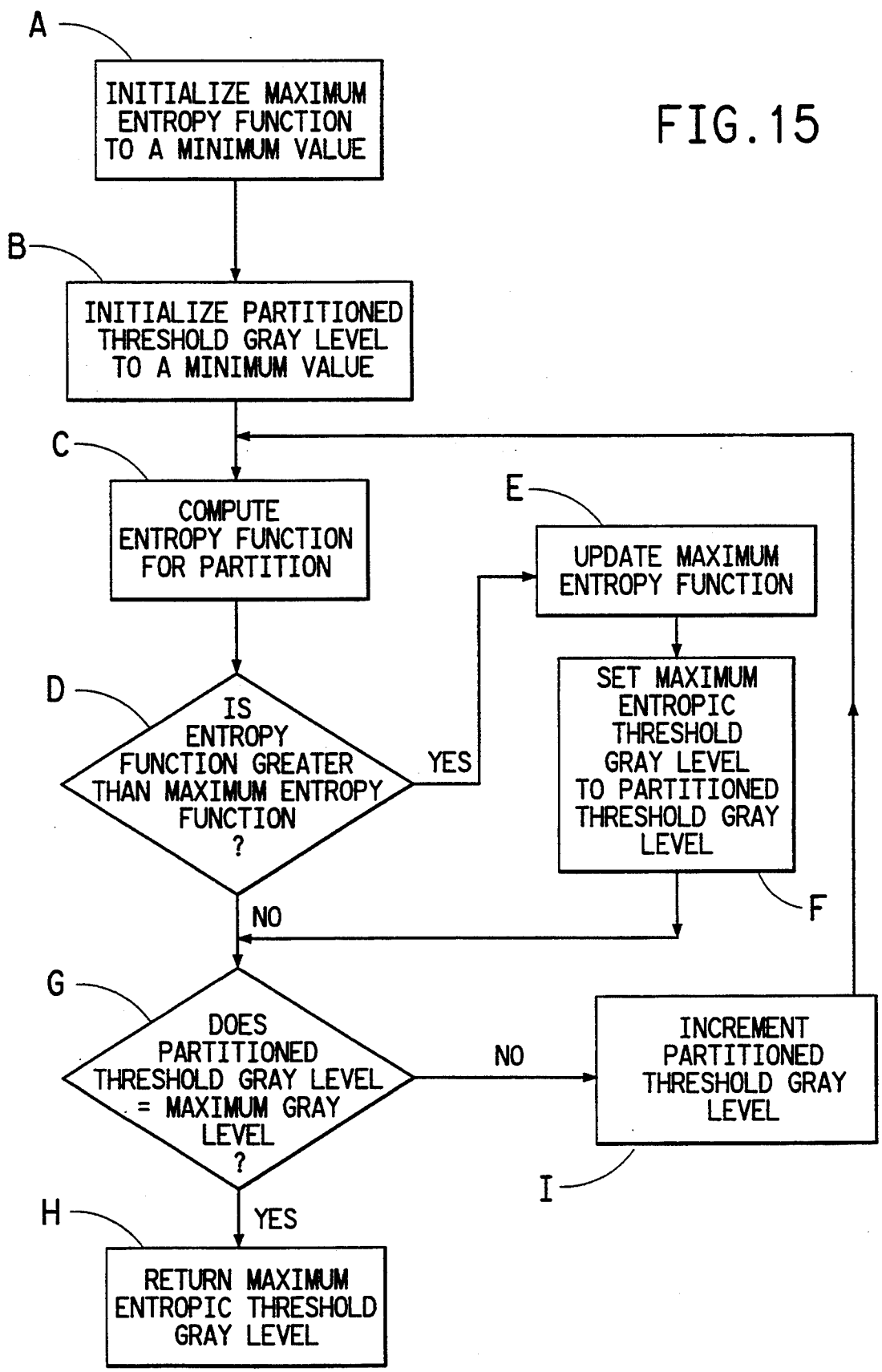
FIG. 15 is a flow chart showing the steps of a module, ENTROPY, which is used to entropically select a threshold gray level such that the entropy function of the histogram is maximized.

The entropic thresholding application of the method according to first embodiment of the present invention also includes the step of entropically selecting a threshold gray level such that the entropy function of the histogram is maximized. This step is performed by the ENTROPY module as shown in FIG. 15. As shown in block A of FIG. 15, the first step in maximizing the entropy function of the histogram is to initialize the maximum entropy function to a minimum value.

Figure 16:
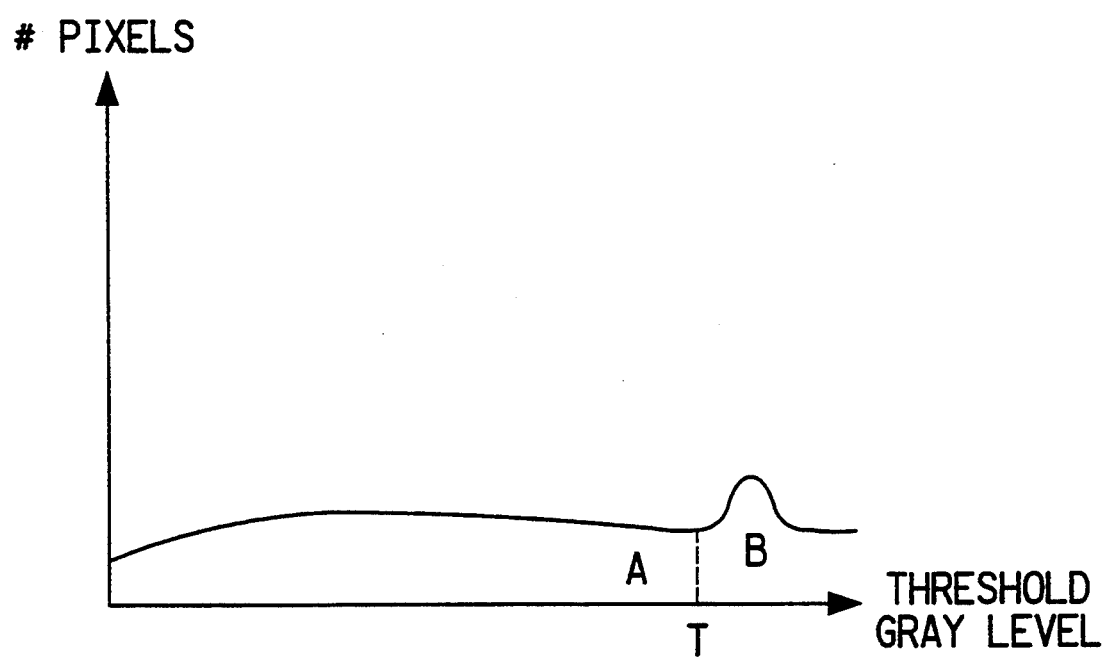
FIG. 16 is a gray level histogram of an image of a single, simple object in a varying background.

The step of entropically selecting a threshold gray level includes the sub-step of sequentially partitioning the gray level histogram at each gray level into a first partition and a second partition. To illustrate the simple case where a single, simple object in a varying background is identified, a gray level histogram of an image is shown in FIG. 16. The first and second partitions are shown in the histogram of FIG. 16, where the gray levels of the background are represented by a first partition A, and the gray levels of the valid object are represented by a second partition B. In the ENTROPY module, the partitioned threshold gray level is initialized to a minimum value as shown in block B of FIG. 15.

The step of entropically selecting a threshold gray level also includes the sub-step of computing the entropy function for each partition, where the total entropy function of the histogram is defined as the sum of the entropy function $H_s(A)$ of first partition, A, and the entropy function $H_s(B)$ of second partition, B. This step is shown in block C of FIG. 15 and is mathematically expressed as follows:

For a given threshold gray level, $s_i$:

$$H_s(A) = -\sum_{i=1}^{s} \frac{p_i}{p_s} \ln\left(\frac{p_i}{p_s}\right) \tag{13}$$

$$\text{with } p_i = \frac{f_i}{N}, \, p_s = \frac{1}{N}\sum_{i=1}^{s} f_i \tag{14}$$

$$\text{Thus, } \frac{p_i}{p_s} = \frac{f_i}{\sum_{i=1}^{s} f_i} = \frac{f_i}{N_s} \text{ with } N_s = \sum_{i=1}^{s} f_i \tag{15}$$

$$\text{So, } H_s(A) = -\sum_{i=1}^{s} \frac{f_i}{N_s} \ln\left(\frac{f_i}{N_s}\right) \tag{16}$$

$$= \frac{-1}{N_s} \sum_{i=1}^{s} f_i \ln f_i + \ln N_s$$

$$\text{Similarly, } H_s(B) = \frac{-1}{N_{s'}} \sum_{i=s+1}^{N_{gray}} f_i \ln f_i + \ln N_{s'} \tag{17}$$

where $N_{s'} = N - N_s$ and $$H_s(A) + H_s(B) = \ln N_s + \ln N_{s'} - \tag{18}$$

$$\frac{1}{N_s} \sum_{i=1}^{s} f_i \ln f_i - \frac{1}{N_{s'}} \sum_{i=s+1}^{N_{gray}} f_i \ln f_i$$

The sum $H_s(A) + H_s(B)$ represents the total entropy function of the gray level histogram of the image. The maximum entropic threshold gray level is the value of s which maximizes the total entropy function.

Decision diamond D of FIG. 15 asks whether the entropy function of the histogram is greater than the maximum entropy function as initialized in block A. If it is, then the maximum entropy function is updated using the partitioned threshold gray level as shown in block E of FIG. 15. The maximum entropic threshold gray level is then set to the partitioned threshold gray level as shown in block F. After the maximum entropic threshold gray level has been set, or if the entropic function of the histogram is not greater than the maximum entropy function, then decision diamond G of the ENTROPY module as illustrated in FIG. 15 asks whether the partitioned threshold gray level equals the maximum threshold gray level. If so, the maximum entropic threshold gray level is returned as shown in block H of FIG. 15. If not, then the partitioned threshold gray level is incremented as illustrated in block I of FIG. 15, and the incremented partitioned threshold gray level is returned to block C, where the entropy function of the incremented, partitioned threshold gray level is computed. The loop through C-G is repeated until the partitioned threshold gray level equals the maximum threshold gray level, at which point the maximum entropic threshold gray level is returned as shown in block H.

The probability distributions are renormalized in $H_s(A)$ and $H_s(B)$ to include only the gray levels within each of the partitions. With this renormalization, the maximum entropy function occurs right at the edge of the object peak in the gray level histogram as shown at T in FIG. 16. Thus, a new threshold gray level is selected such that the entropy function of the histogram is maximized. With this maximum choice of threshold for the simple case as illustrated in FIG. 16, the renormalized distribution of the background becomes the least peaky and the most uniform. The total entropy function of the histogram is dominated by the entropy function of the background, since the number of gray levels in the background partition is much larger than the number of gray levels in the object partition.

In the application of the first embodiment where the entropic threshold gray level is maximized, the searching step further includes the sub-step of scanning the image for at least one object using the entropically selected threshold gray level. More specifically, the portion of the image scanned may comprise a plurality of pixels, and each pixel has a gray level value less than the upper delimiter plus an increment. The upper delimiter also has the notation MAX. The increment is equal to the difference between MAX, the maximum gray level of the region being searched, and MIN, the minimum gray level of the region being searched, resulting in a new maximum gray level, Gray level$_{max}$:

$$\text{Gray level}_{max} = 2 \times \text{MAX} - \text{MIN} \tag{19}$$

Regions in the image where the gray level exceeds gray level$_{max}$ are ignored in the search.

The searching step further includes the sub-step of tracing the object having boundary gray levels determined by the entropically selected threshold gray level. In this application, the searching step is performed by a module SEARCH IMAGE as shown in FIG. 17, a module FIND OBJECT as shown in FIG. 18, and the module GET PERIM as shown in FIG. 4.

Figure 17:
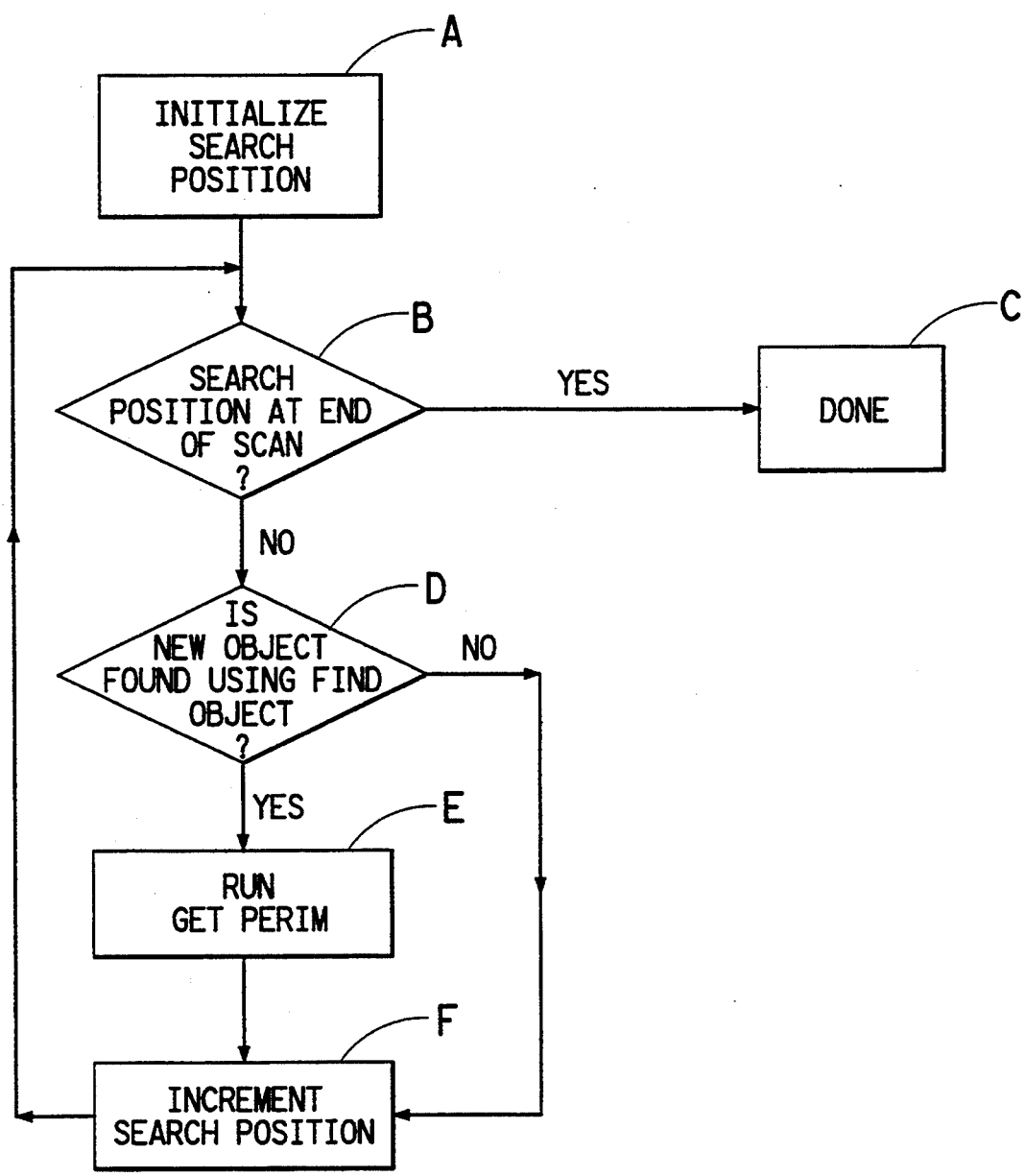
FIG. 17 is flow chart showing the steps of a module, SEARCH IMAGE, which is used to search an image for at least one object.

As illustrated by block A of FIG. 17, the first step is to initialize the search position. The module SEARCH IMAGE searches the region of interest with the current entropically selected threshold gray level. Decision diamond B of FIG. 17 then asks whether the search position is at the end of the scan. If so, SEARCH IMAGE is done.

If the search position is not at the end of the scan, then the module SEARCH IMAGE searches the region of interest with the current entropically selected threshold gray level until it finds a point which has a gray level exceeding the entropically selected threshold gray level using a module FIND OBJECT. To identify objects darker than the background, the image is inverted immediately after it has been generated. Such a point might be the first point of a new object. Decision diamond D of FIG. 16 asks whether a new object has been found using the module FIND OBJECT. If the object has not already been traced in the current search, the module SEARCH IMAGE proceeds to trace the object by running the module GET PERIM, as shown by block E of FIG. 17. The module GET PERIM is described above with respect to FIG. 4. After the object has been traced, the search position is incremented as illustrated in block F of FIG. 17. The loop through B-F is continued until the module SEARCH IMAGE is at the end of the search as indicated by decision diamond B. Alternatively, if a new object has not been found as indicated by decision diamond D, then the search position is incremented as illustrated in block F, thus bypassing the tracing step, and the loop through B-I is continued until SEARCH IMAGE is at the end of the search.

Figure 18:
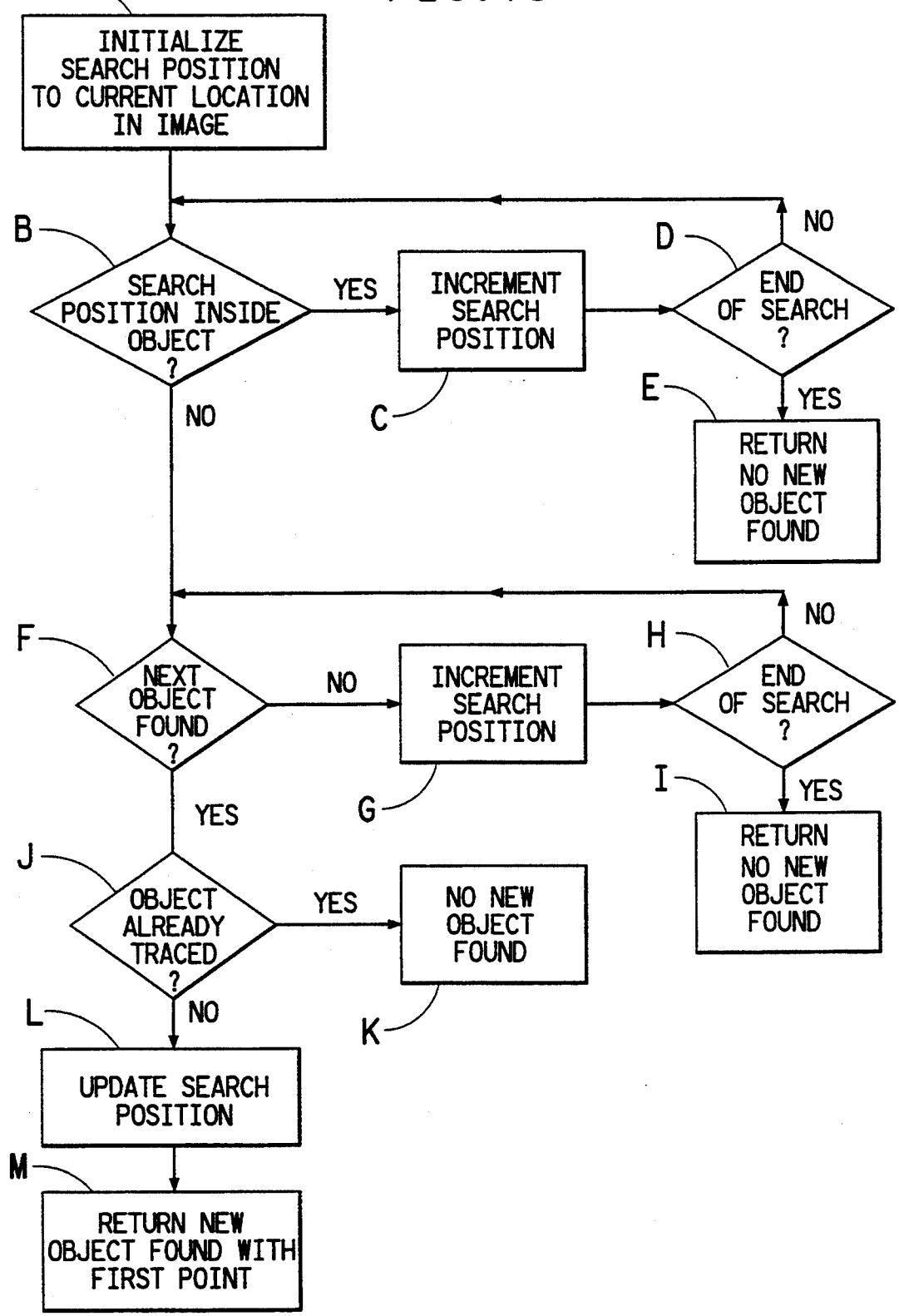
FIG. 18 is a flow chart illustrating the steps of a module, FIND OBJECT, which is also used to search an image.

The steps of the module FIND OBJECT are illustrated in FIG. 18. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether the FIND OBJECT is at the end of its search. If so, then no new object is found as indicated in block E. If not, then decision diamond B asks whether the incremented search position is inside the object. This process of looping through B-E continues until the search position is not inside the object. At this point, decision diamond F asks whether a next object has been found. If not, then the search position is incremented as illustrated in block G of FIG. 17, and decision diamond H asks whether SEARCH IMAGE module is at the end of its search. If so, then no new object found is returned as indicated by block I. If not, then decision diamond F again asks whether a next object has been found using the incremented search position. This process of looping through F-I continues until a next object has been found. Decision diamond J asks whether the object which has been found has already been traced. If so, the new object found is returned as indicated by block K. If the object which has been found has not already been traced, then the search position is updated as illustrated by block L, and a new object found is returned with the first point as indicated by block M of FIG. 18. GET PERIM is then run with the first point as shown in FIG. 4. By running SEARCH IMAGE, FIND OBJECT and GET PERIM as described above, the object returned in block M of FIG. 18 is then traced to determine the interior points thereof.

Figure 19:
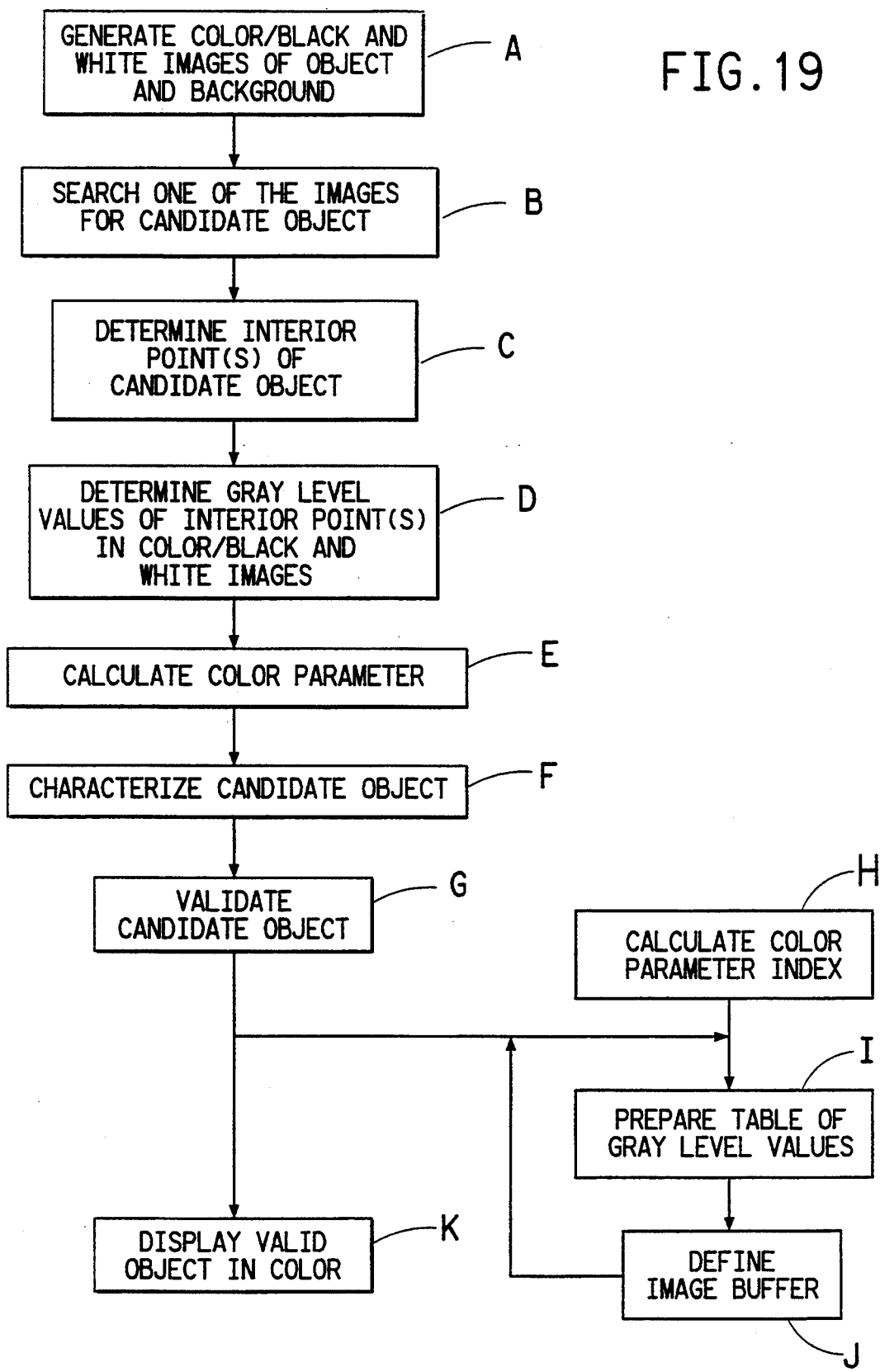
FIG. 19 is a block diagram showing the overall steps of a method according to a second embodiment of the present invention.

In accordance with the second embodiment of the present invention, there is provided a method of identifying, characterizing and displaying by color at least one valid object having at least one predetermined attribute value in a background. FIG. 19 is a block diagram showing the steps of the overall method according to the second embodiment of the present invention. The first step of the method is to generate a plurality of images of a candidate object and the background. This step is shown in block A of FIG. 19. The images are generated with the system as described above with respect to FIG. 2.

As in the first embodiment, each image is one of three primary color images—a red image, a blue image or a green image, or a black-and-white image.

The method of the second embodiment also comprises the step of searching each image for at least one candidate object. This step is shown generally by block B of FIG. 19. As in the first embodiment, the entire object may be searched. However, in instances where it is known that an identifying feature of an object in question lies in a particular portion of an object, the searching step may comprise searching only a portion of the object. Again, as in the first embodiment, the searching step may be done in any manner, for instance, using an automatically calculated threshold or a user selected threshold. When using an automatically calculated threshold, a histogram as described below, or a co-occurrence matrix as described in Pal and Pal, supra, may be employed.

The method of the second embodiment also comprises the step of determining the interior points of the candidate object. This step is shown in block C of FIG. 19. The step of determining at least one interior point includes the sub-steps of determining the perimeter points of the object by tracing the object sequentially. In one instance, the step of determining the perimeter points of the object comprises tracing the object sequentially in the clockwise direction. In another instance, the step of determining the perimeter points of the object comprises tracing the object sequentially in the counter-clockwise direction. The definition of "next" or "previous" point, as discussed above, depends on the direction in which the object is traced.

The step of determining at least one interior point of the candidate object also comprises the sub-step of creating a perimeter buffer. This step is performed in block G of an umbrella module CHECK COLOR, described in FIGS. 20A and 20B below, and more specifically, in a module, LOAD BUFFER, as shown and described with respect to FIGS. 7A and 7B above. The perimeter buffer comprises the perimeter points. The coordinates of each perimeter point are determined by the module GET PERIM as shown and described with respect to FIG. 4 above. The module GET PERIM is run under the umbrella module CHECK COLOR.

The method of the second embodiment also comprises the step of determining the gray level value of at least one predetermined interior point of the candidate object in the at least one image. This step is shown in block D of FIG. 19. The step of determining the gray level value of the interior point may comprise the sub-step of characterizing the object by texture using the gray level values of the at least one predetermined interior point. Alternatively, or in addition, the step of determining the gray level value of the interior point may comprise the sub-step of characterizing the object by at least one pattern in the object using the gray level values of the at least one predetermined interior point. One means of determining texture of an object would be by employing methods disclosed in Haralick, Shanmugan and Dinstein, "Textural Features for Image Classification" IEEE Transactions and Systems, Man, and Cybernetics, Vol. SMC - 3, No. 6, November 1973, pp. 610 –621.

The method of the second embodiment also comprises the step of calculating at least one color parameter for the predetermined interior point of the candidate object. This step is shown in block E of FIG. 19. By color parameter, it is meant any parameter which is related to the color content of the object, as described above with respect to FIGS. 13A and 13B. The step of calculating at least one color parameter may comprise the sub-step of calculating the hue for the predetermined interior point of the candidate object. Alternatively, or in addition, the step of calculating at least one color parameter may comprise the sub-step of calculating the saturation parameter for the interior point of the candidate object. Alternatively, or in addition, the step of calculating at least one color parameter may comprise the sub-step of calculating the lightness parameter for the predetermined interior point of the candidate object.

Figure 20A:
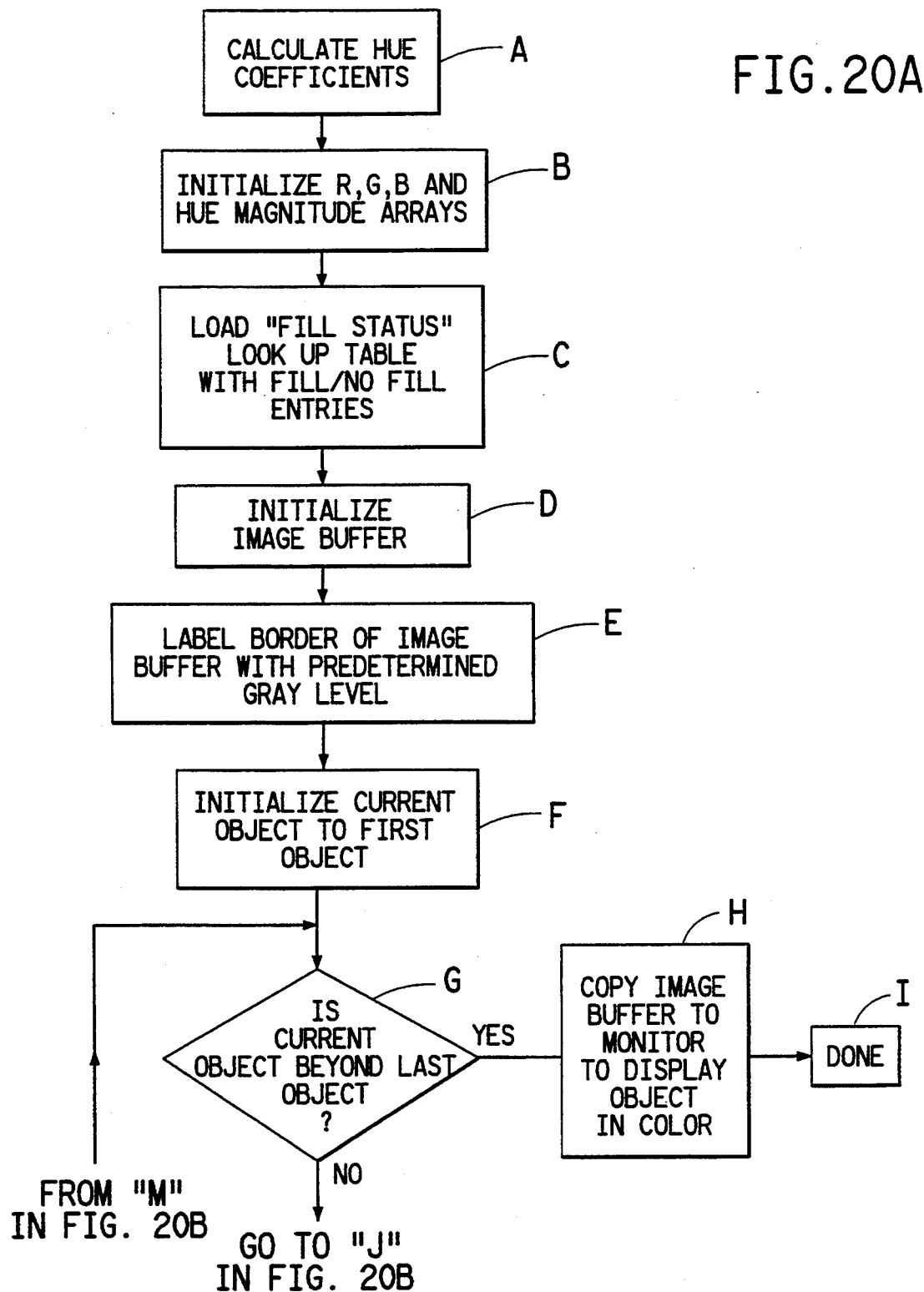
Figure 21A:
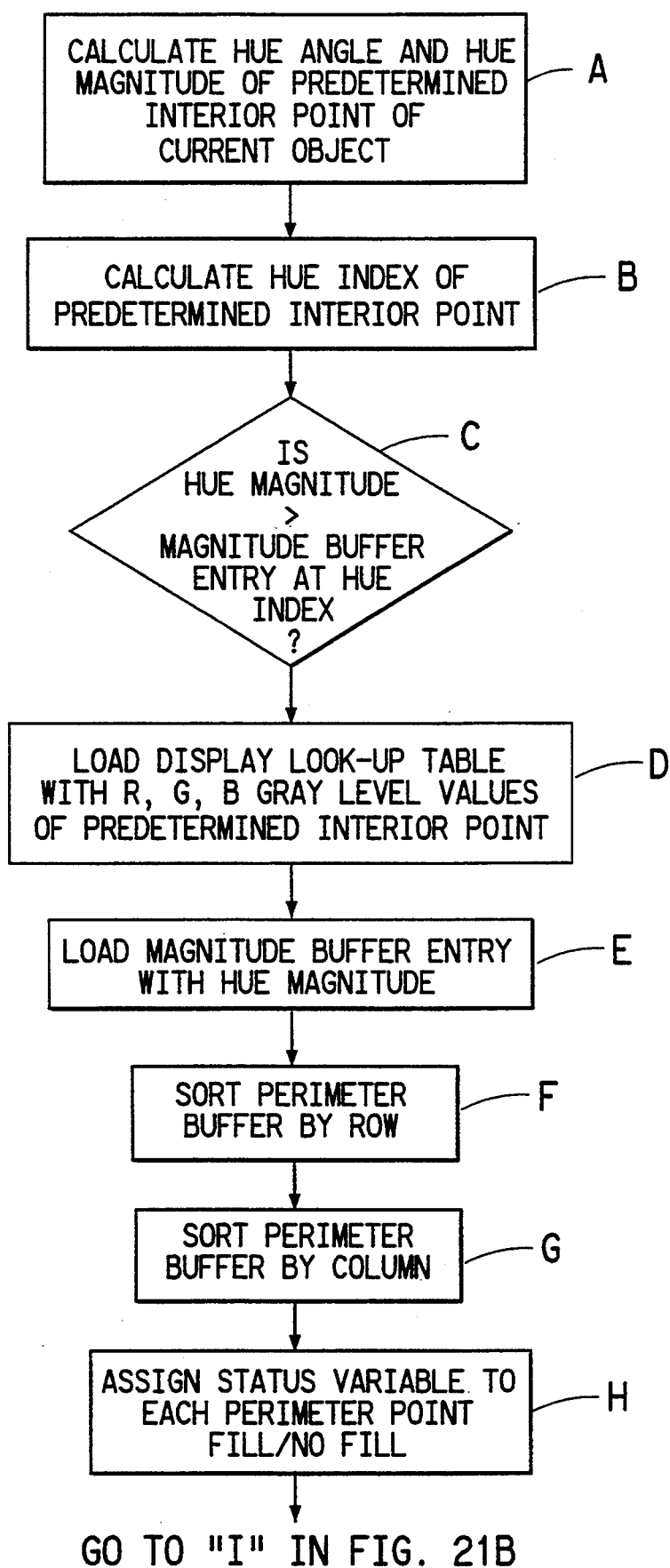
FIGS. 21A and 21B are a flow chart showing the steps of the module, READ COLOR, which calculates the hue index of each predetermined interior point of an object as used with the second embodiment.
Figure 21B:
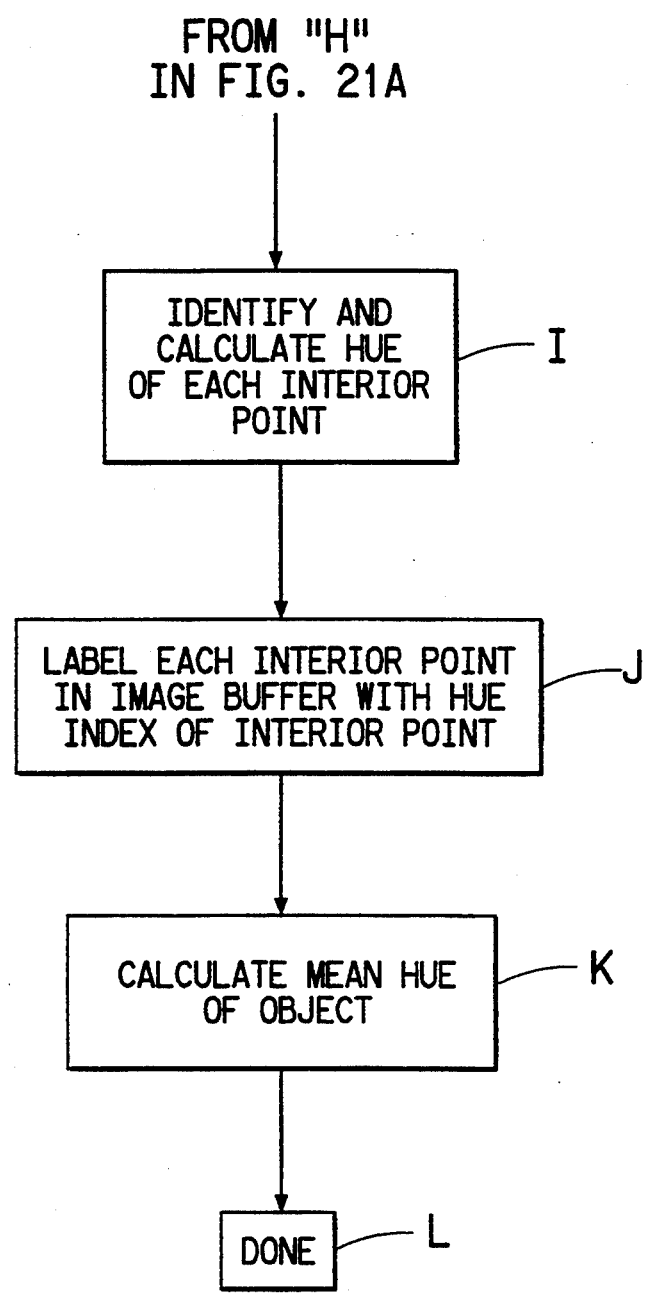

FIGS. 20A and 20B are a flow chart of the umbrella module CHECK COLOR, which is specific to the method of the second application of the second embodiment. CHECK COLOR identifies and characterizes by color a valid object with a predetermined attribute value, which in this case may be color. The module CHECK COLOR is used to perform steps C, D, E, F and H of FIG. 19. The module accesses each candidate object identified in the search of the image and calls upon the module READ COLOR, as shown in FIGS. 21A and 21B, to determine the hue of each candidate object. As shown in block A of FIG. 20A, the first step of CHECK COLOR is to calculate the hue coefficients for projections a, b at a chosen offset angle, $\phi$. The hue coefficients are the factors by which R, G, and B are multiplied in determining projections a and b as described above for equations (1) and (2). Then R, G and B and the hue magnitude arrays are initialized as shown in block B. The "FILL-STATUS" look-up table as shown in FIGS. 9 or 10, depending on the sequence of tracing, is then loaded with FILL/NO FILL entries as shown in block C. The image buffer is then initialized as shown in block D. The border of the image buffer is then labeled with a predetermined gray level value, which is chosen by the user, as shown in block E. The current object is then initialized to the first object as shown in block F in FIG. 20A. As shown in decision diamond G in FIG. 20A, the module CHECK COLOR then asks whether the current object is at the last object. If it is, the image buffer is copied to the monitor to display the object in color as shown in block H, and the module stops running as shown in block I of FIG. 20A. If the current object is not at the last object, then the correct object is traced by GET PERIM to get the perimeter points is shown in block J. The perimeter buffer is then loaded by LOAD BUFFER as described above with respect to FIGS. 7A and 7B with descriptors containing the direction code vector for each perimeter point as shown in block K. The hue angle and the hue index of each interior point in the object and the hue statistics of the object are then calculated as shown in block L by module READ COLOR as described more fully with respect to FIGS. 21A and 21B. The current object is then set to the next object as shown in block M of FIG. 20B. The loop through decision diamond D and blocks F-I is repeated until the current object is beyond the last object, at which point CHECK COLOR is done as shown in block I of FIG. 20A.

FIGS. 21A and 21B are a flow chart showing the steps of the module READ COLOR for calculating the hue of the predetermined interior point of an object. In the second embodiment, the first step of READ COLOR is to calculate the hue angle and the hue magnitude of the predetermined interior point of the current object as shown in block A. In the preferred embodiment, the predetermined interior point is the center of mass. The hue index of each predetermined interior point is then calculated as shown in block B of FIG. 21A. Decision diamond C then asks whether the hue magnitude is greater than the magnitude buffer entry at the hue index. If so, then the display look-up table entry of FIGS. 13A-13E is loaded at hue index with R, G and B gray level values of the predetermined interior point as shown in block D. The magnitude buffer entry is then loaded at hue index with the hue magnitude as shown in block E. The perimeter buffer is then sorted by row as shown in block F, and then by column as shown in block G. Also, if the hue magnitude is not greater than the magnitude buffer entry at the hue index, the perimeter buffer is sorted by row as shown in block F. The status variable, FILL or NO-FILL, is then assigned to each perimeter point as shown in block H of FIG. 21A and more specifically as shown and described with respect to FIG. 8. The predetermined interior point is then determined, and the hue of the predetermined interior point is calculated as shown in block I and described more fully below with reference to FIG. 22 in a module, CALC HUE. Each interior point is then labeled with the hue index of the predetermined interior point as shown in block J of FIG. 21B. The mean hue of the object is then calculated as shown in block K. The module READ COLOR is then done as shown in block L.

Figure 22:
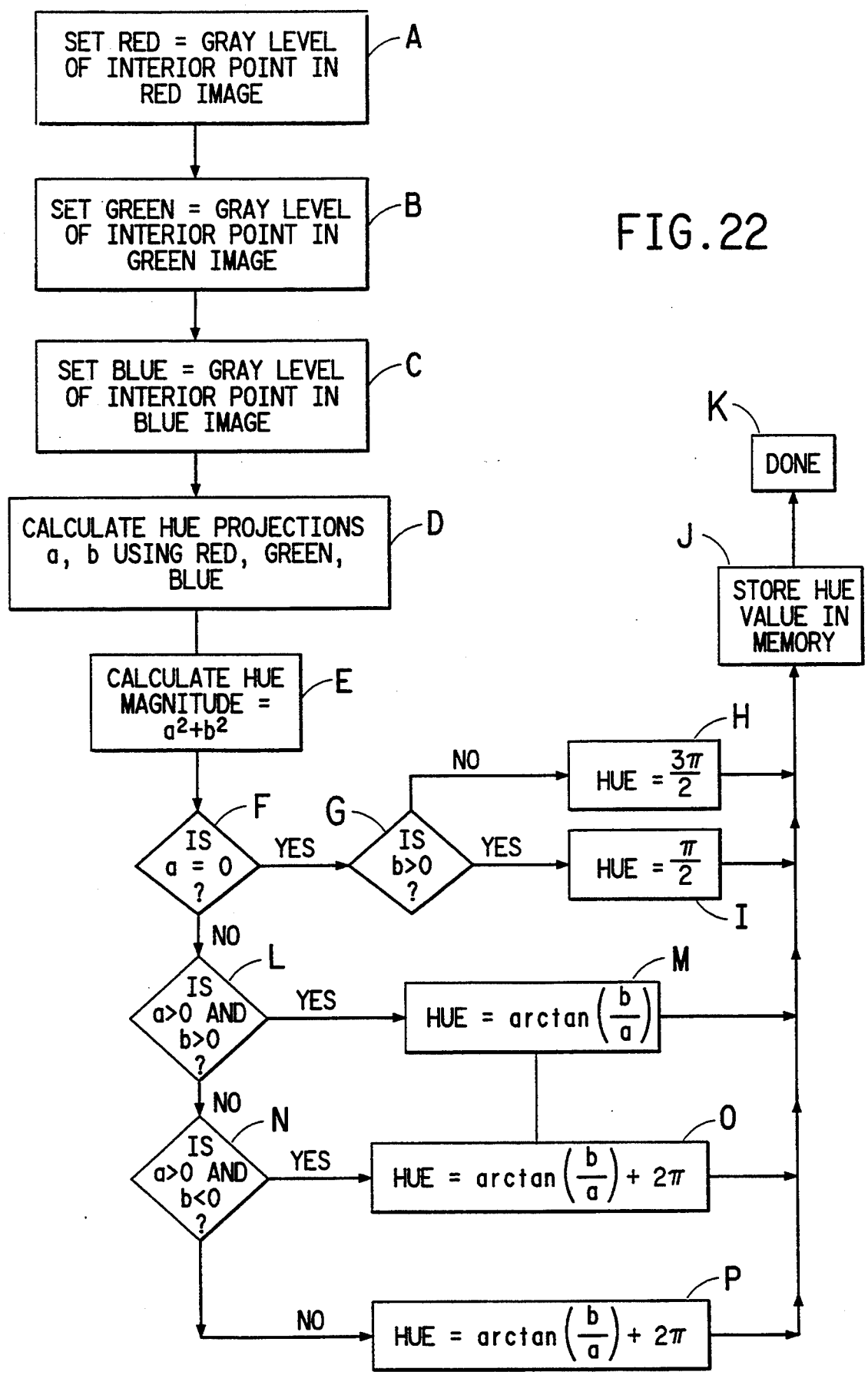
FIG. 22 is a flow chart showing the steps of a module, CALC HUE, which calculates the hue angle and the hue magnitude of each predetermined interior point of an object as used with the second embodiment.

FIG. 22 is a flow chart showing the steps of the module, CALC HUE, which is used in the module READ COLOR. As shown in block A of FIG. 22, the first step in the module CALC HUE is to set red (R) equal to the gray level of the interior point in the red image, the image acquired through a red filter. The next step of the module CALC HUE, as shown in block B, is to set green (G) equal to the gray level of the interior point in the green image, the image acquired through a green filter. The next step in the module CALC HUE is to set blue (B) equal to the gray level of the interior point in the blue image, the image acquired through the blue filter as shown in block C. The next step is to calculate the hue projections a and b, given by equations (1) and (2) above, respectively, using the values of red, green and blue as shown in block D. Then, as shown in block E, the hue magnitude, which is equal to $a^2+b^2$ is calculated. Then decision diamond F asks whether a is equal to zero. If it is, then decision diamond G asks whether b is greater than zero. If it is not, then the hue is set equal to $3\pi/2$ as shown in block H, the hue value is stored in a memory as shown in block J, and the module is done as shown in block K. Returning to decision diamond F, if b is greater than zero, then the hue is set equal to $\pi/2$ as shown in block I, the hue value is stored in a memory as shown in block J, and the module is done as shown in block K. Returning to decision diamond F, if a is not equal to zero, then decision diamond L asks whether a is greater than zero and b is greater than zero. If the answer to both these questions is yes, then the hue is set equal to arctan (b/a) as shown in block M, the hue value is stored in the memory as shown in block J, and the module is done as shown in block K. Returning to decision diamond L, if a is not greater than zero, and b is not greater than zero, then decision diamond N asks whether a is greater than zero and b is less than zero. If the answer to both these questions is yes, then the hue is set equal to arctan(b/a)+$2\pi$ as shown in block O, the hue value is stored in the memory as shown in block J, and the module is done as shown in block K. Returning to decision diamond N, if a is not greater than zero and b is not less than zero, then the hue is set equal to the arctan(b/a)+$2\pi$ as shown in block P, the hue value is stored in the memory as shown in block J, and the module is done as shown in block K.

The method of the second embodiment also comprises the step of characterizing the candidate object by the color parameter. This step is shown in block F of FIG. 19. The characterizing step may comprise determining the texture of the object. Alternatively, or additionally, the characterizing step may comprise determining the color of the object. Alternatively, or additionally, the characterizing step may comprise determining any patterns which are present in the object.

The method of the second embodiment also comprises the step of validating the candidate object having the valid object predetermined attribute value to identify the valid object. This step is shown in block G of FIG. 19. The predetermined attribute value may be the color parameter. However, it could be area, shape, size, etc. The validating step comprises the sub-step of validating the candidate object having at least one valid object color parameter. This valid object color parameter could be other than hue, saturation or lightness.

Figure 23:
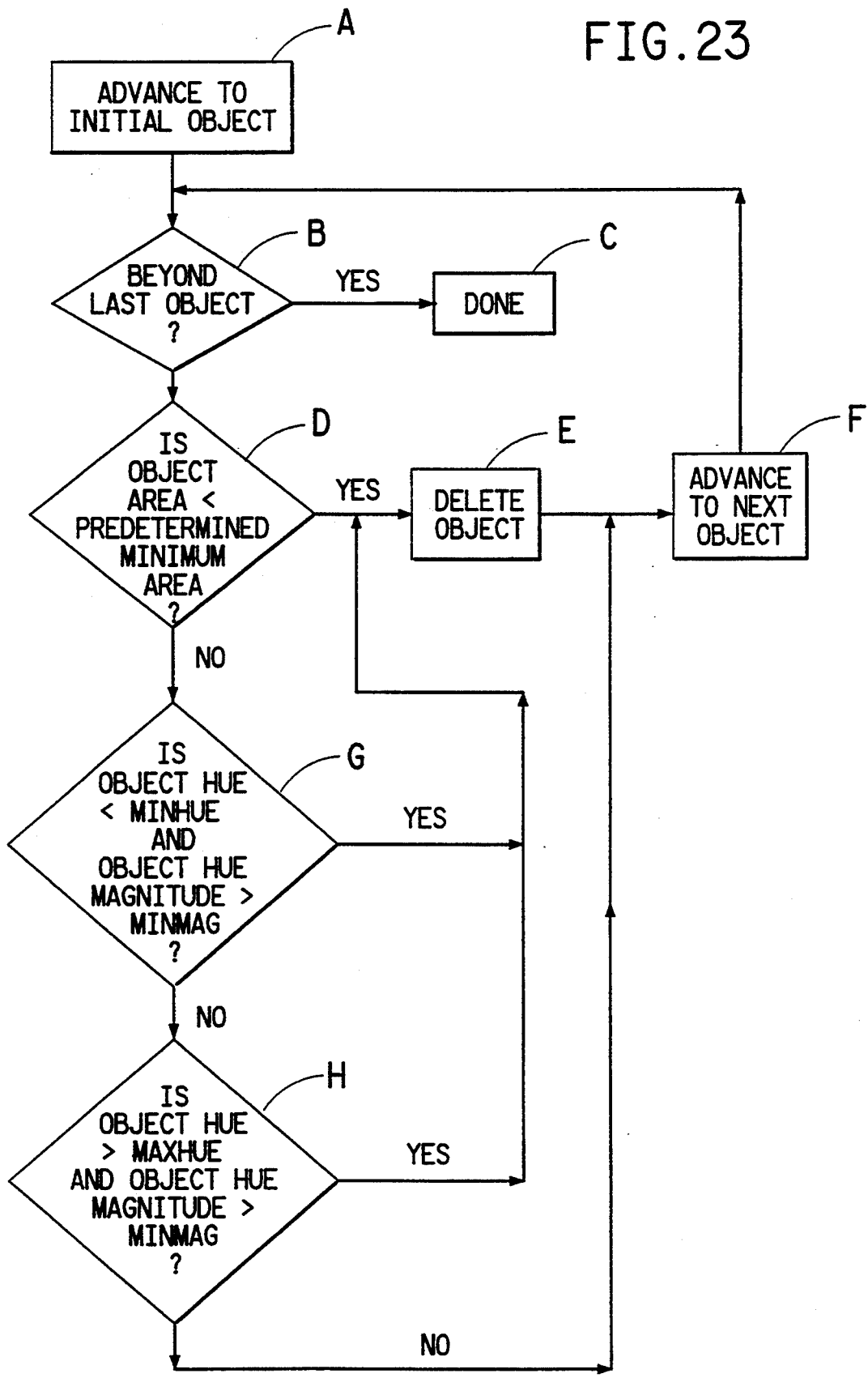
FIG. 23 is a flow chart showing the overall steps of a module, COL FILT, which is used to filter objects.

The validating step includes the sub-steps of calculating the candidate object attribute values and comparing the candidate object attribute values to the valid object predetermined attribute values to validate candidate objects. The calculating sub-step further includes the sub-step of storing the candidate object attribute values. One way to validate objects is to use size and color as attribute values. When this validation scheme is followed, a module, COL FILT, as shown and described with respect to FIG. 23, is used to perform the validation step. In general, other attribute values may be used for the valid object predetermined attribute values.

The validating step is performed by a module COL FILT as shown and described with respect to FIG. 23. When color is used as a predetermined attribute value, the module COL FILT is used for validation based on the hue angle and hue magnitude of an object. The validation step includes the sub-steps of calculating the candidate object attribute values and comparing the candidate object attribute values to validate candidate objects. The method of the second embodiment employs a driver and a kernel for validating candidate objects.

The method of the second embodiment of the present invention employs a driver and a kernel for validating candidate objects. The driver stores the attribute values of the valid object, where each value represents the definition of a valid object, e.g., color, edge contrast, area, shape, etc. The driver of the present invention is specific to a given application. In an object-oriented environment, it is straight-forward in many instances to describe an object via a list of attributes such as size, shape, color, etc. For more complex objects, where a simple parametric description might not be possible, one could use a neural network in the driver to identify the object. Parameters derived from the candidate object can be fed into the neural network, which has been trained to recognize specific objects. At this point, the architecture of the present invention begins to resemble a neural vision architecture where there is a feedback loop between the brain and the eye. In the present invention, a high-order driver is intertwined with a lower-order kernel. In this case, a more complex description of the object is used to drive the searching process, which in turn identifies further candidate objects.

The driver drives the kernel. The kernel performs several functions. It automatically calculates an entropically selected threshold gray level, searches the image and calculates the attribute values for a candidate object. In addition, it performs a validity check on candidate objects by comparing the attribute values of the candidate objects with the predetermined attribute values for the valid objects, which, as noted above, are contained in the driver. It also performs a redundancy check to prevent multiple identification of a valid object.

In the module COL FILT, the validation step is performed by filtering the list of candidate objects. COL FILT performs filtering for either inhomogeneous or inhomogeneous objects. The filtering step for filtering inhomogenous objects comprises three conditions under which objects should be deleted. The first condition deletes objects when an object has an area less than a predetermined minimum area. The second condition deletes objects when objects when the object has a mean hue angle less than a predetermined minimum and a hue magnitude greater than a predetermined minimum. The third condition deletes objects when an object has a mean hue angle greater than a predetermined maximum and a hue magnitude greater than a predetermined minimum. Hue angle and hue magnitude are calculated as described above in equations (3) and (4) above, respectively.

As shown in block A of FIG. 23, the first step of COL FILT for filtering objects is to advance to the initial object. Decision diamond B then asks whether COL FILT is beyond the last object. If it is, then the module is done as shown in block C. If it is not, then decision diamond D asks whether the object has an area greater than a predetermined minimum area. If the answer is yes, then the object is deleted as shown in block E, and the module advances to the next object as shown in block F. Decision diamond B then asks whether COL FILT is beyond the last object, and the loop through B-F continues until the object area is not less than the predetermined minimum area. At this point, decision diamond G asks whether the mean hue angle of the object is less than a predetermined minimum value, MINHUE, and whether the hue magnitude of the object is greater than a predetermined minimum value, MINMAG. If the answer to both these questions is yes, the object is deleted as shown in block E, and the module is advanced to the next object as shown in block F. The loop through A and B continues until COL FILT is beyond the last object, at which point it is done as shown in block C. If COL FILT is not beyond the last object, the loop through A-G continues, until the object hue is greater than or equal to MINHUE or the object hue magnitude is less than or equal to MINMAG. Then decision diamond H asks whether the mean hue angle of the object is greater than a predetermined maximum value, MAXHUE, and whether the hue magnitude of the object is greater than the predetermined minimum value, MINMAG. If the answer to both these questions is yes, the object is deleted as shown in block E, and the module is advanced to the next object as shown in block F. The loop through A and B continues until COL FILT is beyond the last object, at which point it is done as shown in block C. If COL FILT is not beyond the last object, the loop through A-H continues, until the object hue is less than or equal to MAXHUE or the object hue magnitude is less than or equal to MINMAG. If the answer to either of these questions is no, the object is retained, and the module advances to the next object as shown in block F. The loop through The loop through B-H continues until the module is beyond the last object. The module is then done as shown in block C.

The method of the second embodiment of the present invention also comprises the step of calculating at least one color parameter index for the predetermined interior point of the valid object. This step is shown in block H of FIG. 19. In the preferred embodiment, the step of calculating at least one color parameter index comprises calculating the hue index for the predetermined interior point, which in this case is the center of mass. However, in general, for other predetermined interior points, the step of calculating at least one color parameter index is done later, after the validation step as described below.

The method of the second embodiment of the present invention also comprises the step of preparing a table of gray level values corresponding to the color parameter index of the predetermined interior point of the valid object. This step is shown in block I of FIG. 19. This table is prepared as described above with respect to FIGS. 13A-13E of the first embodiment.

The method of the first embodiment of the present invention also comprises the step of defining an image buffer. In the image buffer, the locations corresponding to the interior points of the valid object are assigned the color parameter index of the predetermined interior point of the valid object. This step is shown in block J of FIG. 19. The image buffer is defined as described above with respect to the first embodiment.

The method of the first embodiment of the present invention also comprises the step of copying the image buffer to the monitor to display the object in color corresponding to the color of the predetermined interior point of the valid object as determined by the table of gray level values corresponding to the color parameter index. This step of the valid object is shown in block K of FIG. 19. The image is displayed as described above with respect to the first embodiment.

According to a specific application of the second embodiment of the present invention, entropic thresholding is employed for searching the image. In this first, specific application, the step of searching the image includes the sub-step of generating a gray level histogram of the image, where the gray level histogram has an entropy function. The module, HISTOGRAM as described above with respect to FIG. 14, is used to generate the gray level histogram of the region of interest of the image. The step of searching the image also includes the sub-step of entropically selecting a threshold gray level such that the entropy function of the histogram is maximized. This step is performed by the ENTROPY module as described above with respect to FIG. 15.

According to the entropic thresholding application of the second embodiment, the searching step further includes the sub-step of scanning a portion of the image for at least one candidate object using the entropically selected threshold gray level and tracing the candidate object having boundary gray levels determined by the entropically selected threshold gray level.

The searching step further includes the sub-step of tracing the candidate object having boundary gray levels determined by the entropically selected threshold gray level. In this implementation, the searching step is performed by the module SEARCH IMAGE as described above with respect to FIG. 17, the module FIND OBJECT as described above with respect to FIG. 18 and a module TRACE OBJECT as described in FIGS. 24A and 24B. The basic principles of the TRACE OBJECT module are similar to those described in "Digital Image Processing" by Rafael C. Gonzalez and Paul Wintz, Second Ed., Addison-Wesley Publishing Company, Reading, Mass. (1987).

As shown in block A of FIG. 24A, the first step in the TRACE OBJECT module is to initialize the candidate object attribute values. The TRACE OBJECT module then asks in decision diamond B whether a neighboring perimeter point has been found. If not, the traced object is invalid as illustrated by block C. If the neighboring perimeter point has been found, then decision diamond D asks whether the TRACE OBJECT module is at the first perimeter point of the candidate object. If not, then the candidate object attribute values are updated as illustrated in block E of FIG. 24A. The loop through B-E is then repeated using the updated candidate object attribute values until the TRACE OBJECT module is at the first perimeter point of the candidate object. The center of mass coordinate is then calculated as shown in block F of FIG. 24A. Decision diamond G then asks if the candidate object area is too large. If it is, the traced object is invalid as indicated by block H of FIG. 24A.

Figure 24B:
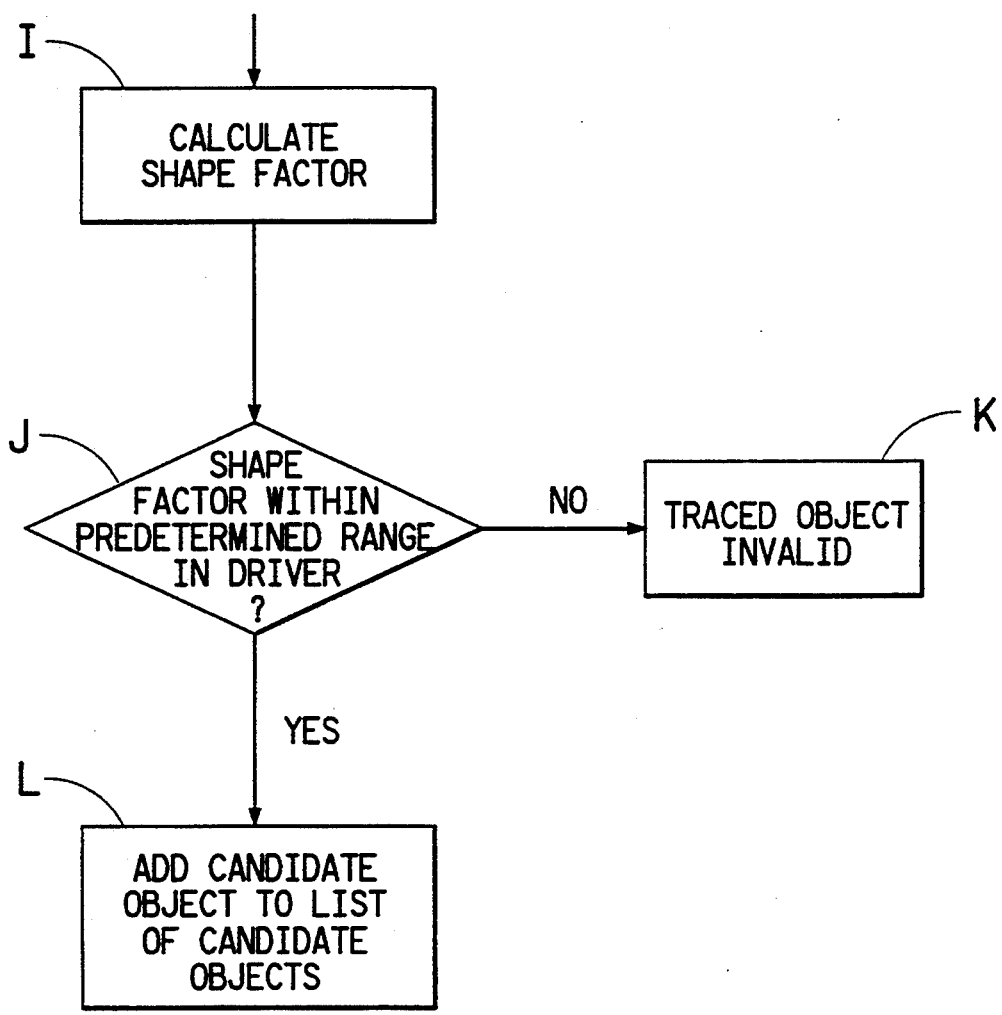

If the candidate object area is not too large, then a shape factor is calculated as shown in block I in FIG. 24B. The definition of the shape factor may vary, depending on the geometry of the object being identified. For instance, the definition of the shape factor for circular objects is:

$$\text{Shape Factor} = 1 - \frac{P^2}{4\pi A} \quad (20)$$

where:

P is the perimeter of a candidate object; and

A is the area of the candidate object.

TRACE OBJECT then checks if the shape factor is within a predetermined range as contained in the driver as shown in decision diamond J in FIG. 24B. If the shape factor does not fall within the predetermined range, then the traced object is invalid as illustrated by block K of FIG. 24B. If the shape factor falls within the predetermined range, then the candidate object is added to the list of valid objects maintained by the kernel as shown in block L.

Figure 25:
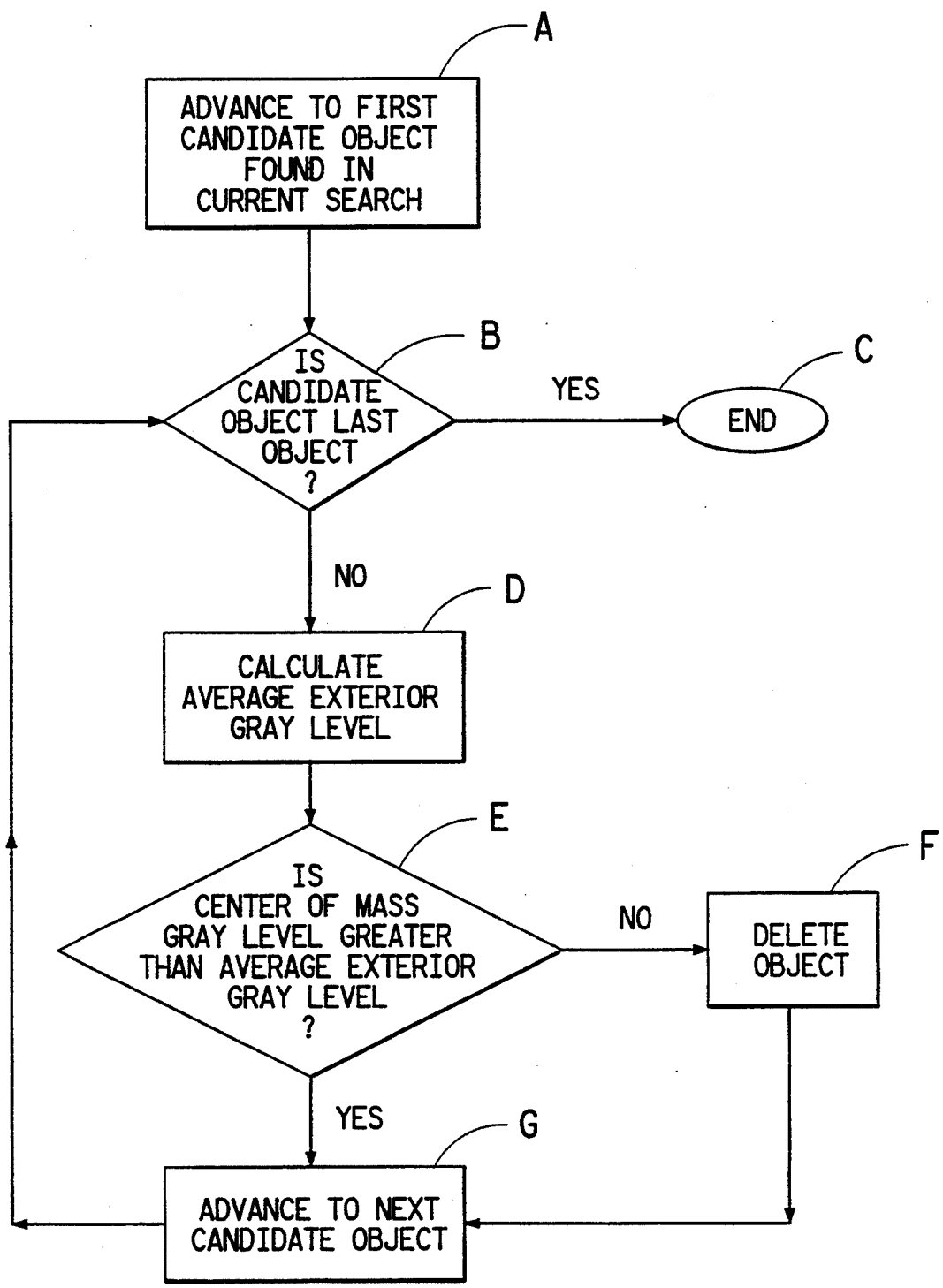
FIG. 25 is a flow chart illustrating the steps of a module, CHK GRAY, which is used to detect whether a candidate object is relatively lighter or darker than the background.

After all the candidate object have been traced in the current search, the module CHK GRAY as shown in FIG. 25 is called to check whether the candidate objects are relatively lighter than the background. CHK GRAY is run after decision diamond C of FIG. 17, when the search position is at the end of the scan. As shown in block A of FIG. 25, the first step in the CHK GRAY module is to advance to the first candidate object found in the current search. Decision diamond B of FIG. 25 asks whether the candidate object is the last object in the list of candidate objects. If it is, the module stops running as shown by oval C. If the candidate object is not the last object in the list of candidate objects, then the average exterior gray level is calculated as illustrated in block D. Decision diamond E then asks whether the gray level of the center of mass is greater than the average exterior gray level of the four exterior points (i.e., the top, bottom, left and right points) surrounding the extremum points of the object. The exterior points are those points in the background which are immediate neighbors to the extremum points of the object. If not, the object is deleted as shown in block F of FIG. 25. If the gray level center of mass is greater than the average exterior gray level, then the candidate object is retained, and the CHK GRAY module advances to the next candidate object as shown in block G. The CHK GRAY module then returns to decision diamond B to ask whether the candidate object is the last object. The loop as shown in B-G is repeated for the next candidate object until the next candidate object is the last candidate object, at which point CHK GRAY stops running. As noted above, the module CHK GRAY may be run to detect objects darker than the background. In this case, the image is initially inverted prior to performing the step of generating the image of the object and the background.

The method as described thus far can be referred to as a screening process. For example, it can be used to screen for the presence of pathological bacteria in food or in blood or soil samples. A screening process results in a yes - no answer; absolute quantitation is not necessary. For a more stringent identification process, it is necessary to apply the method of the entropic thresholding application of the second embodiment of the present invention recursively as described below.

The recursive version of the method of the entropic thresholding application of the second embodiment may further comprise the steps of subdividing the gray level histogram into an upper histogram and a lower histogram using the entropic threshold gray level which was selected to maximize the entropy function of the histogram as an upper delimiter and a lower delimiter. The selection, searching, validating and subdividing steps are recursively repeated for each of the upper and lower histograms. The repetition of the selection step selects a next successive entropic threshold gray level, thereby recursively partitioning the gray level histogram to identify the valid objects until a predetermined minimum number of new valid objects is identified. In the preferred implementation of the recursive version, the predetermined minimum number is zero. However, there may be cases where the predetermined number is greater than zero, such as when a complete identification is not required.

Figure 26A:
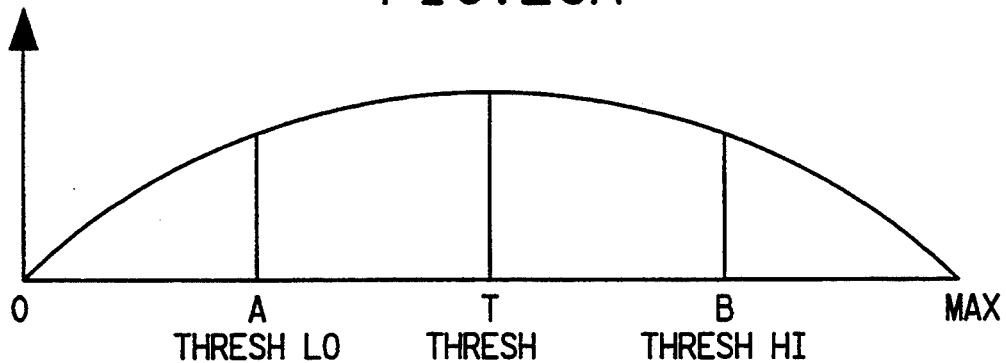
FIGS. 26A–26C are original, upper and lower gray level histograms, respectively, of an image for the recursive version of the entropic thresholding application of the method of the second embodiment of the present invention.
Figure 26B:
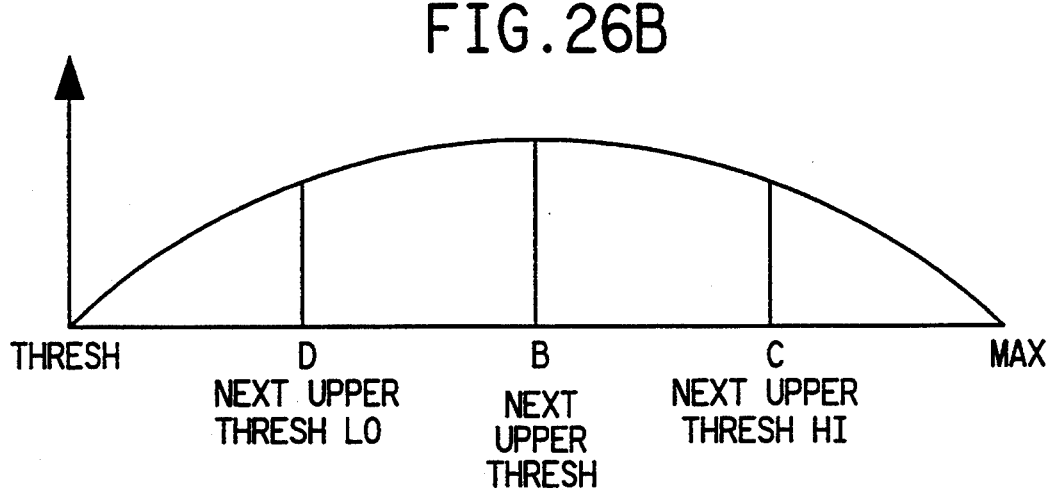
Figure 26C:
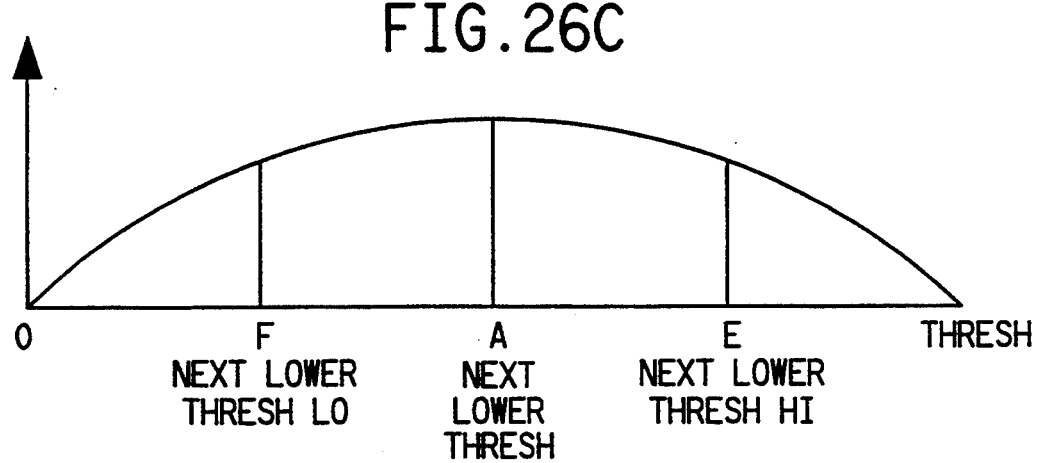

FIGS. 26A–26C illustrate the concept of subdividing a histogram into an upper histogram and a lower histogram. An original histogram is shown in FIG. 26A. THRESH, as shown at T in FIG. 26A, is the entropically selected threshold gray level for the gray level histogram corresponding to the gray level region between the minimum gray level being searched and the maximum gray level being searched. For the original histogram as shown in FIG. 26A, the minimum gray level being searched is zero and the maximum gray level being searched is MAX. THRESH HI, as shown at B, is the entropically selected threshold gray level for the gray level histogram corresponding to the gray level region between THRESH and MAX. THRESH LO, as shown at A, is the entropically selected threshold gray level for the gray level histogram corresponding to the gray level region between zero and THRESH.

According to the recursive version of the entropic thresholding application, the subdividing, selection, searching and validating steps are then recursively repeated. By recursion is meant the process of continuously dividing a histogram into upper and lower histograms, searching each upper histogram, which upper histogram is itself continuously divided into upper and lower histograms, for new valid objects until the number of new valid objects found in an upper histogram is less than or equal to a predetermined minimum number, and subsequently searching each lower histogram corresponding to the most recently searched upper histogram, which lower histogram is itself continuously divided into upper and lower histograms, until the number of new valid objects found in a lower histogram is less than or equal to the predetermined minimum number.

The upper histogram is shown in FIG. 26B. The repetition of the subdividing step subdivides the upper histogram into a next successive upper and lower histogram as shown in FIG. 26B. The repetition of the selection step for the upper histogram selects a next upper successive entropic threshold gray level, as shown at B in FIG. 26B. Thus, point B, which was THRESH HI in the original histogram, becomes the threshold for the upper histogram, or NEXT UPPER THRESH. In FIG. 26B, the minimum gray level being searched is now THRESH and the maximum gray level being searched is now MAX. The NEXT UPPER THRESH HI, shown at C, is the entropically selected threshold gray level for the gray level histogram corresponding to the gray level region between B and MAX. The NEXT UPPER THRESH LO, shown at D, is the entropically selected threshold gray level for the gray level histogram corresponding to the gray level region between THRESH and B. The selection, searching and validating steps are then repeated recursively using the next upper successive entropic threshold gray level, B, as the entropic threshold gray level.

FIG. 26C shows the lower histogram. The repetition of the subdividing step subdivides the lower histogram into a next successive upper and lower histogram as shown in FIG. 26C. The repetition of the selection step for the lower histogram selects a next lower successive entropic threshold gray level, as shown at A in FIG. 26C. Thus, point A, which was THRESH LO in the original histogram, becomes the threshold for the partitioned lower histogram, or NEXT LOWER THRESH. In FIG. 26C, the minimum gray level being searched is now zero and the maximum gray level being searched is now THRESH. The NEXT LOWER THRESH HI, shown at E, is the entropically selected threshold gray level for the gray level histogram corresponding to the gray level region between A and THRESH. The NEXT LOWER THRESH LO, shown at F, is the entropically selected threshold gray level for the gray level histogram corresponding to the gray level region between zero and A. The selection, searching and validating steps are then repeated recursively for the lower histogram using the next lower successive entropic threshold gray level, A, as the entropic threshold gray level.

Figure 27:
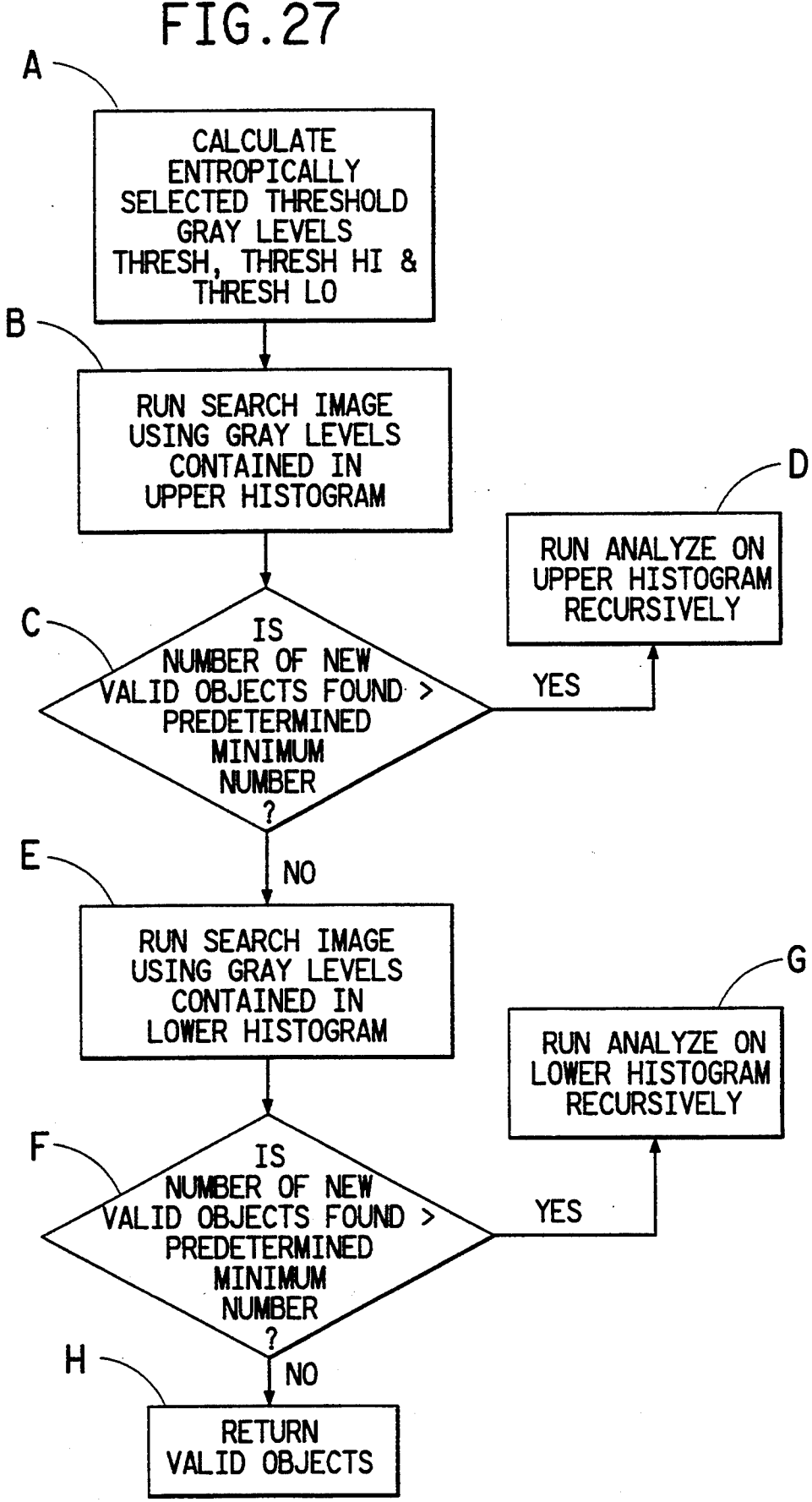
FIG. 27 is a flow chart showing the steps of a module, ANALYZE, which is used to recursively search the image for candidate objects according to the recursive version of the entropic thresholding application of the second embodiment.

The ANALYZE module as shown in FIG. 27 constitutes the core recursive kernel of the recursive version of the entropic thresholding application of the second embodiment. The ANALYZE module effectively zooms in on a specific region in gray level space to search for instances of the candidate object and recursively partitions the histogram. The first step in the ANALYZE module as shown in FIG. 27 is to calculate the entropically selected threshold gray levels THRESH, THRESH HI AND THRESH LO as described above and as shown in block A of FIG. 27. As shown in block B, the module SEARCH IMAGE is run using the gray levels contained in the upper histogram. Decision diamond C then asks whether the number of new valid objects found is greater than the predetermined minimum number. If it is, then the module ANALYZE is run on the upper histogram recursively. If the number of valid objects found is not greater than the predetermined minimum number, then the module SEARCH IMAGE is run again using the gray levels contained in the lower histogram as shown in block E. Decision diamond F then asks whether the number of new valid objects found is greater than the predetermined minimum number. If it is, then ANALYZE is run on the lower histogram recursively as shown in block G. If it is not, then ANALYZE stops running, and the valid objects are returned as shown in block H of FIG. 27. With the present invention, there is some latitude in selecting the range of values of the number of attributes to be checked for in the validation step during the recursive process.

According to the specific application of the second embodiment, the validating step further includes the sub-step of checking for redundancies to prevent multiple identification of the valid object. Such redundancy checking is necessary since an object which has been recognized as valid after the current search may have been recognized as a valid object in an earlier search. In order to perform the redundancy checking sub-step, valid objects are classified as either homogeneous or inhomogeneous. Inhomogenous objects are described in the example given below, where color colonies are identified. Valid objects are also further classified as either a relatively large valid object or a small valid object. In addition, valid objects are classified as either contained in another valid object (interior valid objects), or never contained in another valid object (exterior valid objects).

According to the specific application of the second embodiment, the redundancy checking sub-step may be performed to delete inhomogeneous valid objects. When it is, the method of the present invention further includes the sub-step of deleting the large object when the large object contains more than one small object. Also, when the redundancy checking sub-step is performed to delete inhomogeneous valid objects, the method of the present invention also includes the sub-steps of calculating the average edge contrast of the large and the small valid objects and deleting the object having the smaller edge contrast when the large object contains only one small object. These sub-steps are performed by a module, CHK LIST, as shown in FIGS. 28A–28D for inhomogeneous valid objects.

As shown in block A of FIG. 28A, the first step of the CHK LIST module for deleting inhomogeneous objects is to define the previous count as the number of valid objects found prior to the current search. Then the tail object is defined as the initial candidate object found in the current search as shown in block B. The object count is initialized to one as shown in block C, and the head object is defined as the initial object in the total object list (i.e., the list of all objects found to date) as shown in block D. Decision diamond E asks whether the object count is greater than the previous count.

Figure 28B:
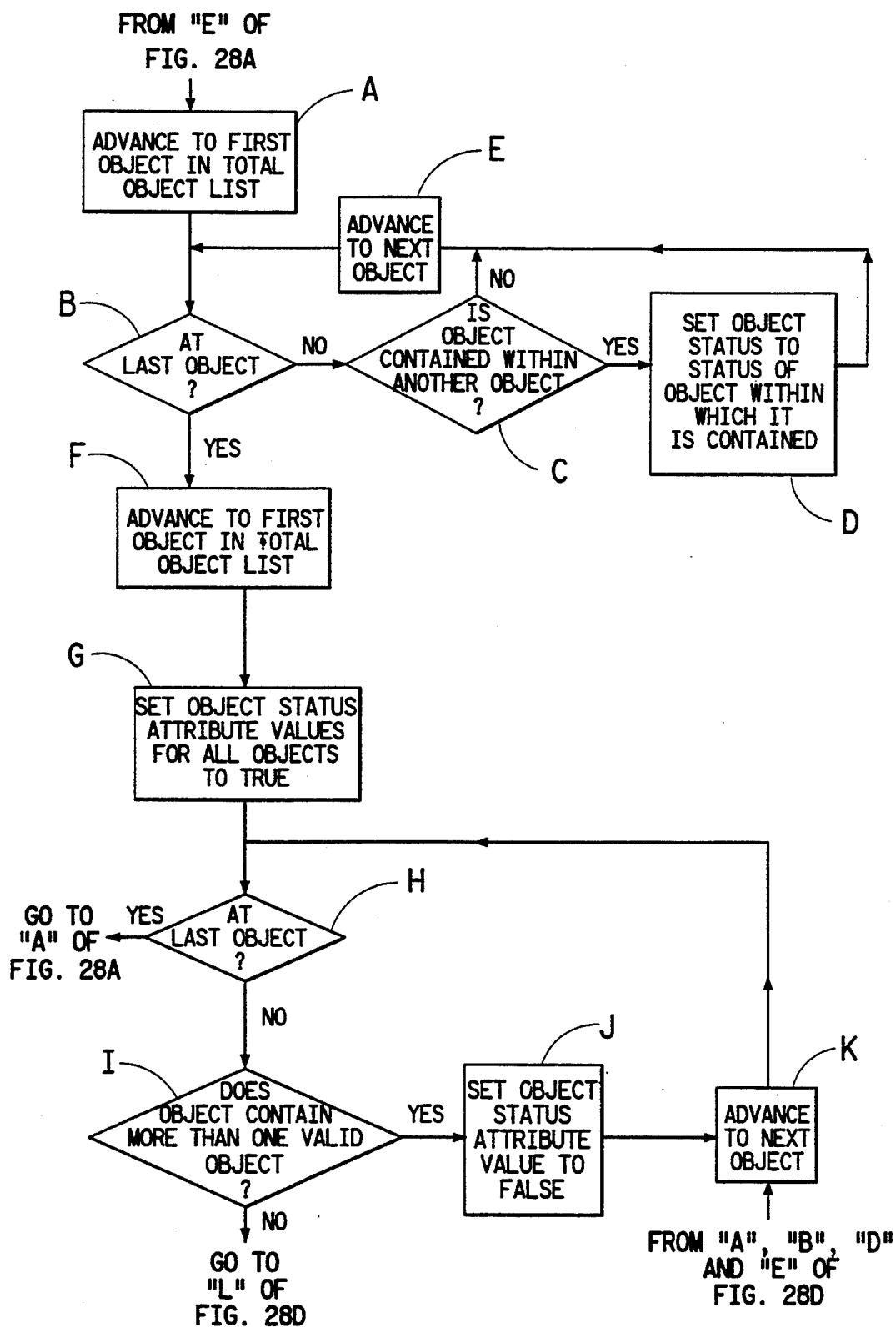

If the object count is greater than the previous count, CHK LIST advances to the first object in the total object list as shown in block A of FIG. 28B. Decision diamond B of FIG. 28B asks if CHK LIST is at the last object. If not, then decision diamond C asks whether the valid object is contained within another valid object. If so, the object status is set to the status of the object within which it is contained as shown in block D, and CHK LIST advances to the next object as shown in block E. Also, if the object is not contained within another object, then CHK LIST advances to the next object as shown in block E. The loop through B–E continues until the next object of block E is the last object, at which point CHK LIST advances to the first object in the total object list as shown in block F. The object status attribute values for all the objects is set to "true" as shown in block G. "True" in this context means valid, and "false" means invalid. Decision diamond H then asks if CHK LIST is at the last object.

Figure 28C:
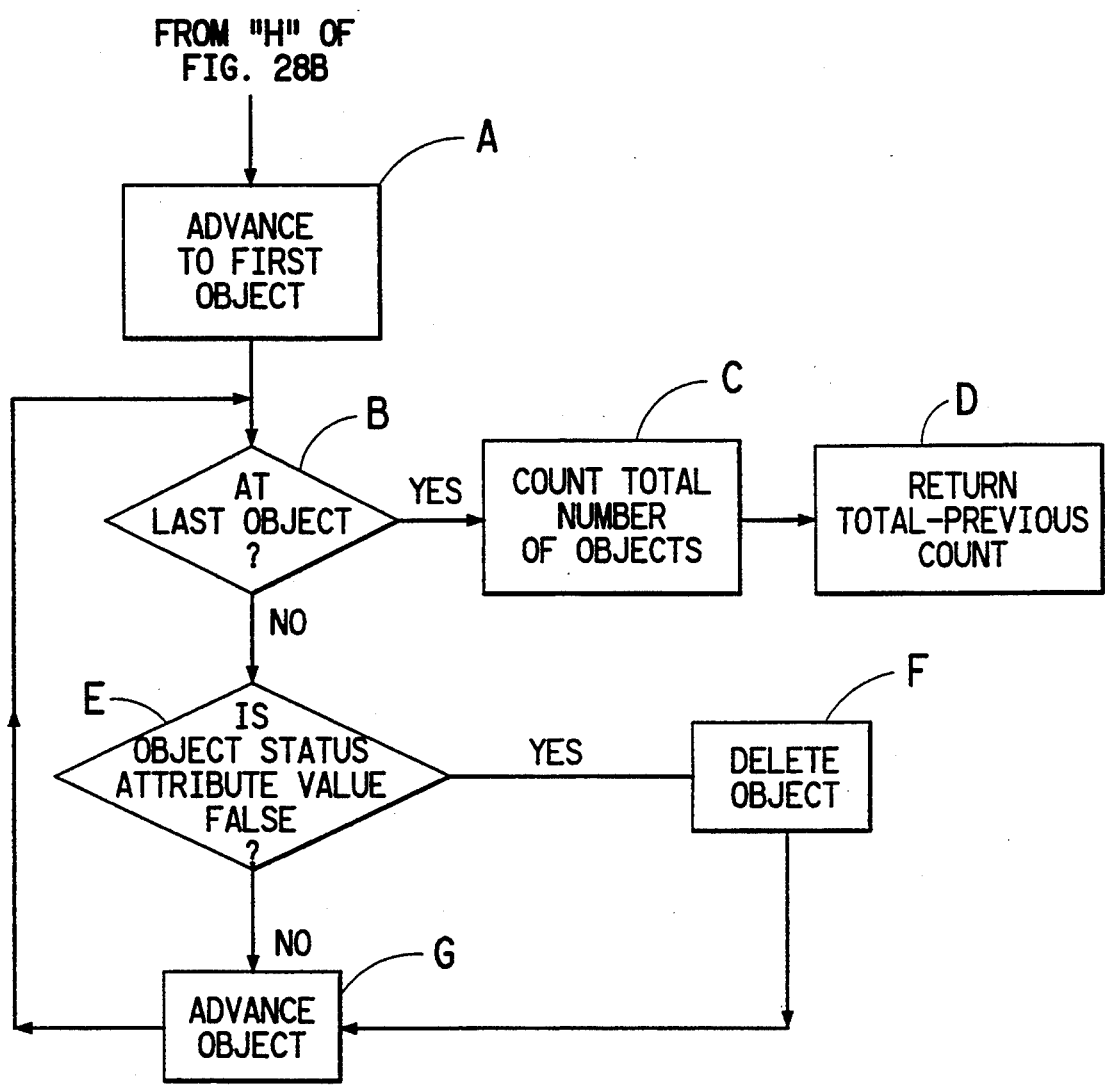

If it is, CHK LIST advances to the first object as shown in block A of FIG. 28C. Decision diamond B then asks again whether CHK LIST is at the last object. If it is, then the total number of objects is counted as shown in block C, and the difference between the total number of objects and the previous count is returned as shown in block D. If CHK LIST is not at the last object, decision diamond E asks whether the object status attribute value is false. If so, the object is deleted as shown in block F. If not, then CHK LIST advances the object as shown in block G, and CHK LIST asks again whether it is at the last object as shown in decision diamond B. The loop through B, E, F, and G continues until the advanced object of block G is the last object. At this point, the total number of objects is counted as shown in block C, and the difference between the total number of objects and the previous count is returned as shown in block D.

Figure 28D:
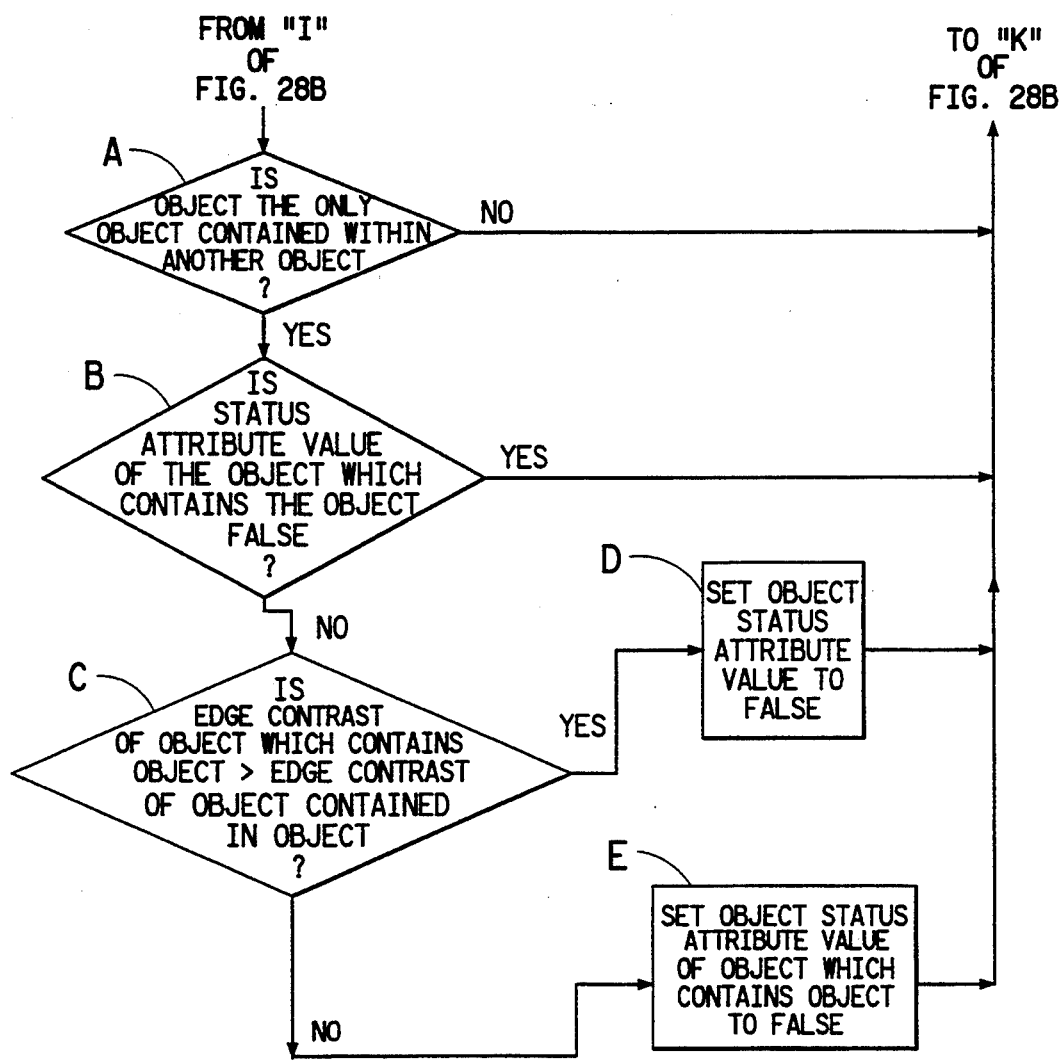

Returning to decision diamond H in FIG. 28B, if CHK LIST is not at the last object at this point, then it goes to decision diamond I, which asks whether the object contains more than one valid object. If so, then the object status attribute value is set to false as shown in block J, and CHK LIST advances to the next object as shown in block K. CHK LIST then returns to decision diamond H, asks whether it is at the last object and continues this process until the object does not contain more than one valid object. Then decision diamond A of FIG. 28D asks if the object is the only object contained within another object. If not, then CHK LIST advances to the next object as shown in block K of FIG. 28B, and the loop through H–K of FIG. 28B and A of FIG. 28D is repeated until the object is the only object contained within another object. If the object is the only object contained within another object, then decision diamond B asks whether the status attribute value of the object which contains the object is false. If so, then CHK LIST advances to the next object as shown in block K of FIG. 28B, and the loop through H–K of FIG. 28B and A–B of FIG. 28D is repeated until the status attribute value of the object which contains the object is not false. At this point, decision diamond N asks whether the edge contrast of the object which contains another object is greater than the edge contrast of the object. If so, then CHK LIST sets the object status attribute value to false as shown in block D, it advances to the next object as shown in block K in FIG. 28B, and the loop through H–K of FIG. 28B and A–C of FIG. 29D is repeated until the edge contrast of the object which contains another object is not greater than the edge contrast of the object contained in another object. Then CHK LIST sets the status of the object which contains the object to false as shown in block E of FIG. 28D, and it advances to the next object as shown in block K of FIG. 28D until it is at the last object.

Returning to decision diamond E in FIG. 28A, if the object count is not greater than the previous count, then decision diamond F asks if the head object is contained within another object. If so, then the head object is advanced as shown in block G, and the object count is incremented as shown in block H. Decision diamond E again asks if the incremented object count is greater than the previous count. If so, CHK LIST advances to block A of FIG. 28B as explained above. If the incremented count is not greater than the previous count, the loop through F, G, H and E in FIG. 28A is repeated until the head object is not contained within another object. Then CHK LIST advances to decision diamond I of FIG. 28A, which asks if the tail object is the last object, or if the head object is contained within another object. If the tail object is the last object, or if the head object is contained within another object, then CHK LIST advances the head object as shown in block G, and the count is incremented as shown in block H. The loop through E, F, I, G and H is repeated until the tail object is not the last object or the head object is not contained within another object. Decision diamond J then asks whether the tail object is contained within another object. If it is, then the tail object is advanced as shown in block K of FIG. 28A, and the loop through I, J and K is repeated until the tail object is not contained within another object. Then CHK LIST goes to the module SET STAT as shown in FIG. 29 to set the status of the head and tail objects as shown in block L of FIG. 28A.

The redundancy checking sub-step further includes the sub-steps of comparing the areas of a plurality of valid objects and designating one of the valid objects as a large valid object and the other of the first and second valid objects as a small valid object and determining whether the small valid object is contained in the large valid object as defined by the four extremum points of the larger object for inhomogeneous objects. The module SET STAT as shown in FIG. 29 performs these sub-steps for inhomogeneous objects. The first step of SET STAT as shown in decision diamond A of FIG. 29 is to ask whether the head object is larger than the tail object. If so, then the head object is defined as the large valid object, and the tail object is defined as the small valid object as shown in block B. If the head object is not larger than the tail object, then the head object is defined as the small valid object, and the tail object is defined as the large valid object as shown in block C. Then decision diamond D asks whether the small object is contained within the large object. If not, then SET STAT is finished, as indicated by END oval E. If the small object is contained within the large object, then the large object type attribute value is set to a value indicating that it contains a small object as shown in block F. The type attribute value tells SET STAT whether an object is contained within another object or whether the object contains another object. Also, the small object type attribute value is set to a value indicating that it is contained within a large object as shown in block G. Finally, the large object status attribute value is incremented as shown in block H. SET STAT is then finished, as indicated by the END oval I and returns to block L of FIG. 29.

According to the specific application of the second embodiment, the redundancy checking sub-step may be performed to resolve redundancies in the homogeneous objects. When it is, the method of the present invention further includes the sub-steps of calculating the edge contrast of the large and small valid objects and deleting the large object where the average edge contrast of the large object is less than the average edge contrast of the small object and is less than a predetermined minimum edge contrast. The redundancy checking sub-step for resolving redundancies also includes the sub-steps of calculating the edge contrast of the large and small valid objects and deleting the small object where the average edge contrast of the large object is greater than the average edge contrast of the small object and is greater than the predetermined minimum contrast. These sub-steps are performed using the module CHK LIST for homogeneous objects as illustrated by the flow charts of FIGS. 30A and 30B.

Figure 30A:
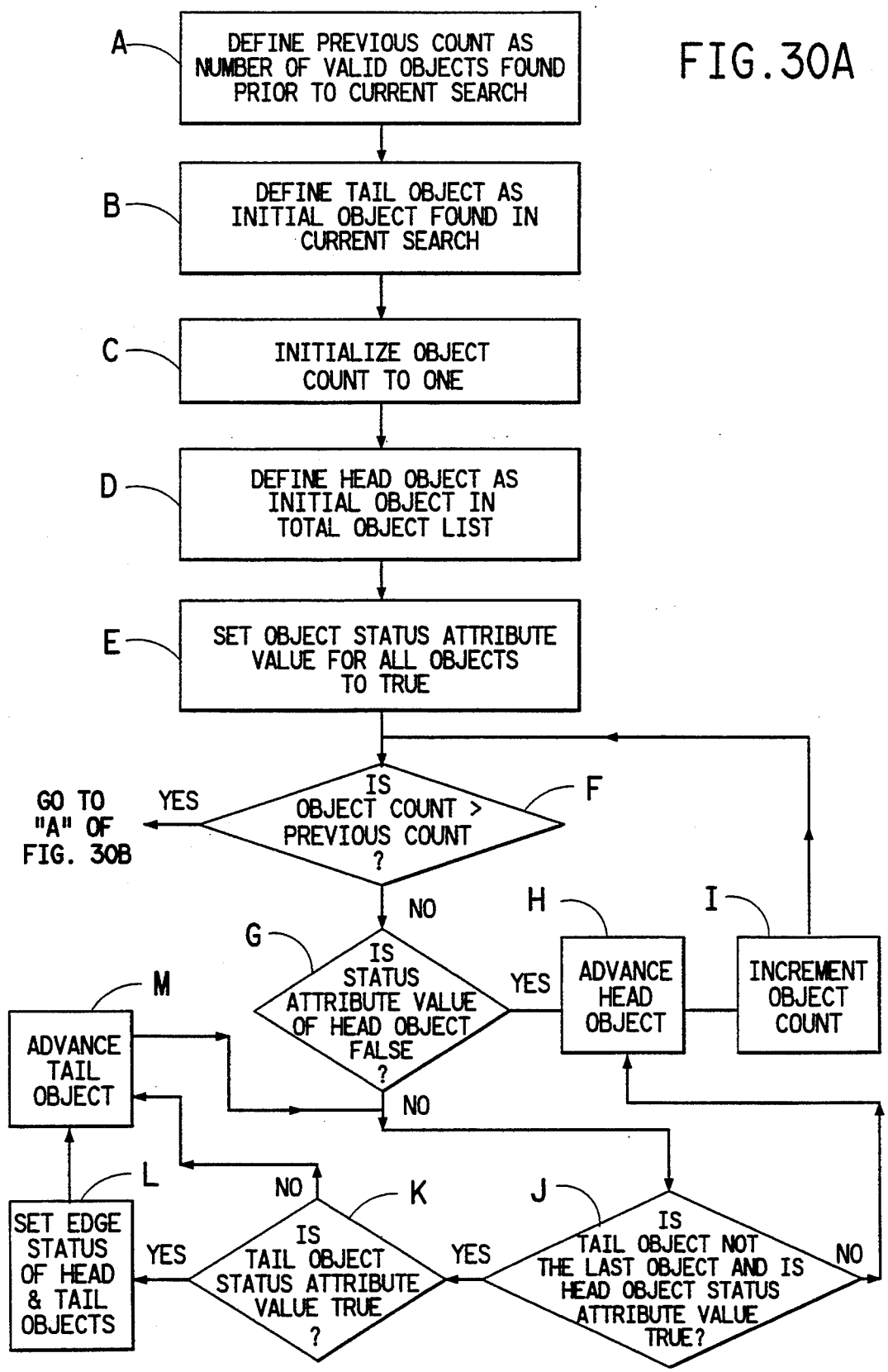
FIGS. 30A–30B are a flow chart showing the steps of a module, CHK LIST, which is used to resolve redundancies in homogeneous objects.

As shown in block A of FIG. 30A, the first step of the CHK LIST module, when run to delete homogenous objects, is to define the previous count as the number of valid objects found prior to the current search. Then the tail object is defined as the initial candidate object found in the current search as shown in block B. The object count is initialized to one as shown in block C, and the head object is defined as the initial object in the total object list as shown in block D. The object status attribute value is then set to true for all objects as shown in block E. Decision diamond F asks whether the object count is greater than the previous count.

Figure 30B:
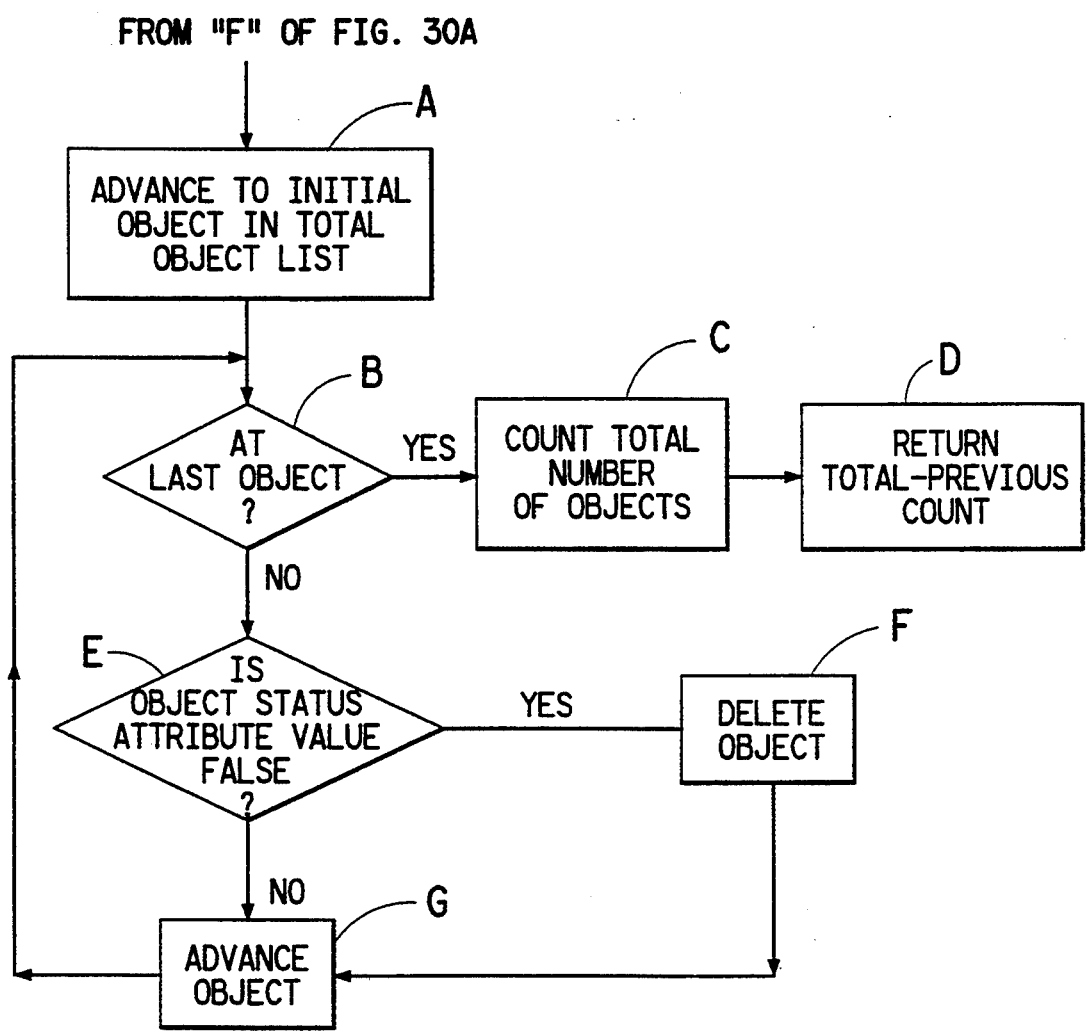

If the object count is greater than the previous count, CHK LIST advances to the initial object in the total object list as shown in block A of FIG. 30B. Decision diamond B of FIG. 30B asks if CHK LIST is at the last object. If so, the total number of objects is counted as shown in block C, and the difference between the total number of objects and the previous count is returned as shown in block D. If CHK LIST is not at the last object, then decision diamond E asks whether the object status attribute value is false. If so, the object is deleted as shown in block F. If the object status is not false, then object is advanced as shown in block G, and the CHK LIST module asks again whether it is at the last object as shown in decision diamond B. This process continues until CHK LIST reaches the last object, at which point the total number of objects is counted as shown in block C, and the difference between the total number of objects and the previous count is returned as shown in block D.

Returning to decision diamond F in FIG. 30A, if the object count is not greater than the previous count, then decision diamond G of FIG. 30A asks if the status attribute value of the head object is false. If it is, then the head object is advanced as shown in block H, and the count is incremented as shown in block I. Decision diamond F then asks if the incremented object count is greater than the previous count. If so, CHK LIST advances to block A of FIG. 28B as explained above. The loop through G, H and I in FIG. 30A is repeated until the status of the object is not false. Then CHK LIST advances to decision diamond J of FIG. 30A, which asks if the tail object is not the last object and if the had object status attribute value is true. The answer to both these questions must be yes. If not, then CHK LIST advances the head object as shown in block H, and the count is incremented as shown in block I. The loop through F, G, H, I and J is repeated until the tail object is the last object and the head object status attribute value is true. Decision diamond K then asks whether the tail object status attribute value is true. If it is, then the edge status of the head and tail object is set as shown in block L of FIG. 30A and as shown in detail in FIG. 31 by a module SET STAT. CHK LIST then advances the tail object as shown in block M, and the loop through J, K, L and M is repeated. If the tail object status is not true, then CHK LIST advances the tail object as shown in block M, and the loop through J, K and M is repeated.

Figure 31:
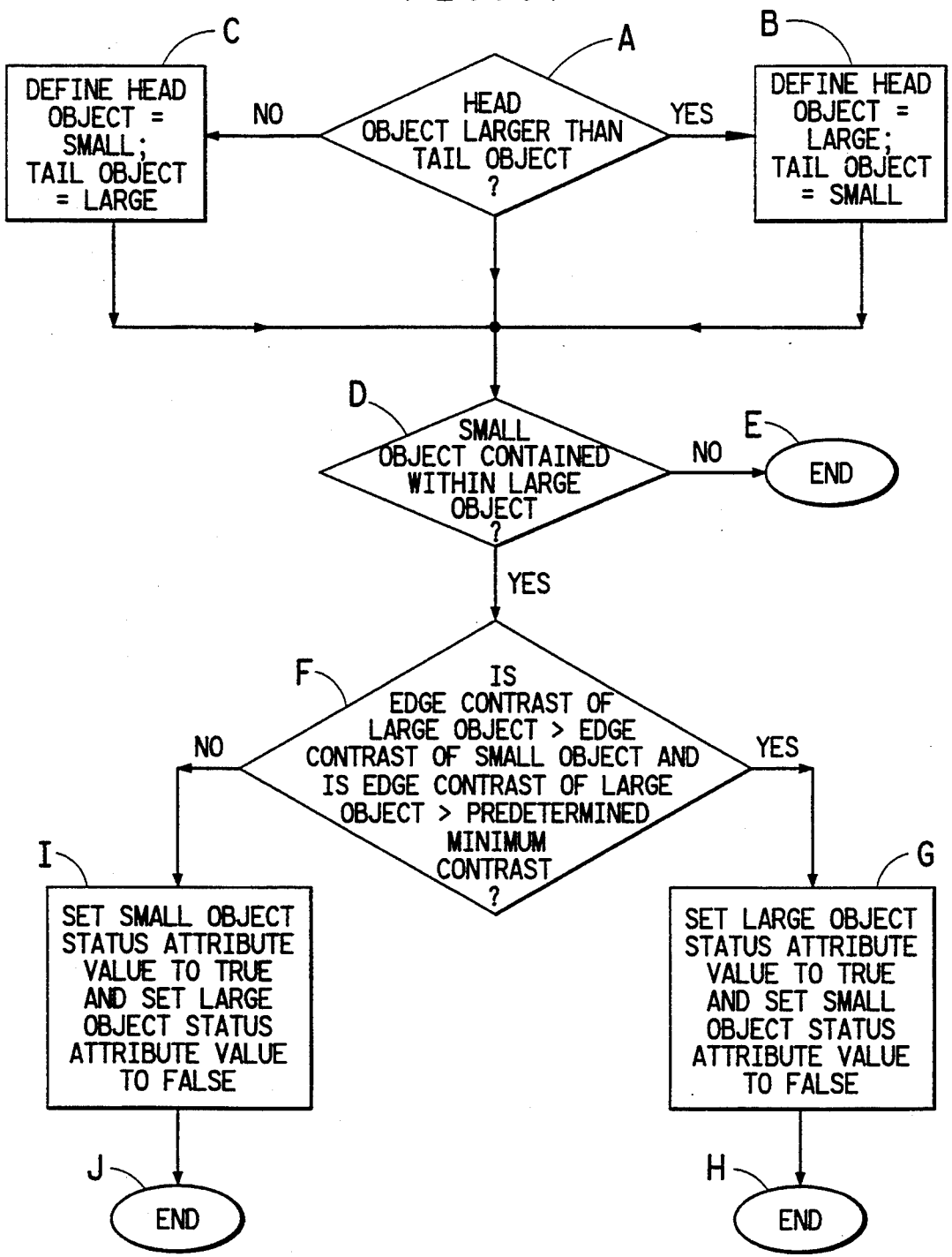
FIG. 31 is a flow chart showing the steps of a module, SET STAT, which is used with the module CHK LIST as shown in FIGS. 30A–30B.

The module SET STAT as shown in FIG. 31 performs the sub-steps of comparing the areas of a plurality of valid objects and designating one of the valid objects as a large valid object and the other of the first and second valid objects as a small valid object and determining whether the small valid object is contained in the large valid object as defined by the four extremum points of the large object for homogeneous objects. As shown in decision diamond A of FIG. 31, the first step of SET STAT is to ask whether the head object is larger than the tail object. If so, the head object is defined as a large valid object, and the tail object is defined as the small valid object as shown in block B. If the head object is not larger than the tail object, then the head object is defined as the small valid object, and the tail object is defined as the large valid object. Decision diamond D of SET STAT then asks whether the small object is contained within the large object. If not, SET STAT stops running as shown by oval E. If the small object is contained within the large object, then decision diamond F asks whether the edge contrast of the large object is greater than the edge contrast of the small object, and whether the edge contrast of the large object is greater than the predetermined minimum edge contrast. If the answer to both of these questions is yes, then the large object status attribute value is set to true, and the small object status attribute value is set to false as indicated by block G, and the module stops running as indicated by oval H. If the answer to at least one of the questions in decision diamond F is no, then the small object status attribute value is set to true, the large object status attribute value is set to false as indicated by block I, and the module stops running as indicated by oval J.

The method of the entropic thresholding application of the second embodiment further includes the step of performing a final check for redundancies of the valid object and resolving the redundancies to prevent multiple identification of the valid object. The final redundancy checking step further includes the sub-steps of comparing the areas of a plurality of valid objects and designating one of the valid objects as a large valid object and the other of the first and second valid objects as a small valid object and removing the large valid object when the small valid object and the large valid object overlap. The final redundancy checking step is performed by a module, FINAL CHK, as illustrated by the flow chart of FIGS. 32A and 32B and a module INT STAT, as illustrated by the flow chart of FIG. 33. The modules FINAL CHK and INT STAT are the same for both homogeneous and inhomogeneous objects, and are thus only illustrated once.

Figure 32B:
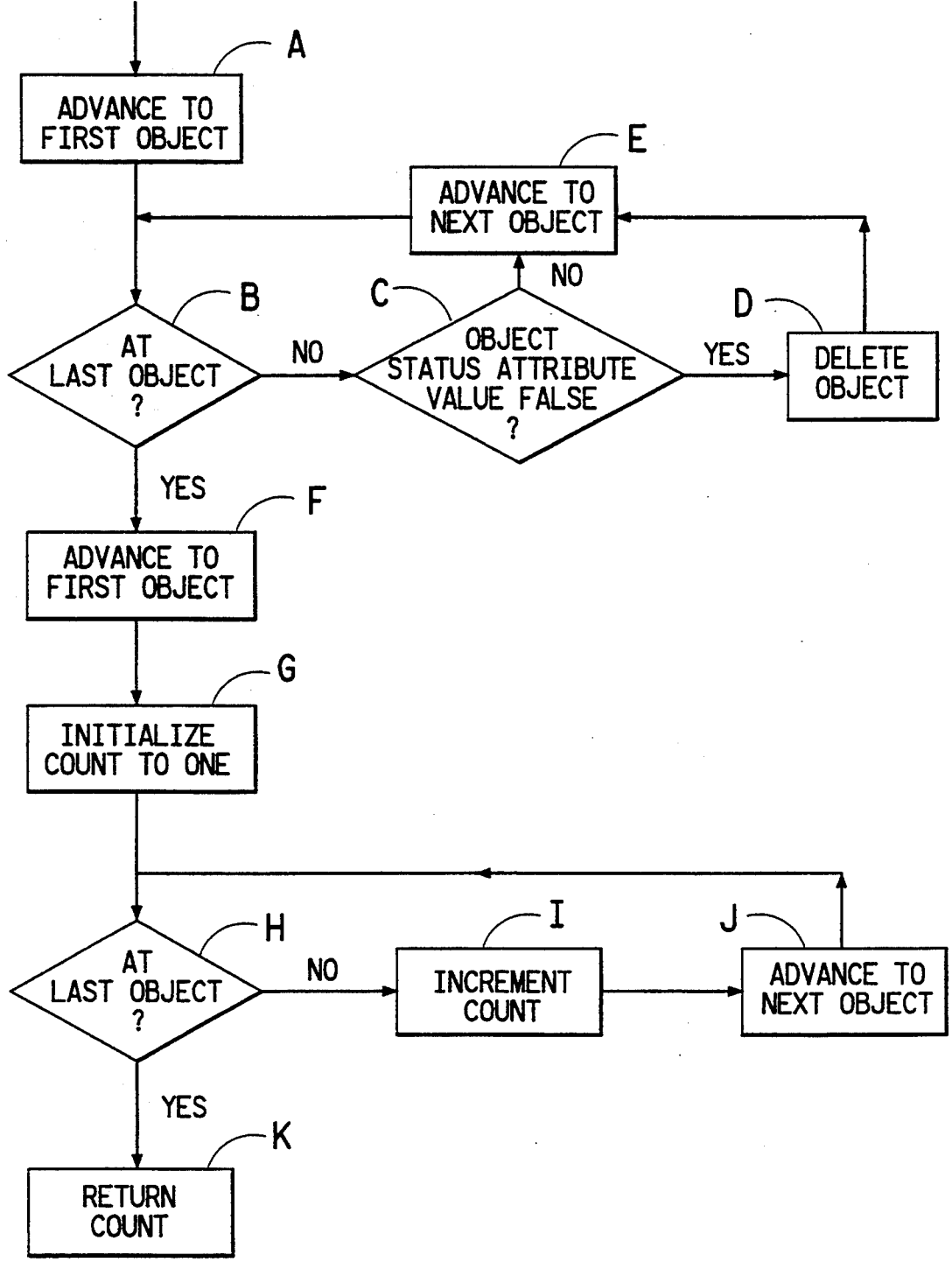

The first step of FINAL CHK is to initialize the object attribute value to true for all objects as shown in block A of FIG. 32A. The counting index for counting valid objects is the initialized to one as shown in block B. The head object is defined as the initial object in a list of status attribute values as illustrated in block C. Decision diamond D then asks whether the counting index is less than the total number of objects. If not, the module FINAL CHK goes to block A of FIG. 32B.

As shown in block A of FIG. 32B, FINAL CHK advances to the first object. Decision diamond B asks whether FINAL CHK is at the last object. If it is not, then decision diamond C asks whether the object status attribute value is false. If not, then FINAL CHK advances to the next object as shown in block E, and decision diamond B again asks whether FINAL CHK is at the last object. The loop through B, C and E continues until FINAL CHK is at the next object. If the object status attribute value is false, then the object is deleted as shown in block D. FINAL CHK then advances to the next object as shown in block E, and decision diamond B asks whether the FINAL CHK at the last object. The loop through B-E continues until the next object is the last object, at which point FINAL CHK advances to the first object as shown in block F. The count is then initialized to one as shown in block G. Decision diamond H then asks whether FINAL CHK is at the last object. If it is not, then the count is incremented as shown in block I, and FINAL CHK advances to the next object is shown in block J. Decision diamond H again asks whether FINAL CHK is the last object, and the loop through H, I and J continues until FINAL CHK is at the last object. Then the total number of valid objects as contained in count is returned as shown by block K of FIG. 32B.

Returning to decision diamond D of FIG. 32A, if the counting index is less than the total number of objects, then the tail object is defined as the next object beyond the head object as shown in block E. Decision diamond F then asks if the status attribute value of the head object is true. If not, the FINAL CHK advances the head object as shown in block G and increments the counting index as shown in block H. FINAL CHK then returns to decision diamond D, and the loop through D-I continues until the status attribute value of the head object is true. Then decision diamond I asks whether the tail object is not the last object and whether the head object status attribute value is true. If at least one of these conditions is not met, then FINAL CHK advances the head object as shown in block G and increments the index as shown in block H. FINAL CHK then returns to decision diamond D, and the loop through D-I continues until the answer to both questions in decision diamond I is yes. Then decision diamond J asks whether the tail object status attribute value is true. If not, FINAL CHK advances the tail object as shown in block L of FIG. 32A, and the loop through I, J and L is repeated until the tail object status attribute value is true. Then FINAL CHK runs a module INT STAT, as shown in block K of FIG. 32A and advances the tail object as shown in block L.

Figure 33:
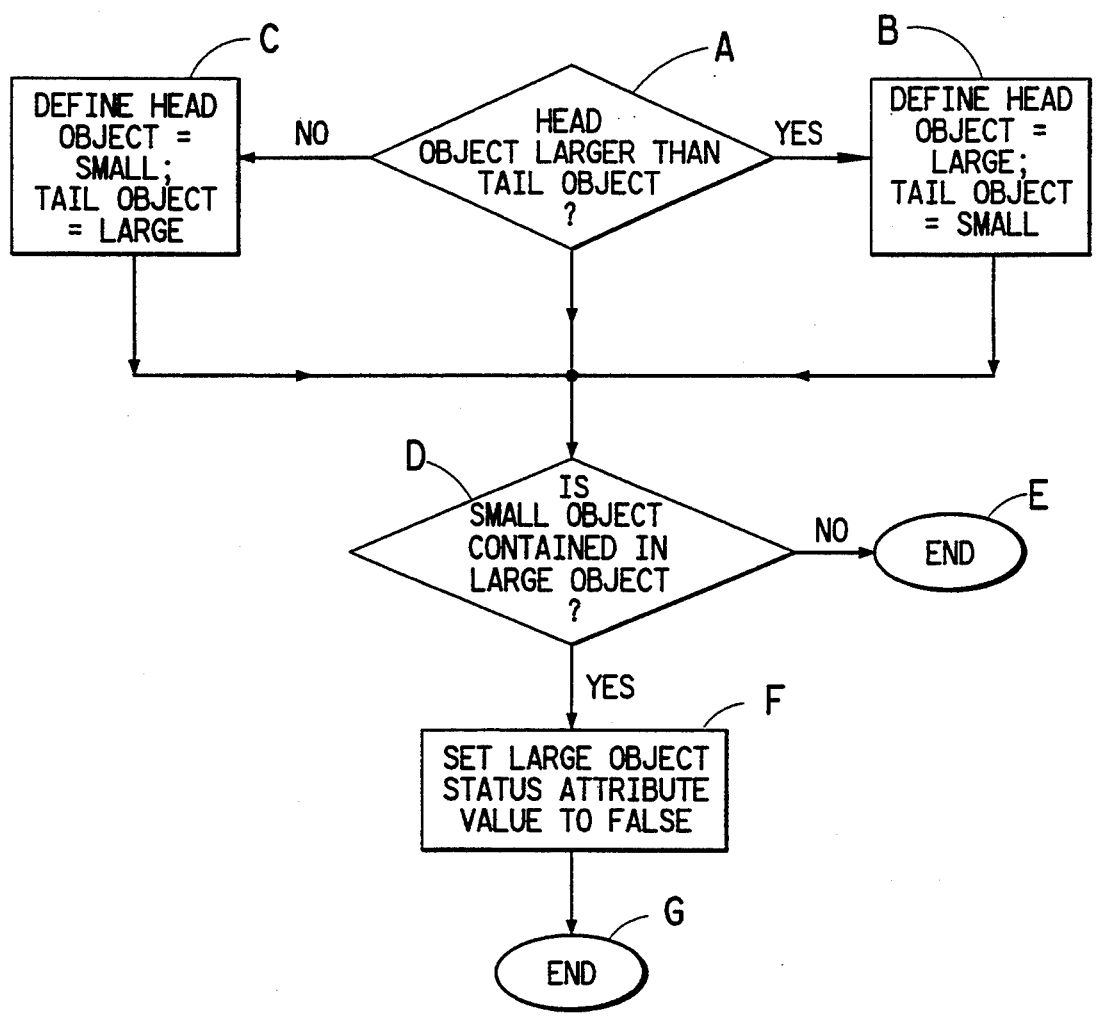
FIG. 33 is a flow chart showing the steps of a module, INT STAT, which is used with the module FINAL CHK as shown in FIGS. 32A–32B.

The steps of the module INT STAT as illustrated in block K of FIG. 32A are shown in detail in FIG. 33. Decision diamond A of FIG. 34 asks whether the head object is larger than the tail object. If so, the head object is defined as the large valid object, and the tail object is defined as the small valid object as shown in block B. If the head object is not larger than the tail object, then the head object is defined as the small valid object, and the tail object is defined as the large valid object as shown in block C. Decision diamond D then asks whether the small valid object is contained in the large valid object. If not, then INT STAT is at its end, as shown by oval E. If the small valid object is contained in the large valid object, then the large object status attribute value is set to false as shown in block F, and INT STAT is at its end as shown by oval G.

Figure 1:
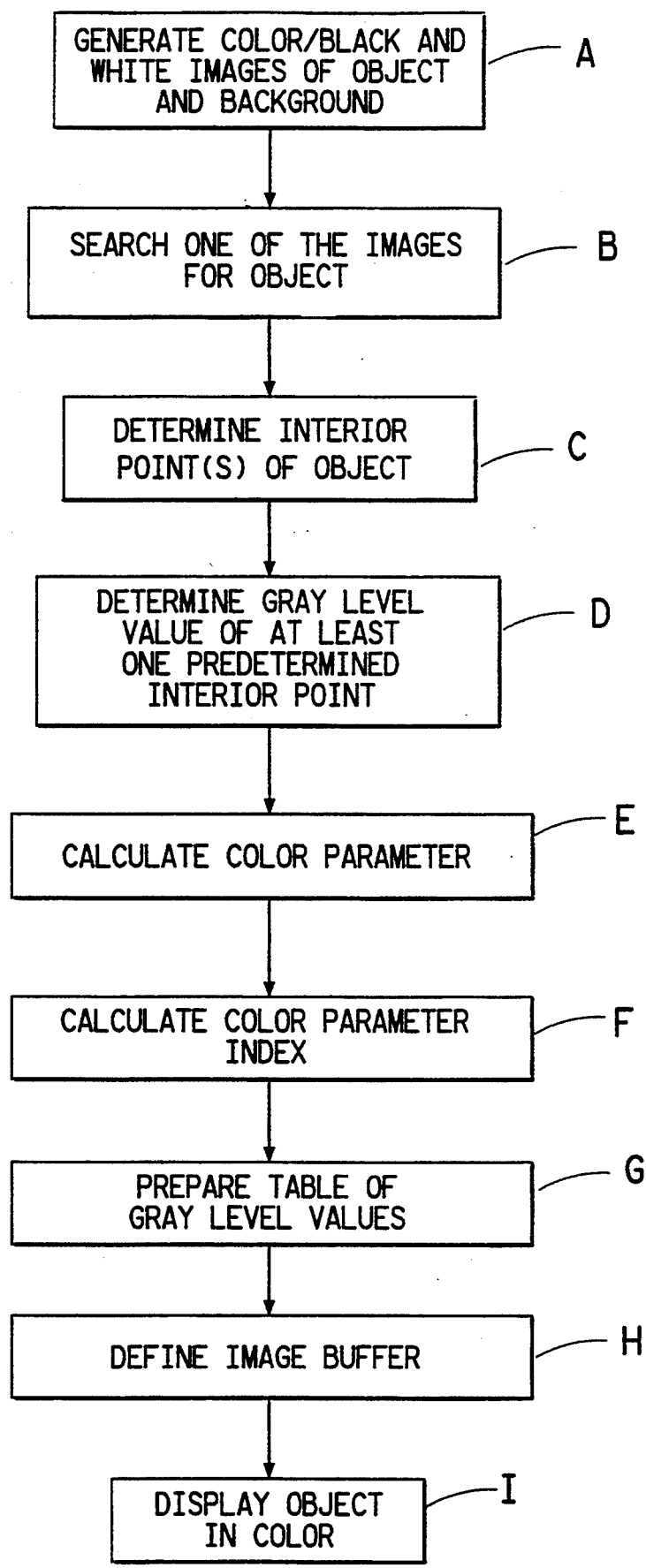
FIG. 1 is a block diagram showing the overall steps of the method of the first embodiment of the present invention.
Figure 34:
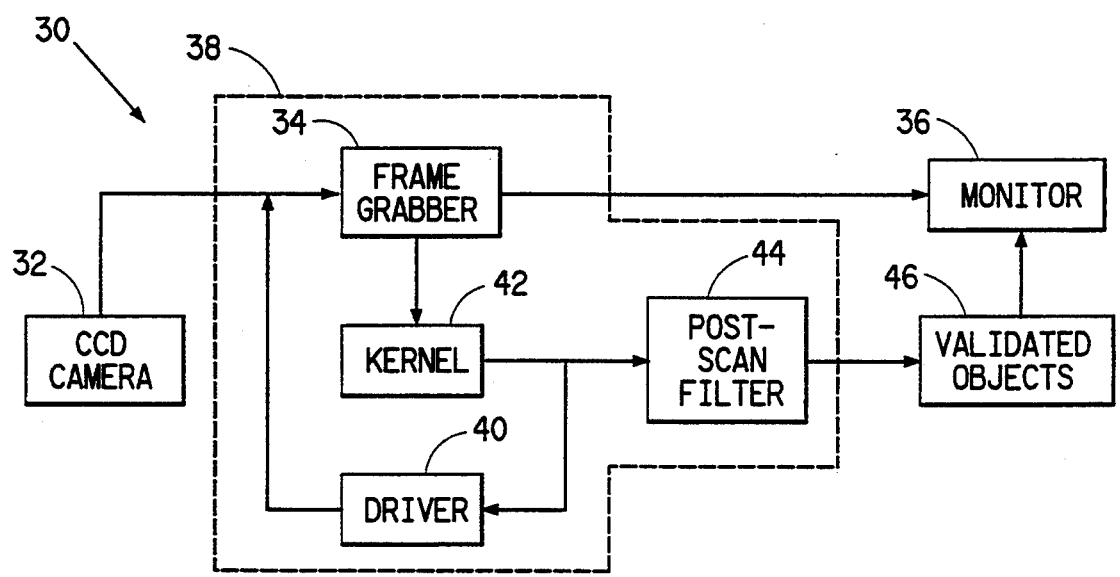
FIG. 34 is a block diagram showing the components of a system used to execute the method of the second embodiment of the present invention.

In accordance with the second embodiment of the present invention, there is provided an image analysis system for identifying, characterizing and displaying by color at least one valid object having at least one predetermined attribute value in a background as in the second embodiment. A block diagram of the system of the present invention is shown in FIG. 34. The system is shown generally at 30 in FIG. 34. A camera 32 is used to generate an image of the object and the background. As in the first embodiment, any type of camera may be used without departing from the general principles of the present invention. In the second embodiment, a filter wheel, (not shown) like filter wheel 14 of FIG. 1, is attached to the camera as shown in FIG. 34 to generate the red, green and blue images and the black-and-white image. As in the first embodiment, a color CCD camera may be used instead of the black-and-white CCD camera in order to generate the color and black-and-white images, although this is not preferred for cost reasons.

The system of the second embodiment of the present invention also comprises a black-and-white frame grabber 34, or image processing board, as shown in FIG. 34. This frame grabber is like the frame grabber in the first embodiment. The frame grabber digitizes and stores the video image in one frame, as known to one skilled in the image processing art. As in the first embodiment, alternatively, a video digitizer may be used for digitizing and storing the image, although not necessarily in one frame. The system of the present invention further comprises a monitor 36 as shown in FIG. 34 for displaying the object. Monitor 36 is like the monitor in the first embodiment.

The system of the second embodiment of the present invention also comprises a computer system 38 as shown in FIG. 34. Frame grabber 34 is part of computer system 38. The computer system also comprises a central processing unit (CPU) and a memory. The computer system also includes a driver 40, a kernel 42 and a post-scan filter 44 as shown in FIG. 34. Driver 40 stores the definition of the valid object. Kernel 42 generates a gray level histogram of the image and entropically selects a threshold gray level such that the entropy function of the histogram is maximized. Kernel 42 also searches the image for at least one candidate object and validates the candidate object having the valid object predetermined attribute value to identify the valid object. The validated objects are represented by box 46 in FIG. 34. The driver and the kernel may comprise software incorporated in the memory. Alternatively, the driver and the kernel may be programmed into a programmable, read-only memory (PROM) from which the software may be retrieved. A post-scan filter is shown at 48 in FIG. 34 and provides a final check to remove redundancies in overlapping objects as described above.

The invention will be further clarified by the following Example, which is intended to be purely exemplary of the invention.

EXAMPLE

In this Example, a colony counting system is described. Colony counting is a task routinely performed in microbiology laboratories for quantifying the amount of bacteria in a sample. The sample can be one of a number of different types such as blood, food, cosmetics, soil, etc. This system identified colonies in varying backgrounds and was also able to unclump highly clumped colonies.

In addition to accurate colony counting, it is important to be able to classify colonies by type in cases where there is more than one species of bacteria on the same plate. In this Example, both typical and atypical strains of Salmonella were present. In addition, background (non-pathogenic) bacteria were also present. It is also important to be able to differentiate both strains of Salmonella from the background bacteria. In this Example, the agar plate was Hektoen Enteric agar where the typical Salmonella colonies were black, the atypical Salmonella colonies were light green, and the background colonies were yellow. The system of this Example was able to classify the colonies by hue and thus perform classification of species on the plate.

In this Example, an additional complexity was presented by the number of colonies in the plate. There were 875 colonies on the plate, which would make the visual classification of the colonies extremely tedious. The large number of colonies resulted in significant clumping, which posed another major difficulty. The system described in this Example was able to unclump the colonies and then perform hue classification to classify the different species on the plate.

The apparatus used in this Example to count colonies comprised a Petri dish holder to hold the plate, an optical system for illuminating the plate and an image acquisition system to generate an image of the sample on the plate as described above with respect to FIG. 33. A video signal from a camera was fed into a frame grabber, which occupied a slot in a PC. The frame grabber digitized the image.

The Petri dish holder comprised a movable, machined member which can accept standard Petri dishes. The member had a countersunk circular indent capable of accepting the dishes and was slid into place via a bearing-based support. Below the holder, there was room to insert an appropriate background sheet to enhance image contrast.

The illumination source used comprised a Philips FC 8T9/CW circular fluorescent lamp (8" diameter) (20.32 cm.) which surrounded the Petri dish. The lamp was mounted approximately 1" (2.54 cm.) above the dish and illuminated the dish uniformly from all sides. The distance between the lamp and the dish was important. If the lamp was too high, the resulting image would have revealed significant "glaring" and "haloing" from the curved surfaces of the colonies. The colonies can be considered small 3D lenses, and oblique, grazing angle illumination was necessary so that light scattering from the lens-like surfaces did not enter the camera. The lamp was actively stabilized using a Mercron FL0416-2 controller which kept the light level constant, to prevent fluctuations in output. In addition, the controller was remotely programmable to adjust the brightness of the lamp. This feature was especially useful for colony plates, where the inherent contrast is variable. For low contrast plates, the light level can be increased to improve the contrast.

The optical system comprised a Sony XC-77 monochrome CCD video camera with a 16 mm. F2.8 Nikkon lens. The camera was centered above the Petri dish at a distance of approximately 1.5 feet (0.05 m.). The distance from the camera to the dish was such that the disk just filled the surface of the CCD sensor in order to maximize spatial resolution.

A filter wheel was placed between the lens and the camera sensor. The filter wheel had four positions. The filter combination in each position are described below:

TABLE 1

| Position | Filter COMBINATION |
| --- | --- |
| 1 (BW) | 1.2 ND filter (ND = neutral density) |
| 2 (RED) | Kodak filter #25 (catalog #149 5605) + 0.5 ND filter |
| 3 (GREEN) | Kodak filter #58 (cat #149 5860) + 0.3 ND filter |
| 4 (BLUE) | Kodak filter #47B (Cat. #149 5795) |

A black light shield made from crystalline homopolymer of formaldehyde, sold under the trademark "DELRIN" by E. I. du Pont de Nemours and Company of Wilmington, Del., extended from the camera to the plate to prevent stray light from entering the camera. The video signal from the camera went directly to the frame grabber on the PC.

The image acquisition system comprised a Data Translation DT2851 frame grabber board which occupied an expansion slot on the PC. A Dell 33 MHZ 386AT system was used to store images and execute the method of the present invention. The frame grabber board had a 512×512 pixel video buffer in which the digitized image was stored. In order to minimize "shot" noise from the camera, several image frames were averaged, and the resulting averaged image was stored and used for further analysis. The output of the frame grabber was connected to a Sony TRINITRON monitor to display the image.

The following (1)–(4) were computer specifications:
(1) Driver:

The attributes and their ranges for valid colonies are shown in Table 2 below.

TABLE 2

| Attribute | | Valid Range |
|---|---|---|
| *Range of Attribute values for screening* | | |
| (1) xcm = | x coordinate of object center of mass | DESCRIPTOR |
| (2) ycm = | y coordinate of object center of mass | DESCRIPTOR |
| (3) perim = | total length of perimeter of object | DESCRIPTOR |
| (4) npts = | number of perimeter points in object | npts > 3 |
| (5) obj_type = | type of object (Exterior or Interior) | DESCRIPTOR |
| Exterior = | object never contained within another object | |
| Interior = | object previously contained within another object | |
| (6) area = | area of object | area > 0.0 |
| (7) shape = | shape factor of object | shape > −0.8 |
| (8) status = | status value of object which is used in artifact removal and redundancy checking in several different ways | DESCRIPTOR |
| (9) contrast = | edge contrast of object | contrast > 100 |
| (10) edge = | data structure containing coordinates of extremum points of object | DESCRIPTOR |
| (11) thresh = | threshold at which object was detected | DESCRIPTOR |
| (12) max = | maximum gray level value of histogram partition in which object was detected | DESCRIPTOR |
| (13) clump_shape = | maximum shape factor for a clump of candidate objects | UNUSED |
| (14) clump_size = | minimum area for a clump of candidate objects | UNUSED |
| (15) worst_shape = | minimum shape factor for a clump of candidate objects | UNUSED |
| (16) hue_mean = | mean hue of object | hue_mean > 1.90 and hue_mean < 3.40 (if hue_mag > 200) |
| (17) hue_mag | magnitude of hue vector of object | subject to classification Rules |
| (18) hue_cm = | hue vector of center of mass of object | DESCRIPTOR |

Note:
Only some of the attribute values required valid ranges. others were "descriptors" which did not influence object validity.

(2) Artifact Removal:

The following rules were used to eliminate artifacts in the agar: ○ If the mean hue of a candidate colony was less than 1.90 and the hue magnitude was greater than 200, the candidate colony was deleted.

○ If the mean hue of a candidate colony was less than 1.90 and the hue magnitude was greater than 200, the candidate colony was deleted.

○ If the mean hue of a candidate colony was greater than 3.40 and the hue magnitude was greater than 200, the candidate colony was deleted.

(3) Redundancy check:

The redundancy check for inhomogeneous objects described above with respect to FIGS. 28A–28D and 29 was used for redundancy checking in this Example.

(4) Colony Classification:

The rules used to classify the colonies into the three categories (Atypical Salmonella, Typical Salmonella and Background) are summarized below:

○ If the hue magnitude was less than or equal to 200, the colony was classified as TYPICAL Salmonella.

○ If the mean hue was greater than 1.90 and was less than 2.55, the colony was classified as a BACKGROUND colony.

○ If the mean hue was greater than or equal to 2.55 and was less than 2.70:

○ If the hue magnitude was less than 2000 or the hue of center of mass of the colony plus a hue offset of 0.05 was less than the mean hue, the colony was classified as a BACKGROUND colony.

◦ Otherwise, the colony was classified as an ATYPICAL colony.

◦ Otherwise all other valid colonies were classified as ATYPICAL colonies.

A total of 875 valid colonies were identified. Classification of the colonies by hue resulted in the following breakdown:

TYPICAL Salmonella: 155
ATYPICAL Salmonella: 385
BACKGROUND: 335

These results agree very well with the results expected from a visual examination of the plate.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A digital image analysis method for displaying an object on a monitor in color corresponding to the color of the object, comprising the steps of:
   (a) generating a plurality of images of the object and the background thereof, wherein each image is one of three primary color images or a black-and-white image;
   (b) searching at least one of the images for the object;
   (c) determining the interior points of the object;
   (d) determining the gray level values of at least one predetermined interior point;
   (e) calculating at least one color parameter of the predetermined interior point;
   (f) calculating at least one color parameter index for the predetermined interior point of the object;
   (g) preparing a table of gray level values corresponding to the color parameter index of the predetermined interior point of the object;
   (h) defining an image buffer wherein the locations corresponding to the interior points of the object are assigned the color parameter index of the predetermined interior point; and
   (i) copying the image buffer to the monitor to display the object in color corresponding to the color of the predetermined interior point as determined by the table of gray level values corresponding to the color parameter index.

2. The image analysis method of claim 1, wherein the step of searching the image comprises using at least one automatically calculated threshold.

3. The image analysis method of claim 1, wherein the step of determining the interior points comprises determining the center of mass of the object.

4. The image analysis method of claim 3, wherein the step of determining the gray level values comprises determining the gray level values of the center of mass of the object.

5. The image analysis method of claim 4, wherein the step of calculating at least one first color parameter comprises calculating the hue angle.

6. The image analysis method of claim 5, wherein the step of calculating at least one color parameter comprises calculating the hue magnitude of the center of mass.

7. The image analysis method of claim 6, further including the step of using the hue magnitude to resolve conflicts in the table of gray level values.

8. The image analysis method of claim 5, wherein the step of calculating at least one color parameter index comprises calculating the hue index of the center of mass of the object.

9. The image analysis method of claim 8, wherein the preparing step comprises preparing a table of gray level values corresponding to the hue index of the center of mass for the object.

10. The image analysis method of claim 9, wherein the step of defining an image buffer comprises defining an image buffer where the locations corresponding to the interior points of the object are assigned the hue index of the center of mass of the object.

11. The image analysis method of claim 10, wherein the step of copying the image buffer to the monitor comprises copying the image buffer to the monitor to display the object in a color corresponding to the color of the center of mass of the object as determined by the hue index.

12. A method of identifying, characterizing and displaying by color at least one valid object having at least one predetermined attribute value in a background, comprising the steps of:
   (a) generating a plurality of images of a candidate object and the background, wherein each image is one of three primary color images or a black-and-white image;
   (b) searching at least one image for at least one candidate object;
   (c) determining the interior points of the candidate object;
   (d) determining the gray level values of at least one predetermined interior point of the candidate object;
   (e) calculating at least one color parameter of the predetermined interior point of the candidate object;
   (f) characterizing the candidate object by the color parameter;
   (g) validating the candidate object having the valid object predetermined attribute value to identify the valid object;
   (h) calculating at least one color parameter index for the at least one predetermined interior point of the valid object;
   (i) preparing a table of gray level values corresponding to the color parameter index of the predetermined interior point of the valid objects;
   (j) defining an image buffer wherein the locations corresponding to the interior points of the valid object are assigned the color parameter index of the predetermined interior point of the valid object; and
   (k) copying the image buffer to the monitor to display the valid object in color corresponding to the color of the predetermined interior point of the valid object as determined by the table of gray level values corresponding to the color parameter index.

13. The method of claim 12, wherein the step of searching the image comprises using at least one automatically calculated threshold.

* * * * *